(12) United States Patent
Tomizawa et al.

(10) Patent No.: US 11,682,360 B2
(45) Date of Patent: Jun. 20, 2023

(54) DISPLAY DEVICE

(71) Applicant: Japan Display Inc., Tokyo (JP)

(72) Inventors: Kazunari Tomizawa, Tokyo (JP);
Ayato Kitamura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/408,587

(22) Filed: Aug. 23, 2021

(65) Prior Publication Data

US 2021/0383767 A1 Dec. 9, 2021

Related U.S. Application Data

(63) Continuation of application No. PCT/JP2020/009516, filed on Mar. 5, 2020.

(30) Foreign Application Priority Data

Mar. 5, 2019 (JP) .............................. JP2019-039935

(51) Int. Cl.
*G09G 3/36* (2006.01)
*G09G 3/20* (2006.01)
(Continued)

(52) U.S. Cl.
CPC ......... *G09G 3/3607* (2013.01); *G09G 3/2003* (2013.01); *G09G 3/2007* (2013.01);
(Continued)

(58) Field of Classification Search
CPC .............. G09G 3/3607; G09G 3/2003; G09G 2320/0673; G09G 2300/0452;
(Continued)

(56) References Cited

U.S. PATENT DOCUMENTS 6,954,191 B1 10/2005 Hirano et al.
8,648,883 B2 * 2/2014 Han ..................... G09G 3/2003
345/690

(Continued)

FOREIGN PATENT DOCUMENTS

JP 2002149116 A 5/2002
JP 2006171761 A 6/2006
(Continued)

OTHER PUBLICATIONS

International Search Report in Application No. PCT/JP2020/009516, dated Jun. 2, 2020.

*Primary Examiner* — Dismery Mercedes
(74) *Attorney, Agent, or Firm* — K&L Gates LLP

(57) ABSTRACT

A display device includes: a display panel including pixels for displaying a first color, a second color, a third color, and a fourth color; and a signal processor configured to convert an image signal including gradation data of the first to third colors into a first signal including gradation data of the first to third colors and a second signal including a gradation datum of the fourth color and output the first and second signals. When the gradation data of the image signal have the same value, output signals from the signal processor include an output signal in which the gradation data of the first signal and the gradation datum of the second signal have (Continued)

the same value and an output signal in which the gradation data of the first signal and the gradation datum of the second signal have values different from each other by 1.

15 Claims, 47 Drawing Sheets

(51) Int. Cl.
 G09G 3/3208 (2016.01)
 H04N 9/64 (2023.01)
 H04N 9/77 (2006.01)
(52) U.S. Cl.
 CPC ......... *G09G 3/2022* (2013.01); *G09G 3/3208* (2013.01); *H04N 9/64* (2013.01); *H04N 9/77* (2013.01); *G09G 2300/0452* (2013.01); *G09G 2310/08* (2013.01); *G09G 2320/0271* (2013.01); *G09G 2340/06* (2013.01)
(58) Field of Classification Search
 CPC ......... G09G 3/3208; G09G 2320/0242; G09G 2310/08; G09G 2340/06; G09G 2320/0276; G09G 2320/0271; G09G 2340/08; G09G 3/2803; G09G 5/02; G09G 2320/0626; G09G 3/2007; H04N 9/77; H04N 9/64
 See application file for complete search history.

(56) References Cited

U.S. PATENT DOCUMENTS

| | | | |
|---|---|---|---|
| 2006/0125749 A1 | 6/2006 | Lee et al. | |
| 2008/0150958 A1* | 6/2008 | Higgins | G09G 3/2003 345/591 |
| 2011/0019931 A1* | 1/2011 | Hamada | H04N 9/8042 382/251 |
| 2015/0187261 A1* | 7/2015 | Kim | G09G 3/3233 345/77 |
| 2015/0294441 A1* | 10/2015 | Sakaigawa | G09G 5/10 345/618 |
| 2015/0312542 A1* | 10/2015 | Suginohara | H04N 9/77 345/603 |
| 2016/0042698 A1* | 2/2016 | Yang | G09G 5/04 345/690 |
| 2017/0200405 A1* | 7/2017 | Li | H04N 1/60 |
| 2017/0223228 A1* | 8/2017 | Shaw | G06T 3/40 |
| 2018/0075795 A1* | 3/2018 | Lin | G09G 3/3611 |
| 2018/0182344 A1* | 6/2018 | Zhu | G09G 3/3685 |
| 2018/0348573 A1* | 12/2018 | Yata | G09G 3/3607 |

FOREIGN PATENT DOCUMENTS

| | | |
|---|---|---|
| JP | 2018205692 A | 12/2018 |
| WO | 2007116589 A1 | 10/2007 |

* cited by examiner

FIG.4

IMAGE SIGNAL GRADATION VALUE

| GRADATION | 8-BIT DATA |
|---|---|
| 0 | 0000 0000 |
| 1 | 0000 0001 |
| 2 | 0000 0010 |
| 3 | 0000 0011 |
| .. | .. |
| 127 | 0111 1111 |
| 128 | 1000 0000 |
| 129 | 1000 0001 |
| 130 | 1000 0010 |
| .. | .. |
| 253 | 1111 1101 |
| 254 | 1111 1110 |
| 255 | 1111 1111 |

↓

GRADATION VALUE (W) RESULTING FROM IMAGE PROCESSING

| GRADATION | 9-BIT DATA |
|---|---|
| 0 | 0000 0000 0 |
| 1 | 0000 0000 1 |
| 2 | 0000 0001 0 |
| 3 | 0000 0001 1 |
| 4 | 0000 0010 0 |
| 5 | 0000 0010 1 |
| 6 | 0000 0011 0 |
| 7 | 0000 0011 1 |
| .. | .. |
| 254 | 0111 1111 0 |
| 255 | 0111 1111 1 |
| 256 | 1000 0000 0 |
| 257 | 1000 0000 1 |
| 258 | 1000 0001 0 |
| 259 | 1000 0001 1 |
| 260 | 1000 0010 0 |
| 261 | 1000 0010 1 |
| .. | .. |
| 506 | 1111 1101 0 |
| 507 | 1111 1101 1 |
| 508 | 1111 1110 0 |
| 509 | 1111 1110 1 |
| 510 | 1111 1111 0 |
| 511 | 1111 1111 1 |

↓

GRADATION VALUE (W) RESULTING FROM ADDING DATA "1"

| GRADATION | 9-BIT DATA |
|---|---|
| 0 | 0000 0000 1 |
| 1 | 0000 0001 1 |
| 2 | 0000 0001 1 |
| 3 | 0000 0010 1 |
| 4 | 0000 0010 1 |
| 5 | 0000 0011 1 |
| 6 | 0000 0011 1 |
| 7 | 0000 0100 1 |
| .. | .. |
| 255 | 0111 1111 1 |
| 256 | 1000 0000 1 |
| 257 | 1000 0000 1 |
| 258 | 1000 0001 1 |
| 259 | 1000 0001 1 |
| 260 | 1000 0010 1 |
| 261 | 1000 0010 1 |
| 262 | 1000 0011 1 |
| .. | .. |
| 507 | 1111 1101 1 |
| 508 | 1111 1110 1 |
| 509 | 1111 1110 1 |
| 510 | 1111 1111 1 |
| 511 | 1111 1111 1 |
| 511* | 1111 1111 1 |

↓

GRADATION VALUE (W) RESULTING FROM GRADATION PROCESSING (ZEROTH BIT IS DISCARDED)

| GRADATION | 8-BIT DATA |
|---|---|
| 0 | 0000 0000 |
| 1 | 0000 0001 |
| 2 | 0000 0010 |
| 3 | 0000 0011 |
| 4 | 0000 0100 |
| .. | .. |
| 127 | 0111 1111 |
| 128 | 1000 0000 |
| 129 | 1000 0001 |
| 130 | 1000 0010 |
| 131 | 1000 0011 |
| .. | .. |
| 253 | 1111 1101 |
| 254 | 1111 1110 |
| 255 | 1111 1111 |
| 255 | 1111 1111 |

FIG. 11

| IMAGE SIGNAL GRADATION VALUE | |
|---|---|
| GRADATION | 8-BIT DATA |
| ... | ... |
| 127 | 0111 1111 |
| 128 | 1000 0000 |
| 129 | 1000 0001 |
| ... | ... |

↑

| GRADATION VALUE (RGB) RESULTING FROM IMAGE PROCESSING | |
|---|---|
| GRADATION | 11-BIT DATA |
| ... | ... |
| 1016 | 0111 1111 000 |
| 1017 | 0111 1111 001 |
| 1018 | 0111 1111 010 |
| 1019 | 0111 1111 011 |
| 1020 | 0111 1111 100 |
| 1021 | 0111 1111 101 |
| 1022 | 0111 1111 110 |
| 1023 | 0111 1111 111 |
| 1024 | 1000 0000 000 |
| 1025 | 1000 0000 001 |
| 1026 | 1000 0000 010 |
| 1027 | 1000 0000 011 |
| 1028 | 1000 0000 100 |
| 1029 | 1000 0000 101 |
| 1030 | 1000 0000 110 |
| 1031 | 1000 0000 111 |
| 1032 | 1000 0001 000 |
| 1033 | 1000 0001 001 |
| 1034 | 1000 0001 010 |
| 1035 | 1000 0001 011 |
| 1036 | 1000 0001 100 |
| 1037 | 1000 0001 101 |
| 1038 | 1000 0001 110 |
| 1039 | 1000 0001 111 |
| ... | ... |

↑

| GRADATION VALUE (RGB) RESULTING FROM GRADATION PROCESSING (ZEROTH BIT IS DISCARDED) | |
|---|---|
| GRADATION | 10-BIT DATA |
| ... | ... |
| 508 | 0111 1111 00 |
| 509 | 0111 1111 01 |
| 510 | 0111 1111 10 |
| 511 | 0111 1111 11 |
| 512 | 1000 0000 00 |
| 513 | 1000 0000 01 |
| 514 | 1000 0000 10 |
| 515 | 1000 0000 11 |
| 516 | 1000 0001 00 |
| 517 | 1000 0001 01 |
| 518 | 1000 0001 10 |
| 519 | 1000 0001 11 |
| ... | ... |

FIG.12

| IMAGE SIGNAL GRADATION VALUE | |
|---|---|
| GRADATION | 8-BIT DATA |
| .. | |
| 127 | 0111 1111 |
| 128 | 1000 0000 |
| 129 | 1000 0001 |
| .. | |

↓

| GRADATION VALUE (W) RESULTING FROM IMAGE PROCESSING | |
|---|---|
| GRADATION | 11-BIT DATA |
| 1016 | 0111 1111 000 |
| 1017 | 0111 1111 001 |
| 1018 | 0111 1111 010 |
| 1019 | 0111 1111 011 |
| 1020 | 0111 1111 100 |
| 1021 | 0111 1111 101 |
| 1022 | 0111 1111 110 |
| 1023 | 0111 1111 111 |
| 1024 | 1000 0000 000 |
| 1025 | 1000 0000 001 |
| 1026 | 1000 0000 010 |
| 1027 | 1000 0000 011 |
| 1028 | 1000 0000 100 |
| 1029 | 1000 0000 101 |
| 1030 | 1000 0000 110 |
| 1031 | 1000 0000 111 |
| 1032 | 1000 0001 000 |
| 1033 | 1000 0001 001 |
| 1034 | 1000 0001 010 |
| 1035 | 1000 0001 011 |
| 1036 | 1000 0001 100 |
| 1037 | 1000 0001 101 |
| 1038 | 1000 0001 110 |
| 1039 | 1000 0001 111 |

↓

| GRADATION VALUE (W) RESULTING FROM ADDING DATA "1" | |
|---|---|
| GRADATION | 11-BIT DATA |
| 1017 | 0111 1111 001 |
| 1018 | 0111 1111 010 |
| 1019 | 0111 1111 011 |
| 1020 | 0111 1111 100 |
| 1021 | 0111 1111 101 |
| 1022 | 0111 1111 110 |
| 1023 | 0111 1111 111 |
| 1024 | 1000 0000 000 |
| 1025 | 1000 0000 001 |
| 1026 | 1000 0000 010 |
| 1027 | 1000 0000 011 |
| 1028 | 1000 0000 100 |
| 1029 | 1000 0000 101 |
| 1030 | 1000 0000 110 |
| 1031 | 1000 0000 111 |
| 1032 | 1000 0001 000 |
| 1033 | 1000 0001 001 |
| 1034 | 1000 0001 010 |
| 1035 | 1000 0001 011 |
| 1036 | 1000 0001 100 |
| 1037 | 1000 0001 101 |
| 1038 | 1000 0001 110 |
| 1039 | 1000 0001 111 |
| 1040 | 1000 0010 000 |
| .. | |

↓

| GRADATION VALUE (W) RESULTING FROM GRADATION PROCESSING (ZEROTH BIT IS DISCARDED) | |
|---|---|
| GRADATION | 10-BIT DATA |
| .. | |
| 508 | 0111 1111 00 |
| 509 | 0111 1111 01 |
| 510 | 0111 1111 10 |
| 511 | 0111 1111 11 |
| 512 | 1000 0000 00 |
| 513 | 1000 0000 01 |
| 514 | 1000 0000 10 |
| 515 | 1000 0000 11 |
| 516 | 1000 0001 00 |
| 517 | 1000 0001 01 |
| 518 | 1000 0001 10 |
| 519 | 1000 0001 11 |
| 520 | 1000 0010 00 |

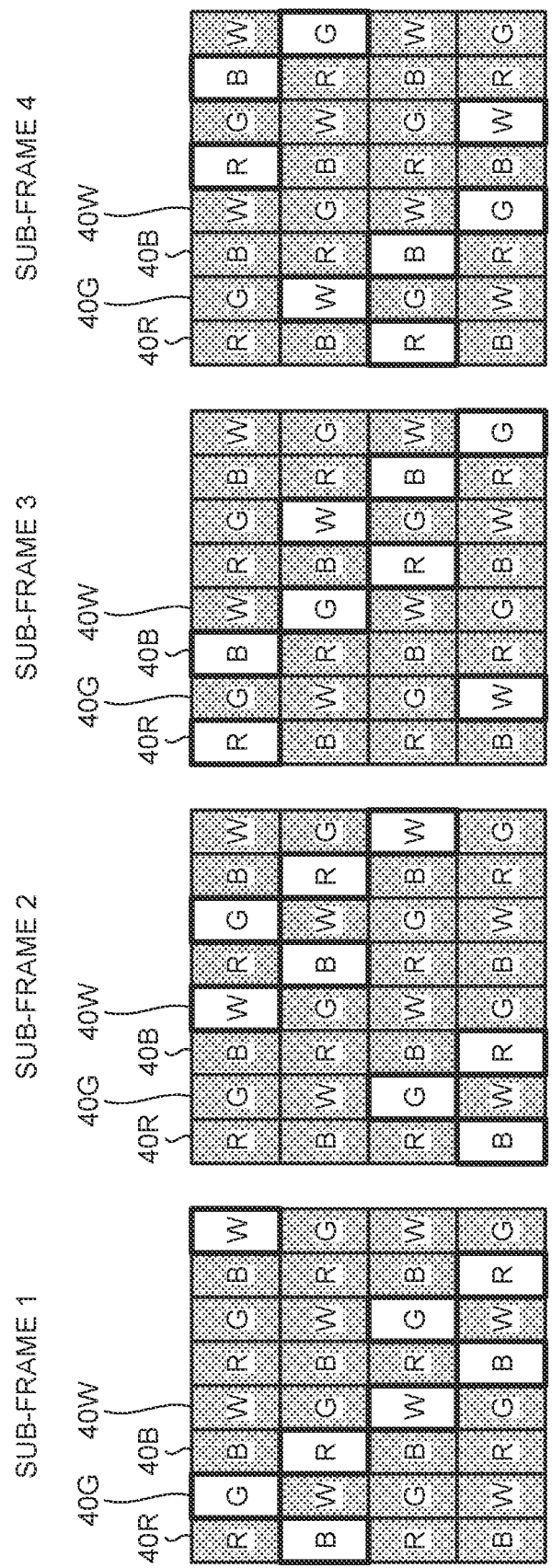

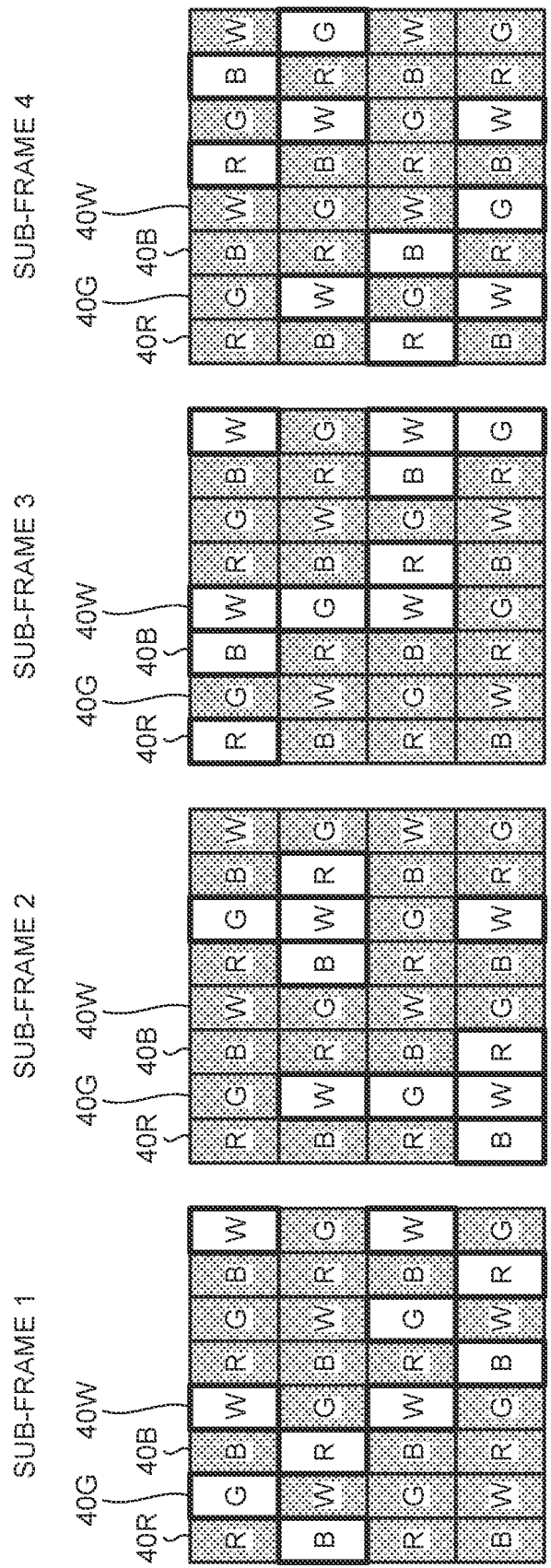

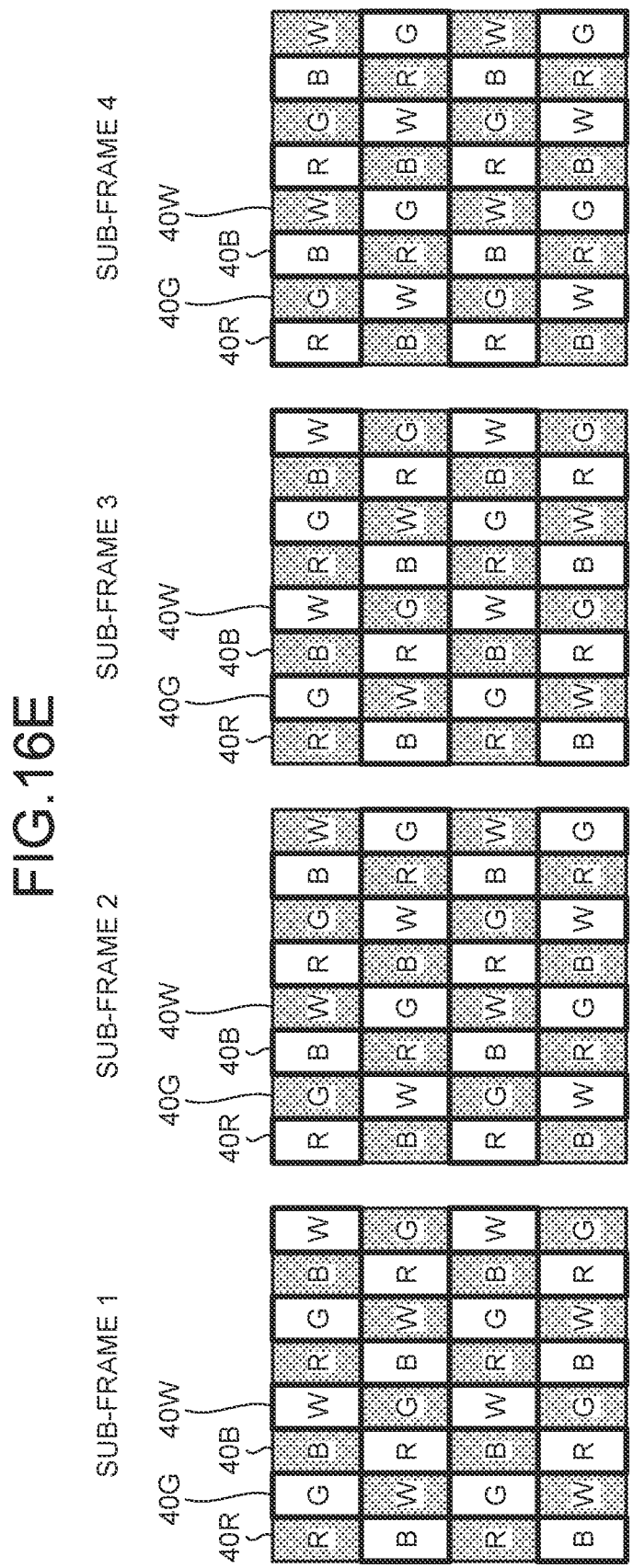

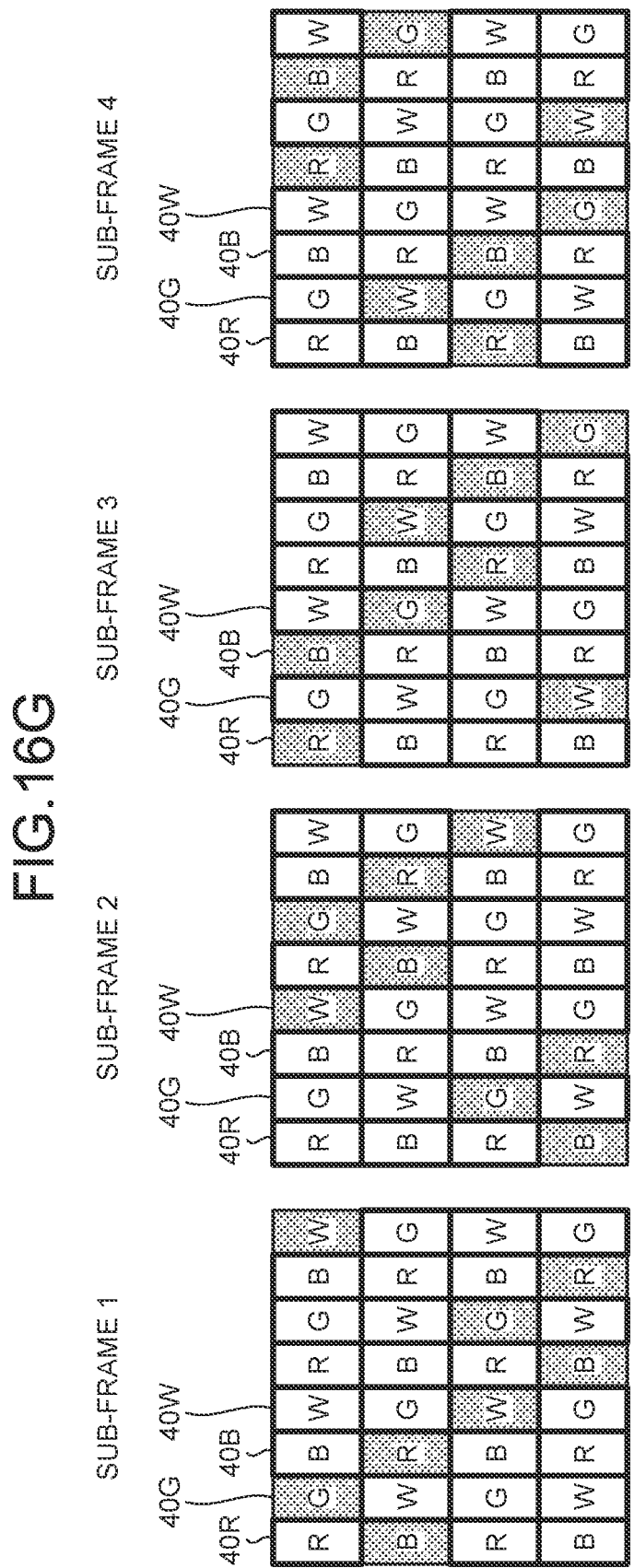

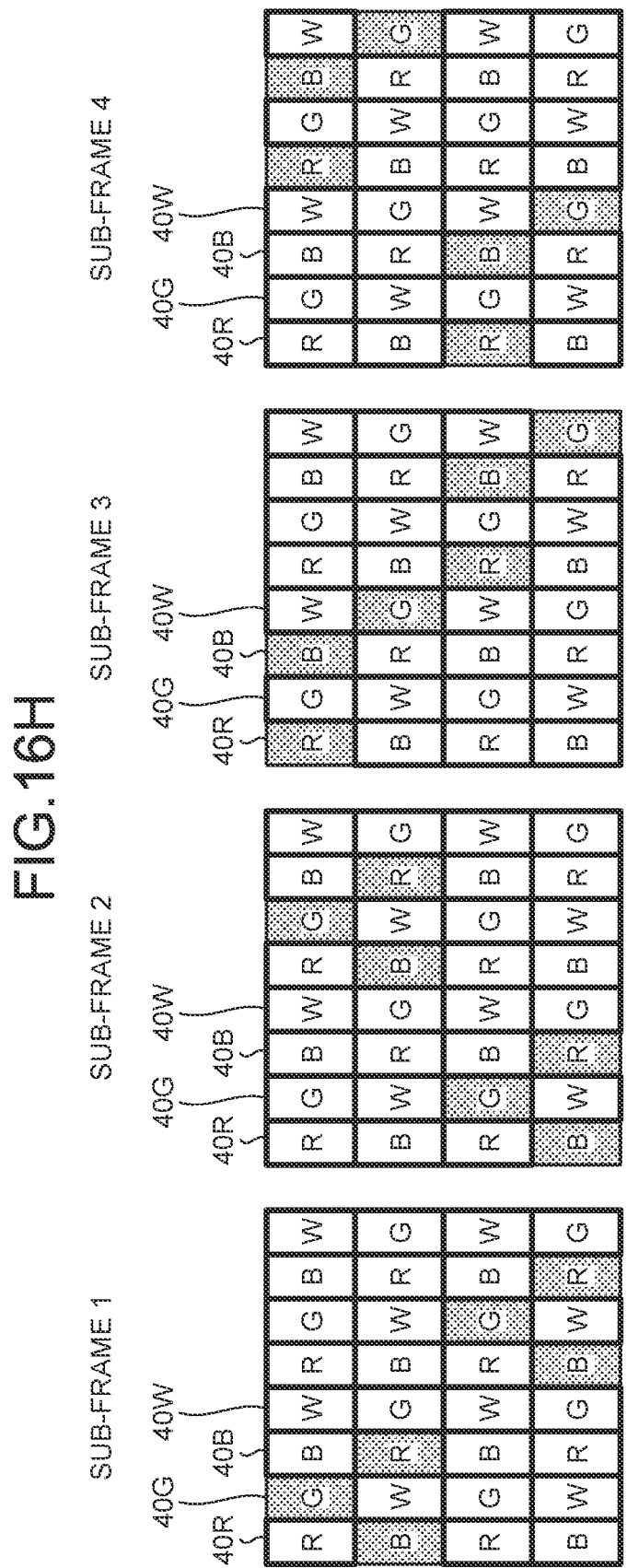

FIG.18

| IMAGE SIGNAL GRADATION VALUE | | GRADATION VALUE (RGB) RESULTING FROM IMAGE PROCESSING | | GRADATION VALUE (RGB) RESULTING FROM GRADATION PROCESSING (ZEROTH BIT IS DISCARDED) | |
|---|---|---|---|---|---|
| GRADATION | 8-BIT DATA | GRADATION | 4-BIT DATA | GRADATION | 3-BIT DATA |
| 0 : 15 | 0000 0000 : 0000 1111 | 0 | 0000 | 0 | 000 |
| 16 : 31 | 0001 0000 : 0001 1111 | 1 | 0001 | | |
| 32 : 47 | 0010 0000 : 0010 1111 | 2 | 0010 | 1 | 001 |
| 48 : 63 | 0011 0000 : 0011 1111 | 3 | 0011 | | |
| 64 : 79 | 0100 0000 : 0100 1111 | 4 | 0100 | 2 | 010 |
| 80 : 95 | 0101 0000 : 0101 1111 | 5 | 0101 | | |
| 96 : 111 | 0110 0000 : 0110 1111 | 6 | 0110 | 3 | 011 |
| 112 : 127 | 0111 0000 : 0111 1111 | 7 | 0111 | | |
| 128 : 143 | 1000 0000 : 1000 1111 | 8 | 1000 | 4 | 100 |
| 144 : 159 | 1001 0000 : 1001 1111 | 9 | 1001 | | |
| 160 : 175 | 1010 0000 : 1010 1111 | 10 | 1010 | 5 | 101 |
| 176 : 191 | 1011 0000 : 1011 1111 | 11 | 1011 | | |
| 192 : 207 | 1100 0000 : 1100 1111 | 12 | 1100 | 6 | 110 |
| 208 : 223 | 1101 0000 : 1101 1111 | 13 | 1101 | | |
| 224 : 239 | 1110 0000 : 1110 1111 | 14 | 1110 | 7 | 111 |
| 240 : 255 | 1111 0000 : 1111 1111 | 15 | 1111 | | |

FIG.19

| IMAGE SIGNAL GRADATION VALUE | | GRADATION VALUE (W) RESULTING FROM IMAGE PROCESSING | | GRADATION VALUE (W) RESULTING FROM ADDING DATA "1" | | GRADATION VALUE (W) RESULTING FROM GRADATION PROCESSING (ZEROTH BIT IS DISCARDED) | |
|---|---|---|---|---|---|---|---|
| GRADA-TION | 8-BIT DATA | GRADA-TION | 4-BIT DATA | GRADA-TION | 4-BIT DATA | GRADA-TION | 3-BIT DATA |
| 0 : 15 | 0000 0000 : 0000 1111 | 0 | 0000 | 0 | 0001 | 0 | 000 |
| 16 : 31 | 0001 0000 : 0001 1111 | 1 | 0001 | | 0010 | 1 | 001 |
| 32 : 47 | 0010 0000 : 0010 1111 | 2 | 0010 | 1 | 0011 | | |
| 48 : 63 | 0011 0000 : 0011 1111 | 3 | 0011 | | 0100 | 2 | 010 |
| 64 : 79 | 0100 0000 : 0100 1111 | 4 | 0100 | 2 | 0101 | | |
| 80 : 95 | 0101 0000 : 0101 1111 | 5 | 0101 | | 0110 | 3 | 011 |
| 96 : 111 | 0110 0000 : 0110 1111 | 6 | 0110 | 3 | 0111 | | |
| 112 : 127 | 0111 0000 : 0111 1111 | 7 | 0111 | | 1000 | 4 | 100 |
| 128 : 143 | 1000 0000 : 1000 1111 | 8 | 1000 | 4 | 1001 | | |
| 144 : 159 | 1001 0000 : 1001 1111 | 9 | 1001 | | 1010 | 5 | 101 |
| 160 : 175 | 1010 0000 : 1010 1111 | 10 | 1010 | 5 | 1011 | | |
| 176 : 191 | 1011 0000 : 1011 1111 | 11 | 1011 | | 1100 | 6 | 110 |
| 192 : 207 | 1100 0000 : 1100 1111 | 12 | 1100 | 6 | 1101 | | |
| 208 : 223 | 1101 0000 : 1101 1111 | 13 | 1101 | | 1110 | 7 | 111 |
| 224 : 239 | 1110 0000 : 1110 1111 | 14 | 1110 | 7 | 1111 | | |
| 240 : 255 | 1111 0000 : 1111 1111 | 15 | 1111 | | 1111 | 7 | 111 |

FIG.25

| IMAGE SIGNAL GRADATION VALUE ||
|---|---|
| GRADATION | 8-BIT DATA |
| 0 | 0000 0000 |
| 7 | 0000 0111 |
| 8 | 0000 1000 |
| 15 | 0000 1111 |
| 16 | 0001 0000 |
| 23 | 0001 0111 |
| 24 | 0001 1000 |
| 31 | 0001 1111 |
| 32 | 0010 0000 |
| 39 | 0010 0111 |
| 40 | 0010 1000 |
| 47 | 0010 1111 |
| 48 | 0011 0000 |
| 55 | 0011 0111 |
| 56 | 0011 1000 |
| 63 | 0011 1111 |
| 64 | 0100 0000 |
| 71 | 0100 0111 |
| 72 | 0100 1000 |
| 79 | 0100 1111 |
| 80 | 0101 0000 |
| 87 | 0101 0111 |
| 88 | 0101 1000 |
| 95 | 0101 1111 |
| 96 | 0110 0000 |
| 103 | 0110 0111 |
| 104 | 0110 1000 |
| 111 | 0110 1111 |
| 112 | 0111 0000 |
| 119 | 0111 0111 |
| 120 | 0111 1000 |
| 127 | 0111 1111 |
| 128 | 1000 0000 |
| 135 | 1000 0111 |
| 136 | 1000 1000 |
| 143 | 1000 1111 |
| 144 | 1001 0000 |
| 151 | 1001 0111 |
| 152 | 1001 1000 |
| 159 | 1001 1111 |
| 160 | 1010 0000 |
| 167 | 1010 0111 |
| 168 | 1010 1000 |
| 175 | 1010 1111 |
| 176 | 1011 0000 |
| 183 | 1011 0111 |
| 184 | 1011 1000 |
| 191 | 1011 1111 |
| 192 | 1100 0000 |
| 199 | 1100 0111 |
| 200 | 1100 1000 |
| 207 | 1100 1111 |
| 208 | 1101 0000 |
| 215 | 1101 0111 |
| 216 | 1101 1000 |
| 223 | 1101 1111 |
| 224 | 1110 0000 |
| 231 | 1110 0111 |
| 232 | 1110 1000 |
| 239 | 1110 1111 |
| 240 | 1111 0000 |
| 247 | 1111 0111 |
| 248 | 1111 1000 |
| 255 | 1111 1111 |

→

| GRADATION VALUE (RGB) RESULTING FROM IMAGE PROCESSING ||
|---|---|
| GRADATION | 5-BIT DATA |
| 0 | 000 00 |
| 1 | 000 01 |
| 2 | 000 10 |
| 3 | 000 11 |
| 4 | 001 00 |
| 5 | 001 01 |
| 6 | 001 10 |
| 7 | 001 11 |
| 8 | 010 00 |
| 9 | 010 01 |
| 10 | 010 10 |
| 11 | 010 11 |
| 12 | 011 00 |
| 13 | 011 01 |
| 14 | 011 10 |
| 15 | 011 11 |
| 16 | 100 00 |
| 17 | 100 01 |
| 18 | 100 10 |
| 19 | 100 11 |
| 20 | 101 00 |
| 21 | 101 01 |
| 22 | 101 10 |
| 23 | 101 11 |
| 24 | 110 00 |
| 25 | 110 01 |
| 26 | 110 10 |
| 27 | 110 11 |
| 28 | 111 00 |
| 29 | 111 01 |
| 30 | 111 10 |
| 31 | 111 11 |

→

| GRADATION VALUE (RGB) RESULTING FROM GRADATION PROCESSING (FIRST BIT IS ADDED TO SECOND BIT + FIRST AND LESS SIGNIFICANT BITS ARE DISCARDED) ||
|---|---|
| GRADATION | 3-BIT DATA |
| 0 | 000 |
| 1 | 001 |
| 2 | 010 |
| 3 | 011 |
| 4 | 100 |
| 5 | 101 |
| 6 | 110 |
| 7 | 111 |
| 7 | 111 |

FIG.26

| IMAGE SIGNAL GRADATION VALUE | |
|---|---|
| GRADATION | 8-BIT DATA |
| 0 | 0000 0000 |
| 7 | 0000 0111 |
| 8 | 0000 1000 |
| 15 | 0000 1111 |
| 16 | 0001 0000 |
| 23 | 0001 0111 |
| 24 | 0001 1000 |
| 31 | 0001 1111 |
| 32 | 0010 0000 |
| 39 | 0010 0111 |
| 40 | 0010 1000 |
| 47 | 0010 1111 |
| 48 | 0011 0000 |
| 55 | 0011 0111 |
| 56 | 0011 1000 |
| 63 | 0011 1111 |
| 64 | 0100 0000 |
| 71 | 0100 0111 |
| 72 | 0100 1000 |
| 79 | 0100 1111 |
| 80 | 0101 0000 |
| 87 | 0101 0111 |
| 88 | 0101 1000 |
| 95 | 0101 1111 |
| 96 | 0110 0000 |
| 103 | 0110 0111 |
| 104 | 0110 1000 |
| 111 | 0110 1111 |
| 112 | 0111 0000 |
| 119 | 0111 0111 |
| 120 | 0111 1000 |
| 127 | 0111 1111 |
| 128 | 1000 0000 |
| 135 | 1000 0111 |
| 136 | 1000 1000 |
| 143 | 1000 1111 |
| 144 | 1001 0000 |
| 151 | 1001 0111 |
| 152 | 1001 1000 |
| 159 | 1001 1111 |
| 160 | 1010 0000 |
| 167 | 1010 0111 |
| 168 | 1010 1000 |
| 175 | 1010 1111 |
| 176 | 1011 0000 |
| 183 | 1011 0111 |
| 184 | 1011 1000 |
| 191 | 1011 1111 |
| 192 | 1100 0000 |
| 199 | 1100 0111 |
| 200 | 1100 1000 |
| 207 | 1100 1111 |
| 208 | 1101 0000 |
| 215 | 1101 0111 |
| 216 | 1101 1000 |
| 223 | 1101 1111 |
| 224 | 1110 0000 |
| 231 | 1110 0111 |
| 232 | 1110 1000 |
| 239 | 1110 1111 |
| 240 | 1111 0000 |
| 247 | 1111 0111 |
| 248 | 1111 1000 |
| 255 | 1111 1111 |

⇒

| GRADATION VALUE (W) RESULTING FROM IMAGE PROCESSING | |
|---|---|
| GRADATION | 5-BIT DATA |
| 0 | 000 00 |
| 1 | 000 01 |
| 2 | 000 10 |
| 3 | 000 11 |
| 4 | 001 00 |
| 5 | 001 01 |
| 6 | 001 10 |
| 7 | 001 11 |
| 8 | 010 00 |
| 9 | 010 01 |
| 10 | 010 10 |
| 11 | 010 11 |
| 12 | 011 00 |
| 13 | 011 01 |
| 14 | 011 10 |
| 15 | 011 11 |
| 16 | 100 00 |
| 17 | 100 01 |
| 18 | 100 10 |
| 19 | 100 11 |
| 20 | 101 00 |
| 21 | 101 01 |
| 22 | 101 10 |
| 23 | 101 11 |
| 24 | 110 00 |
| 25 | 110 01 |
| 26 | 110 10 |
| 27 | 110 11 |
| 28 | 111 00 |
| 29 | 111 01 |
| 30 | 111 10 |
| 31 | 111 11 |

⇒

| GRADATION VALUE (W) RESULTING FROM GRADATION PROCESSING (ZEROTH BIT IS ADDED TO SECOND BIT + FIRST AND LESS SIGNIFICANT BITS ARE DISCARDED) | |
|---|---|
| GRADATION | 3-BIT DATA |
| 0 | 000 |
| 1 | 001 |
| 0 | 000 |
| 1 | 001 |
| 1 | 001 |
| 2 | 010 |
| 1 | 001 |
| 2 | 010 |
| 2 | 010 |
| 3 | 011 |
| 2 | 010 |
| 3 | 011 |
| 3 | 011 |
| 4 | 100 |
| 3 | 011 |
| 4 | 100 |
| 4 | 100 |
| 5 | 101 |
| 4 | 100 |
| 5 | 101 |
| 5 | 101 |
| 6 | 110 |
| 5 | 101 |
| 6 | 110 |
| 6 | 110 |
| 7 | 111 |
| 6 | 110 |
| 7 | 111 |
| 7 | 111 |
| 7 | 111 |
| 7 | 111 |
| 7 | 111 |

FIG.27

| GRADATION VALUE (RGB) RESULTING FROM GRADATION PROCESSING ×2 | GRADATION VALUE (W) RESULTING FROM GRADATION PROCESSING | GRADATION VALUE (RGB) RESULTING FROM GRADATION PROCESSING ×2 + GRADATION VALUE (W) RESULTING FROM GRADATION PROCESSING | DISPLAY GRADATION VALUE | |
|---|---|---|---|---|
| 0 | 0 | 0 | 0.00 | A |
|   | 1 | 1 | 0.33 | B |
|   | 0 | 2 | 0.67 | C |
| 2 | 1 | 3 | 1.00 | D |
|   | 1 | 3 | 1.00 | D |
|   | 2 | 4 | 1.33 | E |
|   | 1 | 5 | 1.67 | F |
| 4 | 2 | 6 | 2.00 | G |
|   | 2 | 6 | 2.00 | G |
|   | 3 | 7 | 2.33 | H |
|   | 2 | 8 | 2.67 | I |
| 6 | 3 | 9 | 3.00 | J |
|   | 3 | 9 | 3.00 | J |
|   | 4 | 10 | 3.33 | K |
|   | 3 | 11 | 3.67 | L |
| 8 | 4 | 12 | 4.00 | M |
|   | 4 | 12 | 4.00 | M |
|   | 5 | 13 | 4.33 | N |
|   | 4 | 14 | 4.67 | O |
| 10 | 5 | 15 | 5.00 | P |
|   | 5 | 15 | 5.00 | P |
|   | 6 | 16 | 5.33 | Q |
|   | 5 | 17 | 5.67 | R |
| 12 | 6 | 18 | 6.00 | S |
|   | 6 | 18 | 6.00 | S |
|   | 7 | 19 | 6.33 | T |
|   | 6 | 20 | 6.67 | U |
| 14 | 7 | 21 | 7.00 | V |
|   | 7 | 21 | 7.00 | V |
|   | 7 | 21 | 7.00 | V |
|   | 7 | 21 | 7.00 | V |
| 14 | 7 | 21 | 7.00 | V |

DISPLAY DEVICE

CROSS-REFERENCE TO RELATED APPLICATION

This application claims the benefit of priority from Japanese Patent Application No. 2019-039935 filed on Mar. 5, 2019 and International Patent Application No. PCT/JP2020/009516 filed on Mar. 5, 2020, the entire contents of which are incorporated herein by reference.

BACKGROUND

1. Technical Field

What is disclosed herein relates to a display device.

2. Description of the Related Art

It is known that there are liquid crystal display panels including liquid crystal display elements serving as display elements and organic EL display panels including organic light emitting diodes (OLED) serving as display elements, for example. It is also known that there are display devices with, among such display panels, what is called an RGBW display panel including W (white) pixels besides the conventional R (red), G (green), and B (blue) sub-pixels to increase the luminance, for example (refer to Japanese Patent Application Laid-open Publication No. 2002-149116 (JP-A-2002-149116), for example).

With an improvement in display quality, the bit depth of video signals, that is, the number of gradations increases, and display devices are expected to perform higher gradation expression. Display devices, however, fail to perform higher gradation expression than the display gradation of the display panel because gradation expression performed by the display devices depends on the display gradation of the display panel.

For the foregoing reasons, there is a need for a display device capable of performing higher gradation expression than the display gradation of a display panel.

SUMMARY

According to aspect, a display device includes: a display panel including a plurality of first pixels configured to display a first color, a plurality of second pixels configured to display a second color, a plurality of third pixels configured to display a third color, and a plurality of fourth pixels configured to display a fourth color; and a signal processor configured to convert an image signal including gradation data of the first color, the second color, and the third color into a first signal including gradation data of the first color, the second color, and the third color and a second signal including a gradation datum of the fourth color and output the first signal and the second signal. When the gradation data of the image signal have the same value, output signals output from the signal processor include an output signal in which the gradation data of the first signal and the gradation datum of the second signal have the same value and an output signal in which the gradation data of the first signal and the gradation datum of the second signal have values different from each other by 1.

BRIEF DESCRIPTION OF THE DRAWINGS

FIG. 4 is a diagram of an example of a process of gradation processing performed by a second bit arithmetic unit according to the first embodiment;

FIG. 11 is a diagram of an example of a process of gradation processing performed by the first bit arithmetic unit according to the second embodiment;

FIG. 12 is a diagram of an example of a process of gradation processing performed by the second bit arithmetic unit according to the second embodiment;

FIG. 16C is a diagram of a display pattern of the R sub-pixels, the G sub-pixels, the B sub-pixels, and the W sub-pixels indicated by C in FIGS. 13 and 14;

FIG. 16D is a diagram of a display pattern of the R sub-pixels, the G sub-pixels, the B sub-pixels, and the W sub-pixels indicated by D in FIGS. 13 and 14;

FIG. 16E is a diagram of a display pattern of the R sub-pixels, the G sub-pixels, the B sub-pixels, and the W sub-pixels indicated by E in FIGS. 13 and 14;

FIG. 16G is a diagram of a display pattern of the R sub-pixels, the G sub-pixels, the B sub-pixels, and the W sub-pixels indicated by G in FIGS. 13 and 14;

FIG. 16H is a diagram of a display pattern of the R sub-pixels, the G sub-pixels, the B sub-pixels, and the W sub-pixels indicated by H in FIGS. 13 and 14;

FIG. 18 is a diagram of an example of a process of gradation processing performed by the first bit arithmetic unit according to the third embodiment;

FIG. 19 is a diagram of an example of a process of gradation processing performed by the second bit arithmetic unit according to the third embodiment;

FIG. 25 is a diagram of an example of a process of gradation processing performed by the first bit arithmetic unit according to the fourth embodiment;

FIG. 26 is a diagram of an example of a process of gradation processing performed by the second bit arithmetic unit according to the fourth embodiment;

FIG. 27 is a diagram of the display gradation values visually recognized on the display panel according to the fourth embodiment;

DETAILED DESCRIPTION

Figure 1:
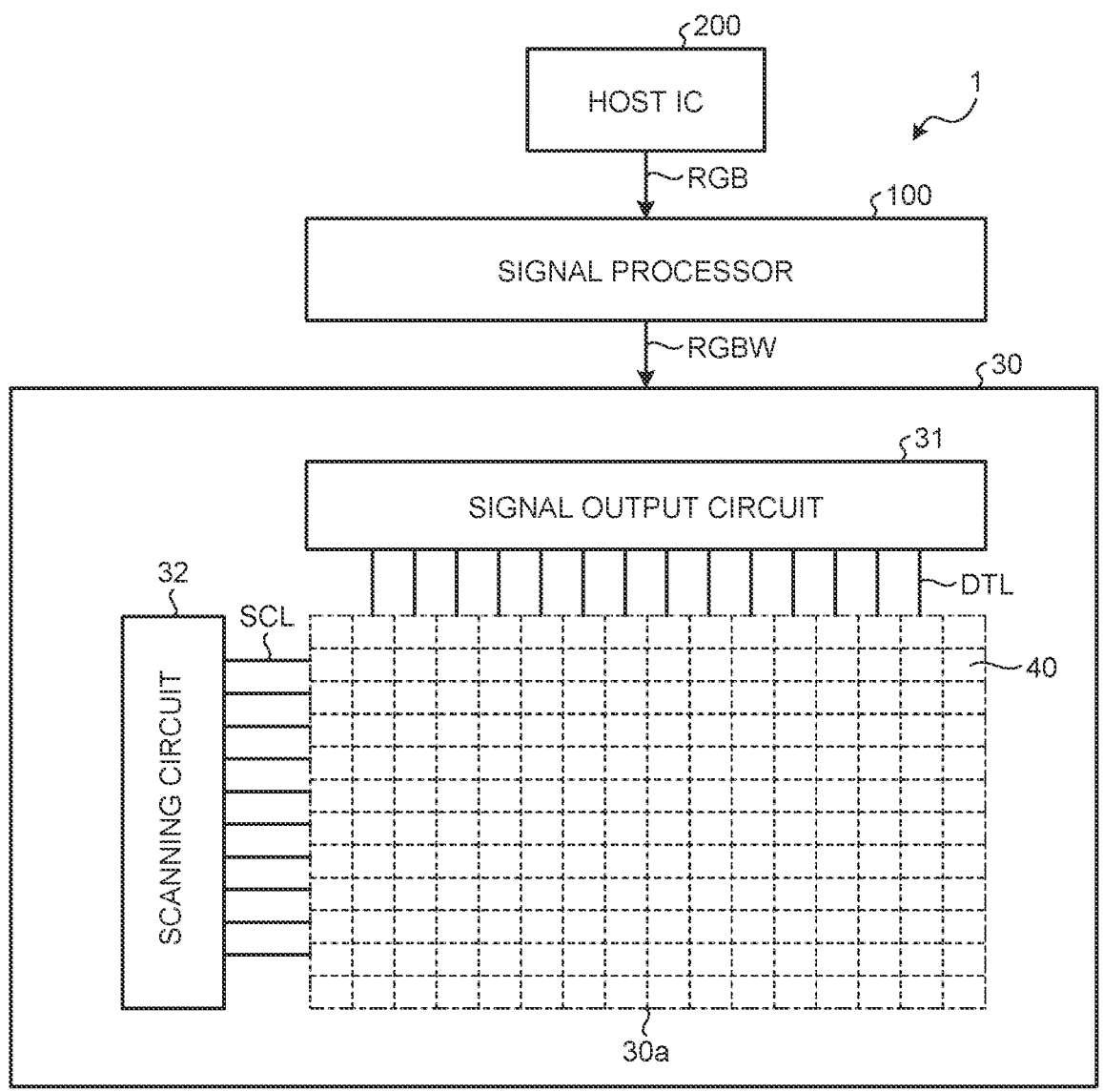
FIG. 1 is a block diagram of an example of the configuration of a display device according to a first embodiment.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. The present disclosure is given by way of example only, and appropriate changes made without departing from the spirit of the present disclosure and easily conceivable by those skilled in the art naturally fall within the scope of the disclosure. To simplify the explanation, the drawings may possibly illustrate the width, the thickness, the shape, and other elements of each unit more schematically than the actual aspect. These elements, however, are given by way of example only and are not intended to limit interpretation of the present disclosure. In the present specification and the figures, components similar to those previously described with reference to previous figures are denoted by the same reference numerals, and detailed explanation thereof may be appropriately omitted.

First Embodiment

FIG. 1 is a block diagram of an example of the configuration of a display device according to a first embodiment. As illustrated in FIG. 1, a display device 1 according to the first embodiment includes a signal processor 100 and a display panel 30.

The display panel 30 has a display region 30*a* in which pixels 40 are arrayed in a two-dimensional matrix (row-column configuration). The display panel 30 according to the present embodiment is a liquid crystal display panel including liquid crystal display elements serving as display elements forming the pixels 40, for example. The display panel 30 may be an organic EL display panel including organic light emitting diodes (OLED) serving as display elements or an inorganic EL display including inorganic light emitting diodes (micro LED) serving as display elements, for example. An aspect of the display elements forming the pixels 40 is not intended to limit the present disclosure.

The pixel 40 is composed of a plurality of sub-pixels including a W (white) sub-pixel (fourth pixel) besides the sub-pixels in the three primary colors of an R (red) sub-pixel (first pixel), a G (green) sub-pixel (second pixel), and a B (blue) sub-pixel (third pixel). The sub-pixels constituting the pixel 40 will be described later.

The display panel 30 includes a signal output circuit 31 and a scanning circuit 32. The signal output circuit 31 is electrically coupled to the sub-pixels included in the pixels 40 via signal lines DTL. The signal output circuit 31 sequentially outputs output signals to the sub-pixels included in the pixels 40. The scanning circuit 32 is electrically coupled to the sub-pixels included in the pixels 40 via scanning lines SCL. The scanning circuit 32 selects the sub-pixels included in the pixels 40 and controls turning on and off switching elements (e.g., thin film transistors (TFT)) that control operations of the sub-pixels.

The display panel 30 has display gradation of the predetermined number of bits for each of the R (red) sub-pixel (first pixel), the G (green) sub-pixel (second pixel), the B (blue) sub-pixel (third pixel), and the W (white) sub-pixel (fourth pixel). The present embodiment describes an example where the display gradation of the display panel 30 is 256 gradations, that is, the display panel 30 can perform gradation expression with 8-bit depth; however, the display gradation of the display panel 30 is not limited to 256 gradations.

In the present embodiment, the ratio of the display luminance of the R (red) sub-pixel (first pixel), the G (green) sub-pixel (second pixel), and the B (blue) sub-pixel (third pixel) to the display luminance of the W (white) sub-pixel (fourth pixel) is 1:1. In other words, when the luminance to display white in one pixel is expressed as "1", the luminance of the R (red) sub-pixel (first pixel), the G (green) sub-pixel (second pixel), and the B (blue) sub-pixel (third pixel) is expressed as "0.5", and the luminance of the W (white) sub-pixel (fourth pixel) is expressed as "0.5".

Figure 2:
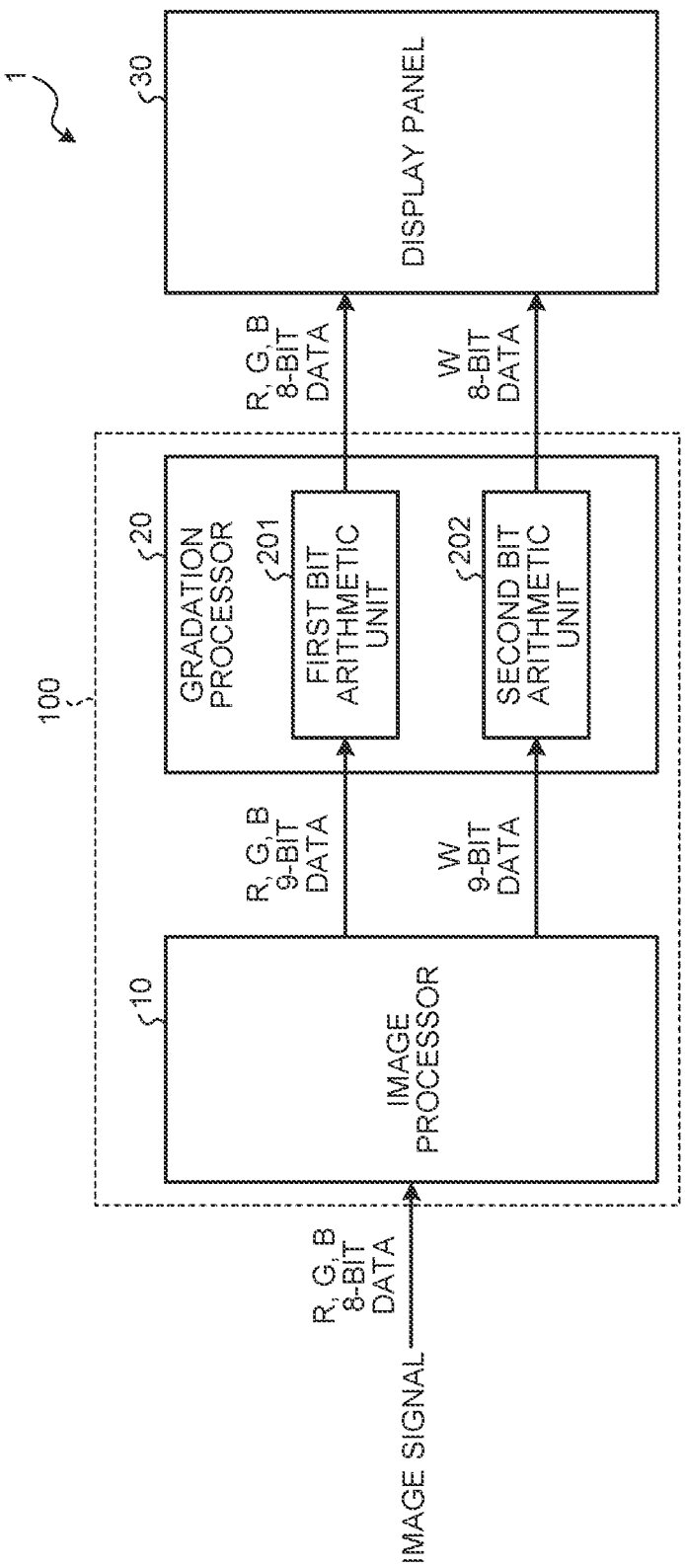
FIG. 2 is a block diagram of an example of the configuration of a signal processor according to the first embodiment.

FIG. 2 is a block diagram of an example of the configuration of the signal processor according to the first embodiment. The signal processor 100 includes an image processor 10 and a gradation processor 20.

The signal processor 100 receives image signals including gradation data of the three primary colors of R (red), G (green), and B (blue) from a host IC 200 serving as a host system. While the present embodiment describes an example where the gradation data of the three primary colors of R (red), G (green), and B (blue) in the image signals are data with 8-bit depth per sub-pixel, the gradation data of the image signals are not limited to 8-bit depth data.

The image processor 10 converts the received image signal including 8-bit depth gradation data of R (red), G (green), and B (blue) into RGB signals (first signal) including 9-bit depth gradation data of R (red), G (green), and B (blue) and a W signal (second signal) including a 9-bit depth gradation datum of W (white). To perform image conversion by the image processor 10, a publicly known method described in JP-A-2002-149116 may be used, for example. The method for performing image conversion by the image processor 10 is not intended to limit the present disclosure.

Specifically, if the gradation data of the image signal have 8-bit depth, for example, the image processor 10 adds a 1-bit datum corresponding to a fraction generated by internal arithmetic processing, such as decompression, to each of the gradation data of R (red), G (green), B (blue), and W (white) as the least significant bit. As a result, the image processor 10 outputs 9-bit depth RGB signals (first signal) and a 9-bit depth W signal (second signal) the bit depth of each of which has been increased.

The gradation processor 20 includes a first bit arithmetic unit 201 and a second bit arithmetic unit 202. The first bit arithmetic unit 201 performs first bit arithmetic processing, which will be described later, on the 9-bit depth RGB signals output from the image processor 10 to generate and output 8-bit depth RGB signals. The second bit arithmetic unit 202 performs second bit arithmetic processing, which will be described later, on the 9-bit depth W signals output from the image processor 10 to generate and output 8-bit depth W signals.

The following describes an example of signal processing performed by the display device 1 according to the first embodiment with reference to FIGS. 3 to 6.

Figure 3:
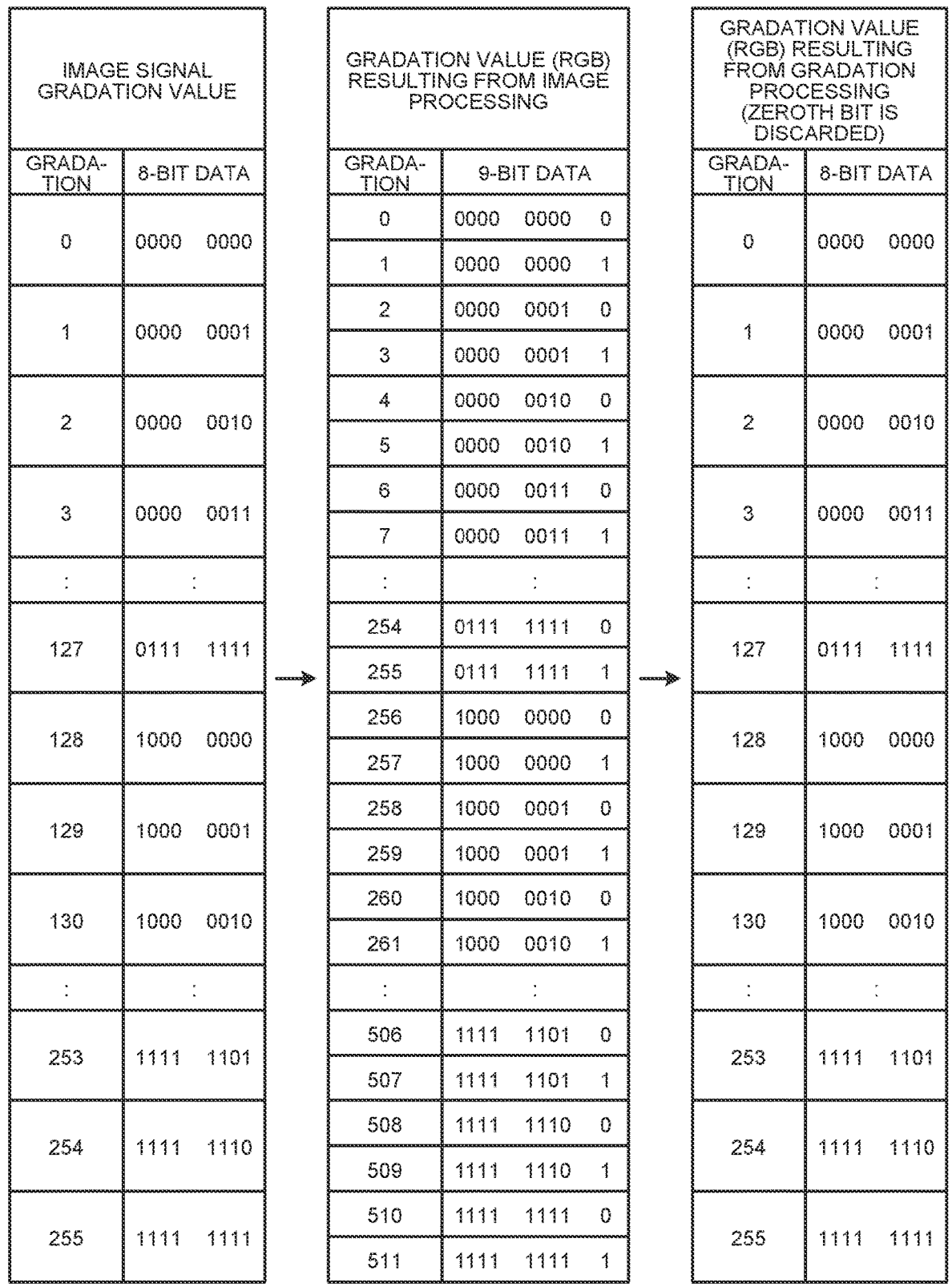
FIG. 3 is a diagram of an example of a process of gradation processing performed by a first bit arithmetic unit according to the first embodiment.
Figure 5:
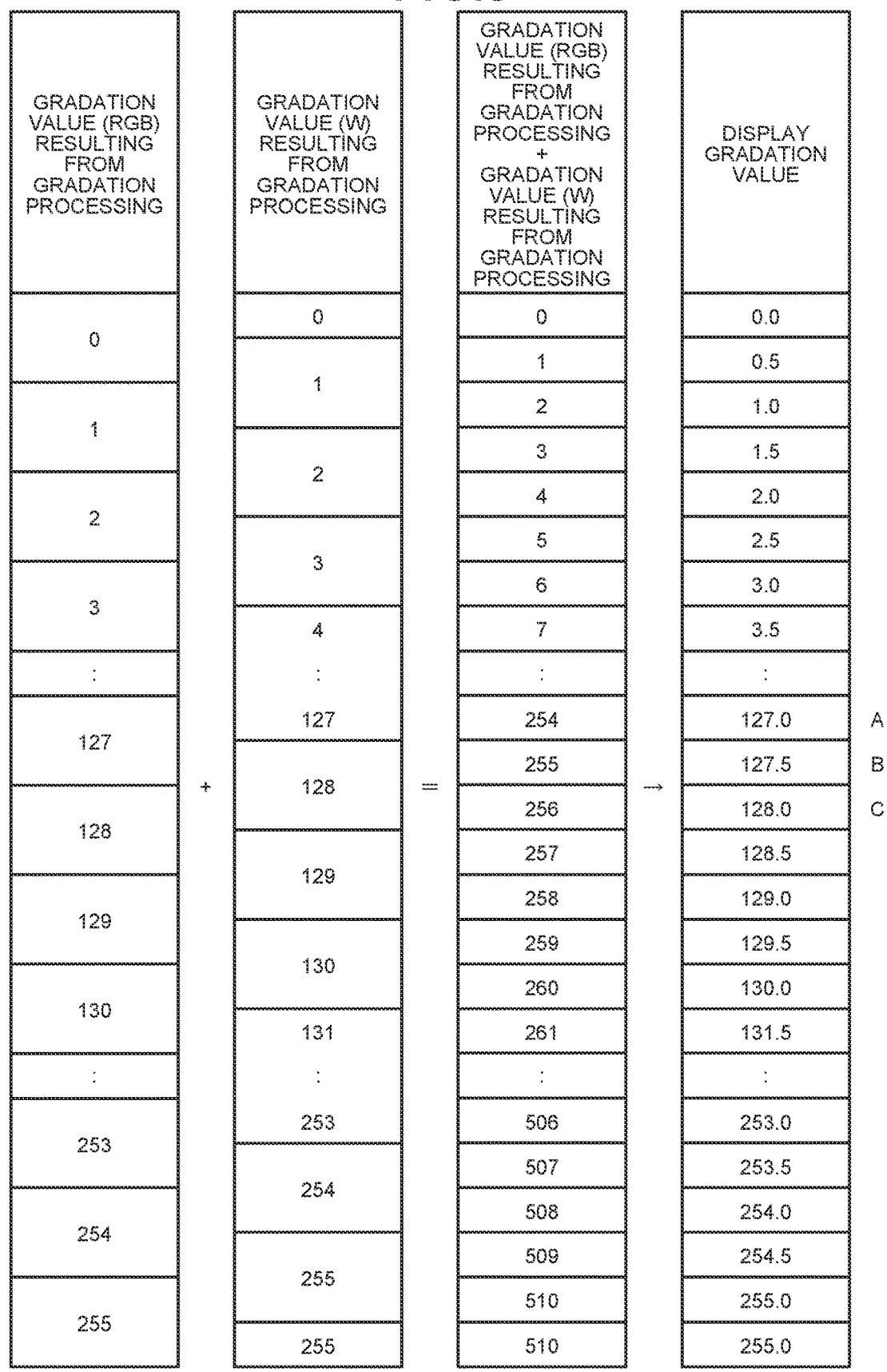
FIG. 5 is a diagram of display gradation values visually recognized on a display panel according to the first embodiment.
Figure 6:
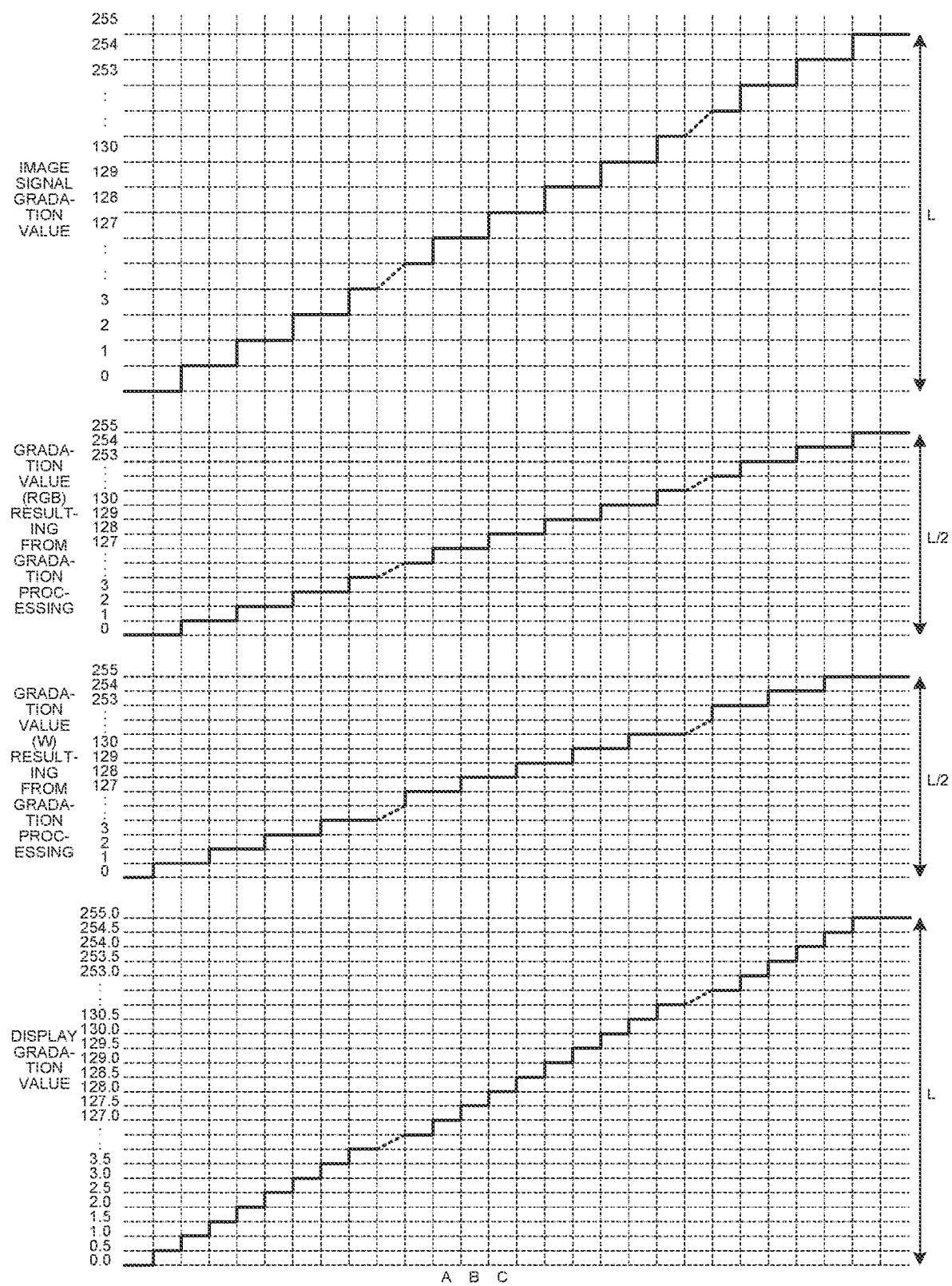
FIG. 6 is a diagram schematically illustrating the relation between the gradation at each part in the display device according to the first embodiment and the display gradation values visually recognized on the display panel.

FIG. 3 is a diagram of an example of a process of gradation processing performed by the first bit arithmetic unit according to the first embodiment. FIG. 4 is a diagram of an example of a process of gradation processing performed by the second bit arithmetic unit according to the first embodiment. FIG. 5 is a diagram of display gradation values visually recognized on the display panel according to the first embodiment. FIG. 6 is a diagram schematically illustrating the relation between the gradation at parts in the display device according to the first embodiment and the display gradation values visually recognized on the display panel.

As illustrated in FIGS. 3 and 4, the number of bits of each of the gradation data of R (red), G (green), and B (blue) included in the image signal received by the signal processor 100 is increased in the process of image processing, such as decompression, performed by the image processor 10. The first embodiment describes a case where the respective 8-bit depth (256 gradations) gradation data of R (red), G (green), and B (blue) received by the image processor 10 are converted into RGB signals including 9-bit depth (512 gradations) gradation data of R (red), G (green), and B (blue) and a W signal including a 9-bit depth (512 gradations) gradation datum of W (white). The RGB signals converted into the 9-bit depth (512 gradations) gradation data are received by the first bit arithmetic unit 201 of the gradation processor 20. The W signal converted into the 9-bit depth (512 gradations) gradation datum is received by the second bit arithmetic unit 202 of the gradation processor 20. The least significant bit of the 9-bit depth gradation datum is referred to as the "zeroth bit", and the most significant bit is referred to as the "eighth bit". As illustrated in FIGS. 3 and 4, the value of the zeroth bit in each of the gradation data of the RGB signals and the gradation datum of the W signal resulting from image processing performed by the image processor 10 can be "0" or "1".

The first bit arithmetic unit 201 of the gradation processor 20 converts the 9-bit depth (512 gradations) gradation data of the RGB signals into 8-bit depth (256 gradations) gradation data. Specifically, as illustrated in FIG. 3, the first bit arithmetic unit 201 discards the zeroth bit (least significant bit) of each of the 9-bit depth (512 gradations) gradation data of R (red), G (green), and B (blue) to generate the 8-bit depth gradation data and outputs them to the display panel 30.

The second bit arithmetic unit 202 of the gradation processor 20 converts the 9-bit depth (512 gradations) gradation data of the W signals into 8-bit depth (256 gradations) gradation data. Specifically, as illustrated in FIG. 4, the second bit arithmetic unit 202 adds a data value of "1" to the 9-bit depth (512 gradations) gradation datum of W (white). Subsequently, the second bit arithmetic unit 202 discards the zeroth bit (least significant bit) to generate the 8-bit depth gradation datum and outputs it to the display panel 30. In the gradation processing, the second bit arithmetic unit 202 of the gradation processor 20 does not add a data value of "1" to the 9-bit depth (512 gradations) gradation datum "111111111" of the W signal resulting from the image processing performed by the image processor 10 (refer to the asterisk in FIG. 4). This mechanism can prevent bit overflow.

In the following description, the processing performed by the first bit arithmetic unit 201 and the second bit arithmetic unit 202 of the gradation processor 20 is simply referred to as "gradation processing".

When the gradation data of the RGB signals (first signal) and the gradation datum of the W signal (second signal) of the image signal prior to the gradation processing have the same value, output signals resulting from the gradation processing by the gradation processor 20 include an output signal in which the gradation data of the RGB signals (first signal) and the gradation datum of the W signal (second signal) have the same value and an output signal in which the gradation data of the RGB signals (first signal) and the gradation datum of the W signal (second signal) have values different from each other by 1. If the gradation data of the RGB signals (first signal) and the gradation datum of the W signal (second signal) resulting from the gradation processing have values different from each other by 1, the intermediate values of the gradation values can be expressed on the display panel 30 capable of performing gradation expression with 8-bit depth, that is, 256 gradations. Specifically, intermediate values of 8-bit depth (256 gradations) can be expressed. Consequently, the display device 1 enables apparent gradation visually recognized on the display panel 30, which can perform gradation expression with 8-bit depth (256 gradations), to have 511 levels.

As illustrated in FIGS. 5 and 6, if the gradation value of each of the gradation data of R (red), G (green), and B (blue) resulting from the gradation processing is "127", and the gradation value of the gradation datum of W (white) resulting from the gradation processing is "127", the sum of the gradation value "127" of the gradation datum of each of R (red), G (green), and B (blue) and the gradation value "127" of the gradation datum of W (white) resulting from the gradation processing is "254". In this case, the apparent display gradation value of an image displayed on the display panel 30 capable of performing gradation expression with 8-bit depth (256 gradations) is "127.0" (refer to A in FIGS. 5 and 6).

As illustrated in FIGS. 5 and 6, if the gradation value of each of the gradation data of R (red), G (green), and B (blue) resulting from the gradation processing is "127", and the gradation value of the gradation datum of W (white) resulting from the gradation processing is "128", the sum of the gradation value "127" of the gradation datum of each of R (red), G (green), and B (blue) and the gradation value "128" of the gradation datum of W (white) resulting from the gradation processing is "255". In this case, the apparent display gradation value of an image displayed on the display panel 30 capable of performing gradation expression with 8-bit depth (256 gradations) is "127.5" (refer to B in FIGS. 5 and 6).

As illustrated in FIGS. 5 and 6, if the gradation value of each of the gradation data of R (red), G (green), and B (blue) resulting from the gradation processing is "128", and the gradation value of the gradation datum of W (white) resulting from the gradation processing is "128", the sum of the gradation value "128" of the gradation datum of each of R (red), G (green), and B (blue) and the gradation value "128" of the gradation datum of W (white) resulting from the gradation processing is "256". In this case, the apparent display gradation value of an image displayed on the display panel 30 capable of performing gradation expression with 8-bit depth (256 gradations) is "128.0" (refer to C in FIGS. 5 and 6).

As described above, the display device 1 of the present embodiment can express the intermediate values of the gradation values on the display panel 30 capable of performing gradation expression with 8-bit depth (256 gradations). Consequently, the display device 1 enables apparent gradation visually recognized on the display panel 30 to have 511 levels.

Figure 7:
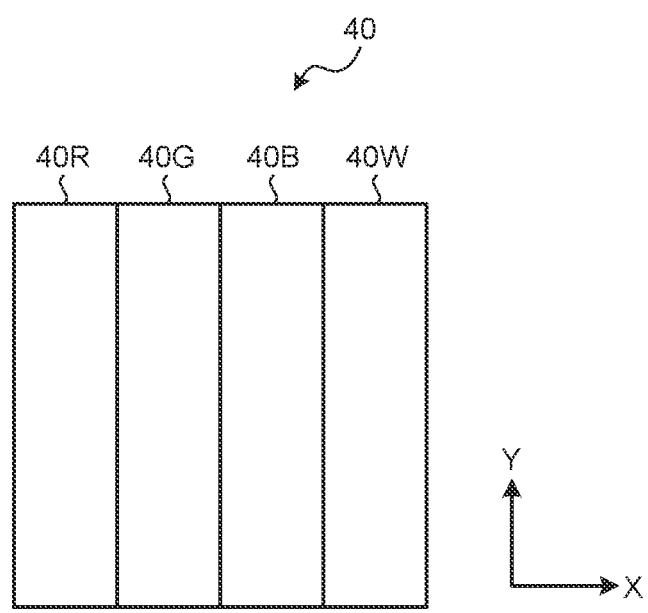
FIG. 7 is a diagram of an example of the pixel configuration of the display panel according to the first embodiment.

FIG. 7 is a diagram of an example of the pixel configuration of the display panel according to the first embodiment.

In the display region of the display panel 30 according to the present embodiment, a plurality of pixels 40 illustrated in FIG. 7 are arrayed in an X-direction and a Y-direction.

The pixel 40 includes an R (red) sub-pixel 40R (first pixel), a G (green) sub-pixel 40G (second pixel), a B (blue) sub-pixel 40B (third pixel), and a W (white) sub-pixel 40W (fourth pixel). The display gradation of the sub-pixels 40R, 40G, 40B, and 40W is 256 gradations, that is, the sub-pixels 40R, 40G, 40B, and 40W can perform gradation expression with 8-bit depth.

Figure 8A:
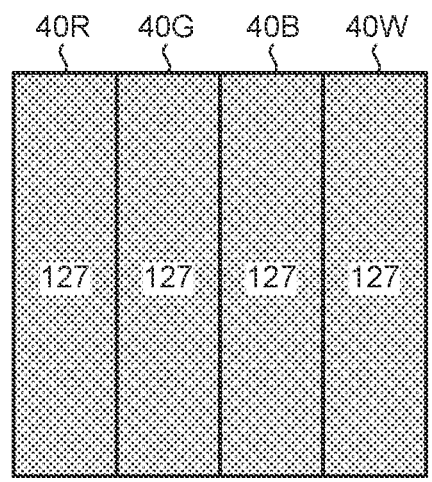
FIG. 8A is a diagram of a display pattern of an R sub-pixel, a G sub-pixel, a B sub-pixel, and a W sub-pixel indicated by A in FIGS. 5 and 6.
Figure 8B:
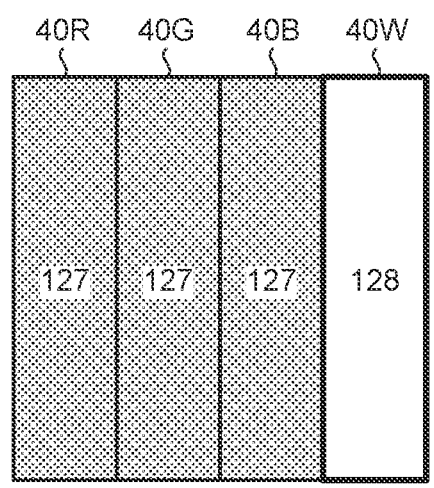
FIG. 8B is a diagram of a display pattern of the R sub-pixel, the G sub-pixel, the B sub-pixel, and the W sub-pixel indicated by B in FIGS. 5 and 6.
Figure 8C:
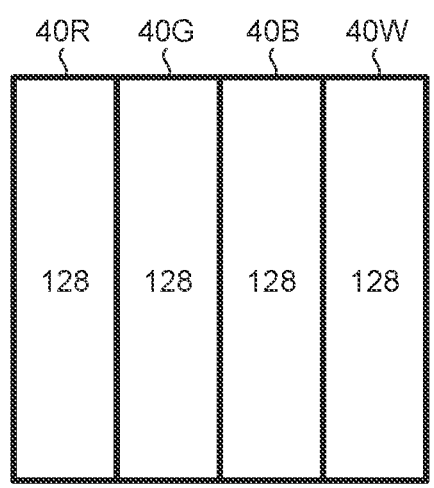
FIG. 8C is a diagram of a display pattern of the R sub-pixel, the G sub-pixel, the B sub-pixel, and the W sub-pixel indicated by C in FIGS. 5 and 6.

FIG. 8A is a diagram of a display pattern of the R sub-pixel, the G sub-pixel, the B sub-pixel, and the W sub-pixel indicated by A in FIGS. 5 and 6. FIG. 8B is a diagram of a display pattern of the R sub-pixel, the G sub-pixel, the B sub-pixel, and the W sub-pixel indicated by B in FIGS. 5 and 6. FIG. 8C is a diagram of a display pattern of the R sub-pixel, the G sub-pixel, the B sub-pixel, and the W sub-pixel indicated by C in FIGS. 5 and 6. In the examples illustrated in FIGS. 8A to 8C, the ratio of the display luminance of the R sub-pixel 40R, the G sub-pixel 40G, and the B sub-pixel 40B to the display luminance of the W sub-pixel 40W is 1:1.

In the examples illustrated in FIGS. 8A to 8C, the display gradation of the hatched sub-pixels is "127", and the display gradation of the outlined sub-pixels is "128".

In a display pattern A illustrated in FIG. 8A, the sum of a display gradation of "127" of the R sub-pixel 40R, the G sub-pixel 40G, and the B sub-pixel 40B and a display gradation of "127" of the W sub-pixel 40W is "254". In this case, the apparent display gradation value in the pixel 40 capable of performing gradation expression with 8-bit depth (256 gradations) is "127.0".

In a display pattern B illustrated in FIG. 8B, the sum of a display gradation of "127" of the R sub-pixel 40R, the G sub-pixel 40G, and the B sub-pixel 40B and a display gradation of "128" of the W sub-pixel 40W is "255". In this case, the apparent display gradation value in the pixel 40 capable of performing gradation expression with 8-bit depth (256 gradations) is "127.5".

In a display pattern C illustrated in FIG. 8C, the sum of a display gradation of "128" of the R sub-pixel 40R, the G sub-pixel 40G, and the B sub-pixel 40B and a display gradation of "128" of the W sub-pixel 40W is "256". In this case, the apparent display gradation value in the pixel 40 capable of performing gradation expression with 8-bit depth (256 gradations) is "128.0".

As described above, the first bit arithmetic unit 201 of the gradation processor 20 according to the present embodiment discards the zeroth bit of each of the 9-bit depth (512 gradations) gradation data of the RGB signals to generate the 8-bit depth (256 gradations) gradation data and outputs them to the display panel 30. The second bit arithmetic unit 202 of the gradation processor 20 adds a data value of "1" to the 9-bit depth (512 gradations) gradation datum of the W signal. Subsequently, the second bit arithmetic unit 202 discards the zeroth bit to generate the 8-bit depth (256 gradations) gradation datum and outputs it to the display panel 30. Consequently, the display device 1 enables apparent gradation visually recognized on the display panel 30 that has a display gradation number of 256, that is, that can perform gradation expression with 8-bit depth (256 gradations) to have 511 levels.

The first bit arithmetic unit 201 of the gradation processor 20 may add a data value of "1" to the respective 9-bit depth (512 gradations) gradation data of the RGB signals and discard the zeroth bit to generate the 8-bit depth (256 gradations) gradation data. The second bit arithmetic unit 202 of the gradation processor 20 may discard the zeroth bit of the 9-bit depth (512 gradations) gradation datum of the W signal to generate the 8-bit depth (256 gradations) gradation datum.

Modifications

Figure 9:
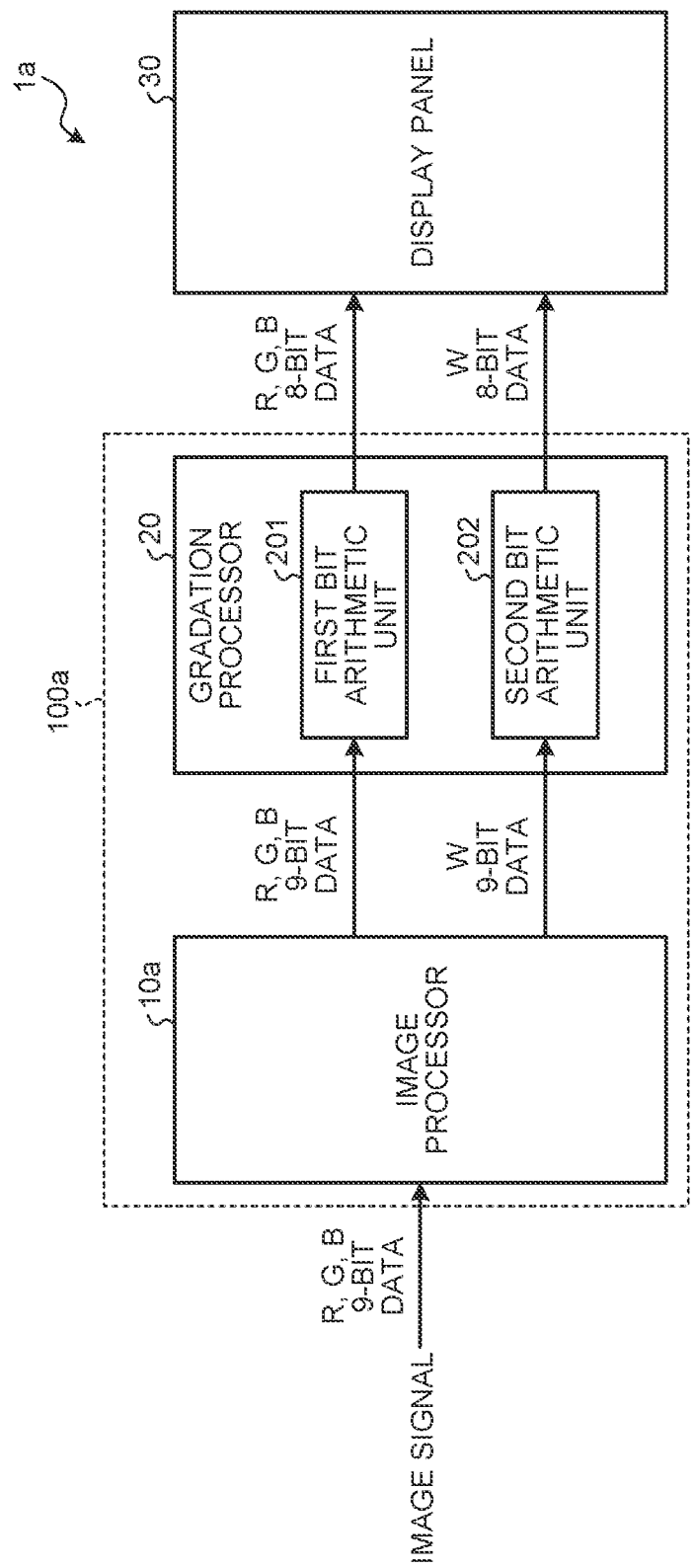
FIG. 9 is a block diagram of an example of the configuration of the signal processor according to a modification of the first embodiment.

FIG. 9 is a block diagram of an example of the configuration of the signal processor according to a modification of the first embodiment. In the modification of the first embodiment illustrated in FIG. 9, the respective gradation data of the three primary colors of R (red), G (green), and B (blue) in the image signal received by a signal processor 100a of a display device 1a are data with 9-bit depth per sub-pixel, for example.

In the modification of the first embodiment illustrated in FIG. 9, image conversion performed by an image processor 10a is not affected by a fraction generated by internal arithmetic processing, such as decompression. That is, in the modification of the first embodiment illustrated in FIG. 9, when the gradation data of the images signal have the same value, the respective 9-bit depth gradation data of the RGB signals (first signal) and the 9-bit depth gradation datum of the W signal (second signal) output from the image processor 10a have the same value. In this case, when the gradation data of the image signal are increased one step by one step, the 9-bit depth gradation data of the RGB signals (first signal) and the 9-bit depth gradation datum of the W signal (second signal) resulting from the gradation processing to be output from the gradation processor 20 are alternately increased. When the gradation data of the image signal are decreased one step by one step, the respective 9-bit depth gradation data of the RGB signals (first signal) and the 9-bit depth gradation datum of the W signal (second signal) resulting from the gradation processing to be output from the gradation processor 20 are alternately decreased.

In FIG. 9, the gradation data of the three primary colors of R (red), G (green), and B (blue) in the image signal received by the signal processor 100a of the display device 1a are data with 9-bit depth per sub-pixel, for example. The gradation data of the three primary colors of R (red), G (green), and B (blue) in the image signal may be data with 10 or more bit depth per sub-pixel.

As described above, the display devices 1 and 1a according to the first embodiment and the modification of the first embodiment each include the display panel 30 and the signal processor 100 or 100a. The display panel 30 includes the pixels 40 each including the W (white) sub-pixel 40W (fourth pixel) besides the sub-pixels in the three primary colors of the R (red) sub-pixel 40R (first pixel), the G (green) sub-pixel 40G (second pixel), and the B (blue) sub-pixel 40B (third pixel). The signal processors 100 and 100a convert an image signal including gradation data of R (red), G (green), and B (blue) into RGB signals (first signal) including gradation data of R (red), G (green), and B (blue) and a W signal (second signal) including a gradation datum of W (white), and output the converted signals. When the gradation data of the image signal have the same value, output signals output from each of the signal processors 100 and 100a include an output signal in which the respective gradation data of the RGB signals (first signal) and the gradation datum of the W signal (second signal) have the same value and an output signal in which the respective gradation data of the RGB signals (first signal) and the gradation datum of the W signal (second signal) have values different from each other by 1. The signal processors 100 and 100a each include the gradation processor 20 that converts the gradation data of the RGB signals (first signal) and the W signals (second signal) with a first bit depth (9-bit depth) into gradation data with a second bit depth (8-bit depth) smaller than the first bit depth.

In the configuration described above, the gradation processor 20 discards the zeroth bit of each of the first bit depth (9-bit depth) gradation data of the RGB signals (first signal) to generate the second bit depth (8-bit depth) gradation data. The gradation processor 20 adds 1 to the first bit depth (9-bit depth) gradation datum of the W signal (second signal) and discards the zeroth bit to generate the second bit depth (8-bit depth) gradation datum.

Alternatively, the gradation processor 20 adds 1 to each of the first bit depth (9-bit depth) gradation data of the RGB signals (first signal) and discards the zeroth bit to generate the second bit depth (8-bit depth) gradation data. The gradation processor 20 discards the zeroth bit of the first bit depth (9-bit depth) gradation datum of the W signal (second signal) to generate the second bit depth (8-bit depth) gradation datum.

With this configuration, the display devices 1 and 1a can express the intermediate values of the gradation values on the display panel 30 capable of performing gradation expression with the second bit depth (8-bit depth, that is, 256 gradations). Consequently, the display devices 1 and 1a can increase the number of apparent gradations visually recognized on the display panel 30. In other words, the display devices 1 and 1a can perform higher gradation expression than the display gradation of the display panel 30.

The present embodiment can provide the display devices 1 and 1a capable of performing higher gradation expression than the display gradation of the display panel 30.

The first embodiment describes a case where the ratio of the display luminance of the R (red) sub-pixel (first pixel), the G (green) sub-pixel (second pixel), and the B (blue) sub-pixel (third pixel) to the display luminance of the W (white) sub-pixel (fourth pixel) is 1:1. The ratio of the display luminance of the R (red) sub-pixel (first pixel), the G (green) sub-pixel (second pixel), and the B (blue) sub-pixel (third pixel) to the display luminance of the W (white) sub-pixel (fourth pixel) is not limited thereto and may be uneven, such as 1:0.5. Also in this case, increasing the gradation data of the image signal increases the display luminance, and decreasing the gradation data of the image signal decreases the display luminance. In other words, no inversion phenomenon in display luminance occurs with a change in the image signal.

Second Embodiment

Figure 10:
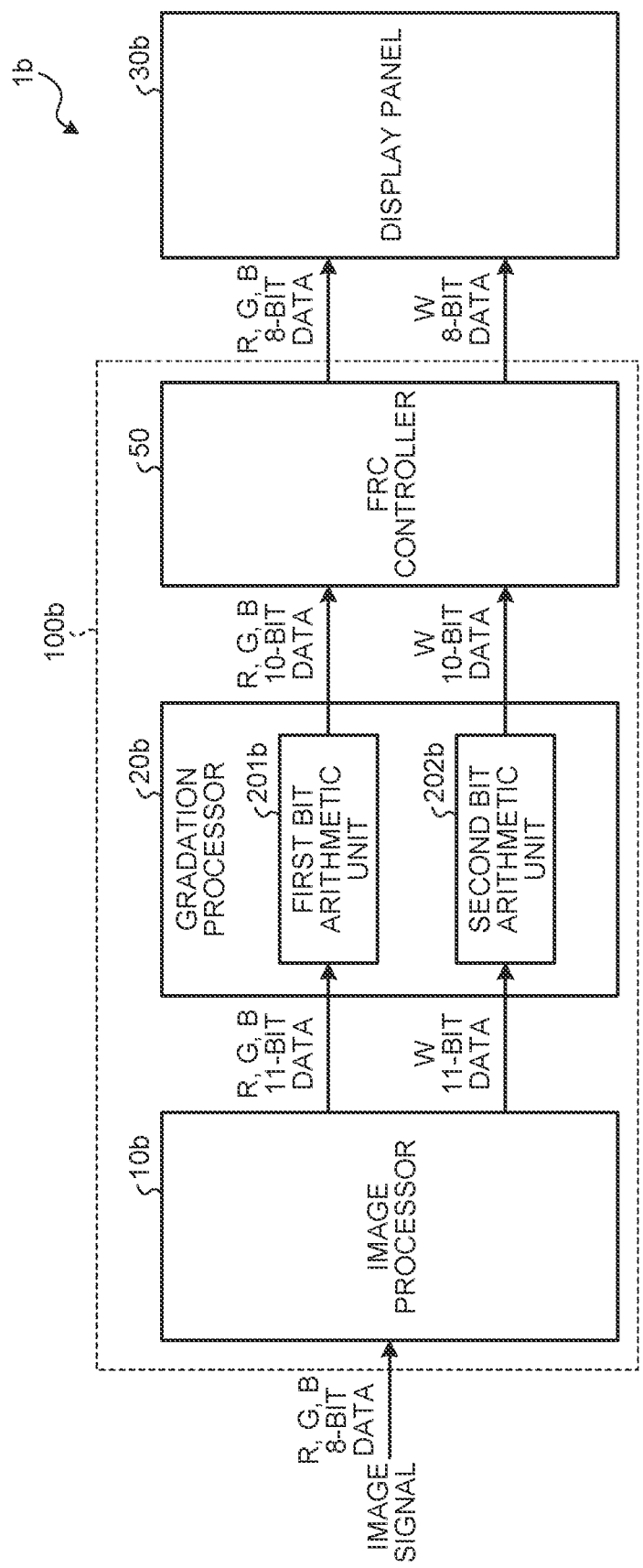
FIG. 10 is a block diagram of an example of the configuration of the signal processor according to a second embodiment.

FIG. 10 is a block diagram of an example of the configuration of the signal processor according to a second embodiment. A display device 1b according to the present embodiment performs frame rate control (FRC) processing of dividing an image of one frame into a plurality of sub-frames in a time-division manner and displaying the image. As illustrated in FIG. 10, the display device 1b according to the second embodiment includes an FRC controller 50 on the output side of a gradation processor 20b.

FRC processing may be performed by the FRC controller 50 using a publicly known method. The method for performing the FRC processing by the FRC controller 50 is not intended to limit the present disclosure. To display images by dividing an image of one frame into four sub-frames in a time-division manner, for example, the FRC controller 50 can extend gradation expression by 2 bits. In other words, if the display gradation of a display panel 30b is 256 gradations, that is, input signals displayable on the display panel 30b are 8-bit depth signals as illustrated in FIG. 10, the display device 1b can perform gradation expression with 10 bit depth (1024 gradations) by the FRC processing performed by the FRC controller 50.

An image processor 10b converts a received image signal including 8-bit depth gradation data of R (red), G (green), and B (blue) into RGB signals (first signal) including 11-bit depth gradation data of R (red), G (green), and B (blue) and a W signal (second signal) including an 11-bit depth gradation datum of W (white).

Specifically, the image processor 10b adds 3-bit data, as the least significant 3 bits, corresponding to a fraction generated by internal arithmetic processing, such as decompression, to each of the gradation data of R (red), G (green), B (blue), and W (white). As a result, the image processor 10b outputs 11-bit depth RGB signals (first signal) and an 11-bit depth W signal (second signal) the bit depth of each of which has been increased.

The following describes an example of signal processing performed by the display device 1b according to the second embodiment with reference to FIGS. 11 to 14.

Figure 13:
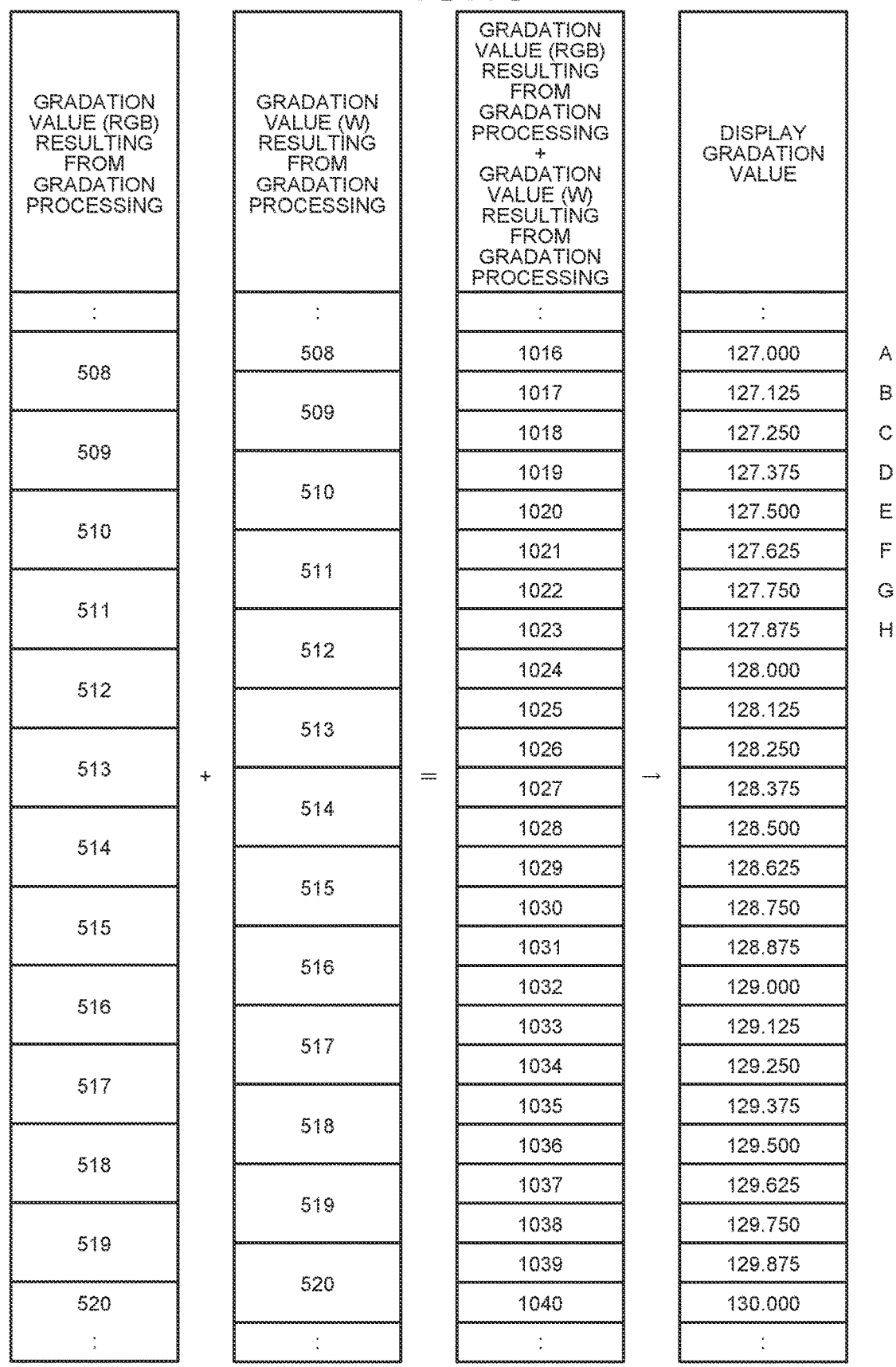
FIG. 13 is a diagram of the display gradation values visually recognized on the display panel according to the second embodiment.
Figure 14:
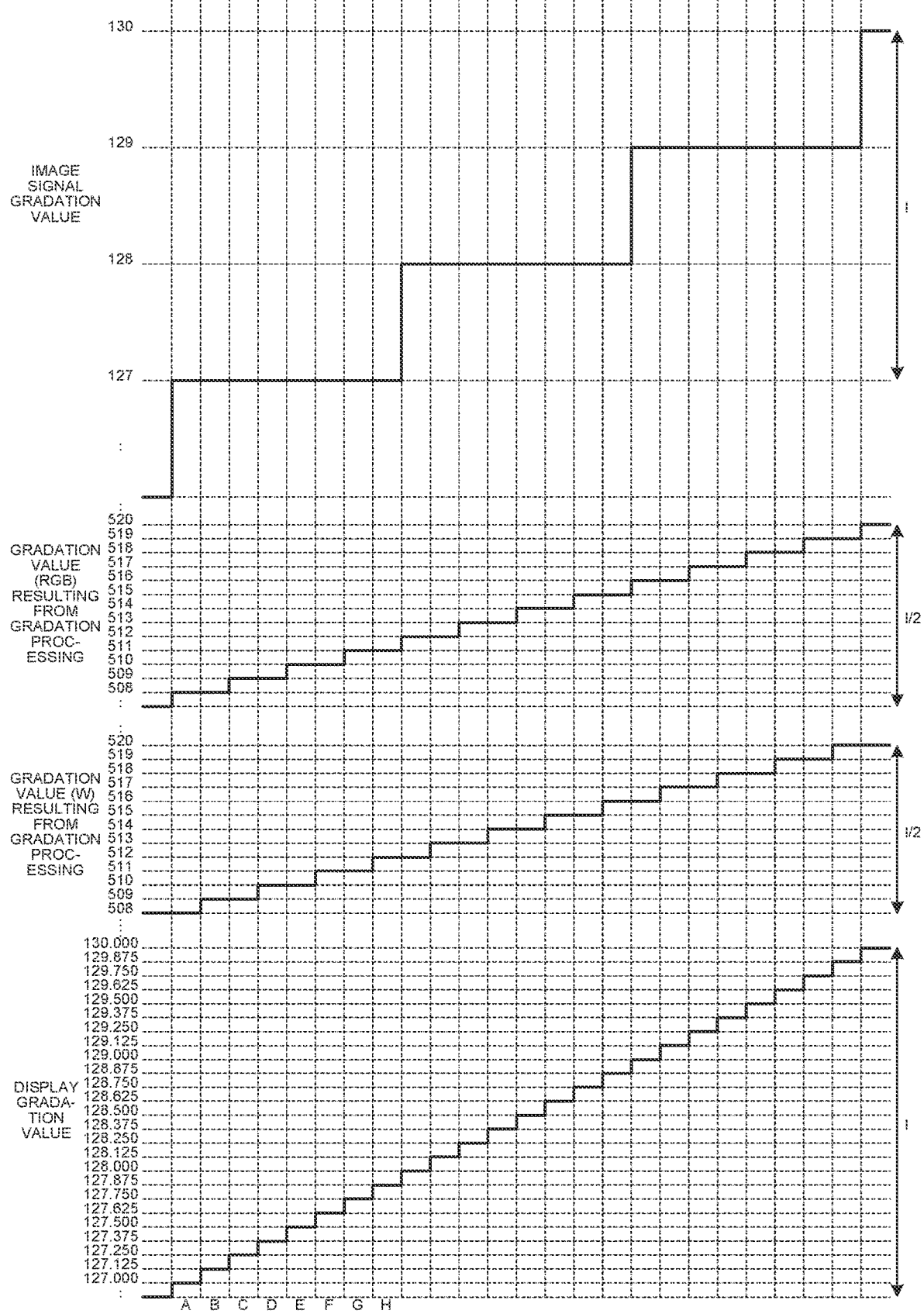
FIG. 14 is a diagram schematically illustrating the relation between the gradation at each part in the display device according to the second embodiment and the display gradation values visually recognized on the display panel.

FIG. 11 is a diagram of an example of a process of the gradation processing performed by the first bit arithmetic unit according to the second embodiment. FIG. 12 is a diagram of an example of a process of the gradation processing performed by the second bit arithmetic unit according to the second embodiment. FIG. 13 is a diagram of the display gradation values visually recognized on the display panel according to the second embodiment. FIG. 14 is a diagram schematically illustrating the relation between the gradation at each part in the display device according to the second embodiment and the display gradation values visually recognized on the display panel.

As illustrated in FIGS. 11 and 12, the number of bits of each of the gradation data of R (red), G (green), and B (blue) included in the image signal received by a signal processor 100b is increased in the process of image processing, such as decompression, performed by the image processor 10b. The second embodiment describes a case where the respective 8-bit depth (256 gradations) gradation data of R (red), G (green), and B (blue) received by the image processor 10b are converted into RGB signals including 11-bit depth (2048 gradations) gradation data of R (red), G (green), and B (blue) and a W signal including an 11-bit depth (2048 gradations) gradation datum of W (white). The RGB signals converted into the 11-bit depth (2048 gradations) gradation data are received by a first bit arithmetic unit 201b of the gradation processor 20b. The W signal converted into the 11-bit depth (2048 gradations) gradation datum is received by a second bit arithmetic unit 202b of the gradation processor 20b. The least significant bit of the 11-bit depth gradation datum is referred to as the "zeroth bit", and the most significant bit is referred to as the "tenth bit". As illustrated in FIGS. 11 and 12, the values of the second bit, the first bit, and the zeroth bit in each of the gradation data of the RGB signals and the gradation datum of the W signal resulting from image processing performed by the image processor 10b can be "000", "001", "010", "011", "100", "101", "110", and "111".

The first bit arithmetic unit 201b of the gradation processor 20b converts the 11-bit depth (2048 gradations) gradation data of the RGB signals into 10-bit depth (1024 gradations) gradation data. Specifically, as illustrated in FIG. 11, the first bit arithmetic unit 201b discards the zeroth bit (least significant bit) of each of the 11-bit depth (2048 gradations) gradation data of R (red), G (green), and B (blue) to generate the 10-bit depth (1024 gradations) gradation data and outputs them to the display panel 30b.

The second bit arithmetic unit 202b of the gradation processor 20b converts the 11-bit depth (2048 gradations) gradation data of the W signals into 10-bit depth (1024 gradations) gradation data. Specifically, as illustrated in FIG. 12, the second bit arithmetic unit 202b adds a data value of "1" to the 11-bit depth (2048 gradations) gradation datum of W (white). Subsequently, the second bit arithmetic unit 202b discards the zeroth bit (least significant bit) to generate the 10-bit depth (1024 gradations) gradation datum and outputs it to the display panel 30b. In the gradation processing, the second bit arithmetic unit 202b of the gradation processor 20b does not add a data value of "1" to the 11-bit depth (2048 gradations) gradation datum "11111111111" of the W signal resulting from the image processing performed by the image processor 10b. This mechanism can prevent bit overflow.

When the gradation data of the RGB signals (first signal) and the gradation datum of the W signal (second signal) of the image signal prior to the gradation processing have the same value, output signals resulting from the gradation processing by the gradation processor 20b include an output signal in which the gradation data of the RGB signals (first signal) and the gradation datum of the W signal (second signal) have the same value and an output signal in which the gradation data of the RGB signals (first signal) and the gradation datum of the W signal (second signal) have values different from each other by 1. If the gradation data of the RGB signals (first signal) and the gradation datum of the W signal (second signal) resulting from the gradation processing have values different from each other by 1, the intermediate values of the gradation values can be expressed by the configuration in which the display panel 30b capable of performing gradation expression with 8-bit depth (256 gradations) is caused to perform gradation expression with 10-bit depth (1024 gradations) by the FRC processing performed by the FRC controller 50. The display device 1b of the present embodiment can express intermediate values of 10-bit depth (1024 gradations). Consequently, the display device 1b enables apparent gradation visually recognized on the display panel 30b, which can perform gradation expression with 8-bit depth (256 gradations), to have 2047 levels.

As illustrated in FIGS. 13 and 14, if the gradation value of each of the gradation data of R (red), G (green), and B (blue) resulting from the gradation processing is "508", and the gradation value of the gradation datum of W (white) resulting from the gradation processing is "508", the sum of the gradation value "508" of the gradation datum of each of R (red), G (green), and B (blue) and the gradation value "508" of the gradation datum of W (white) resulting from the gradation processing is "1016". In this case, the apparent display gradation value of an image that is displayed by the signals resulting from the FRC processing of the FRC controller 50 on the display panel 30b capable of performing gradation expression with 8-bit depth (256 gradations) is "127.000" (refer to A in FIGS. 13 and 14).

As illustrated in FIGS. 13 and 14, if the gradation value of each of the gradation data of R (red), G (green), and B (blue) resulting from the gradation processing is "508", and the gradation value of the gradation datum of W (white) resulting from the gradation processing is "509", the sum of the gradation value "508" of the gradation datum of each of R (red), G (green), and B (blue) and the gradation value "509" of the gradation datum of W (white) resulting from the gradation processing is "1017". In this case, the apparent display gradation value of an image that is displayed by the signals resulting from the FRC processing of the FRC controller 50 on the display panel 30b capable of performing gradation expression with 8-bit depth (256 gradations) is "127.125" (refer to B in FIGS. 13 and 14).

As illustrated in FIGS. 13 and 14, if the gradation value of each of the gradation data of R (red), G (green), and B (blue) resulting from the gradation processing is "509", and the gradation value of the gradation datum of W (white) resulting from the gradation processing is "509", the sum of the gradation value "509" of the gradation datum of each of R (red), G (green), and B (blue) and the gradation value "509" of the gradation datum of W (white) resulting from the gradation processing is "1018". In this case, the apparent display gradation value of an image that is displayed by the signals resulting from the FRC processing of the FRC controller 50 on the display panel 30b capable of performing gradation expression with 8-bit depth (256 gradations) is "127.250" (refer to C in FIGS. 13 and 14).

As illustrated in FIGS. 13 and 14, if the gradation value of each of the gradation data of R (red), G (green), and B (blue) resulting from the gradation processing is "509", and the gradation value of the gradation datum of W (white) resulting from the gradation processing is "510", the sum of the gradation value "509" of the gradation datum of each of R (red), G (green), and B (blue) and the gradation value "510" of the gradation datum of W (white) resulting from the gradation processing is "1019". In this case, the apparent display gradation value of an image that is displayed by the signals resulting from the FRC processing of the FRC controller 50 on the display panel 30b capable of performing gradation expression with 8-bit depth (256 gradations) is "127.375" (refer to D in FIGS. 13 and 14).

As illustrated in FIGS. 13 and 14, if the gradation value of each of the gradation data of R (red), G (green), and B (blue) resulting from the gradation processing is "510", and the gradation value of the gradation datum of W (white) resulting from the gradation processing is "510", the sum of the gradation value "510" of the gradation datum of each of R (red), G (green), and B (blue) and the gradation value "510" of the gradation datum of W (white) resulting from the gradation processing is "1020". In this case, the apparent display gradation value of an image that is displayed by the signals resulting from the FRC processing of the FRC controller 50 on the display panel 30b capable of performing gradation expression with 8-bit depth (256 gradations) is "127.500" (refer to E in FIGS. 13 and 14).

As illustrated in FIGS. 13 and 14, if the gradation value of each of the gradation data of R (red), G (green), and B (blue) resulting from the gradation processing is "510", and the gradation value of the gradation datum of W (white) resulting from the gradation processing is "511", the sum of the gradation value "510" of the gradation datum of each of R (red), G (green), and B (blue) and the gradation value "511" of the gradation datum of W (white) resulting from the gradation processing is "1021". In this case, the apparent display gradation value of an image that is displayed by the signals resulting from the FRC processing of the FRC controller 50 on the display panel 30b capable of performing gradation expression with 8-bit depth (256 gradations) is "127.625" (refer to F in FIGS. 13 and 14).

As illustrated in FIGS. 13 and 14, if the gradation value of each of the gradation data of R (red), G (green), and B (blue) resulting from the gradation processing is "511", and the gradation value of the gradation datum of W (white) resulting from the gradation processing is "511", the sum of the gradation value "511" of the gradation datum of each of R (red), G (green), and B (blue) and the gradation value "511" of the gradation datum of W (white) resulting from the gradation processing is "1022". In this case, the apparent display gradation value of an image that is displayed by the signals resulting from the FRC processing of the FRC controller 50 on the display panel 30b capable of performing gradation expression with 8-bit depth (256 gradations) is "127.750" (refer to G in FIGS. 13 and 14).

As illustrated in FIGS. 13 and 14, if the gradation value of each of the gradation data of R (red), G (green), and B (blue) resulting from the gradation processing is "511", and the gradation value of the gradation datum of W (white) resulting from the gradation processing is "512", the sum of the gradation value "511" of the gradation datum of each of R (red), G (green), and B (blue) and the gradation value "512" of the gradation datum of W (white) resulting from the gradation processing is "1023". In this case, the apparent display gradation value of an image that is displayed by the signals resulting from the FRC processing of the FRC controller 50 on the display panel 30b capable of performing gradation expression with 8-bit depth (256 gradations) is "127.875" (refer to H in FIGS. 13 and 14).

As described above, the display device 1b of the present embodiment can express the intermediate values of the gradation values of 10-bit depth (1024 gradations) on the display panel 30b capable of performing gradation expression with 8-bit depth (256 gradations) by the signals resulting from the FRC processing performed by the FRC controller 50. Consequently, the display device 1b enables apparent gradation visually recognized on the display panel 30b, which can perform gradation expression with 8-bit depth (256 gradations), to have 2047 levels.

Figure 15:
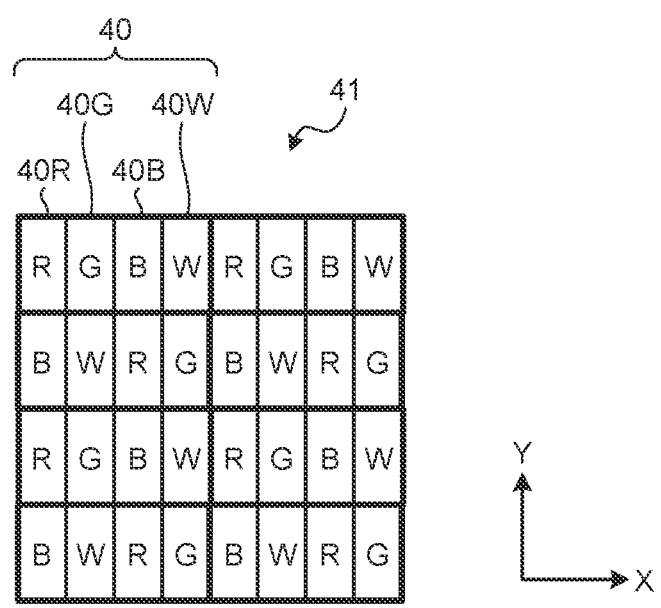
FIG. 15 is a diagram of an example of the pixel configuration of the display panel according to the second embodiment.

FIG. 15 is a diagram of an example of the pixel configuration of the display panel according to the second embodiment.

The display panel 30b according to the present embodiment displays an image using a pixel group 41 as one group including a plurality of R (red) sub-pixels 40R (first pixel), a plurality of G (green) sub-pixels 40G (second pixel), a plurality of B (blue) sub-pixels 40B (third pixel) and a plurality of W (white) sub-pixel 40W (fourth pixel). The display gradation of the sub-pixels 40R, 40G, 40B, and 40W is 256 gradations, that is, the sub-pixels 40R, 40G, 40B, and 40W can perform gradation expression with 8-bit depth. In the example illustrated in FIG. 15, one pixel group 41 is composed of eight groups of the R sub-pixel 40R, the G sub-pixel 40G, and the B sub-pixel 40B, and eight W sub-pixels 40W and can perform gradation expression with 1024 gradations, that is, 10-bit depth.

Figure 16A:
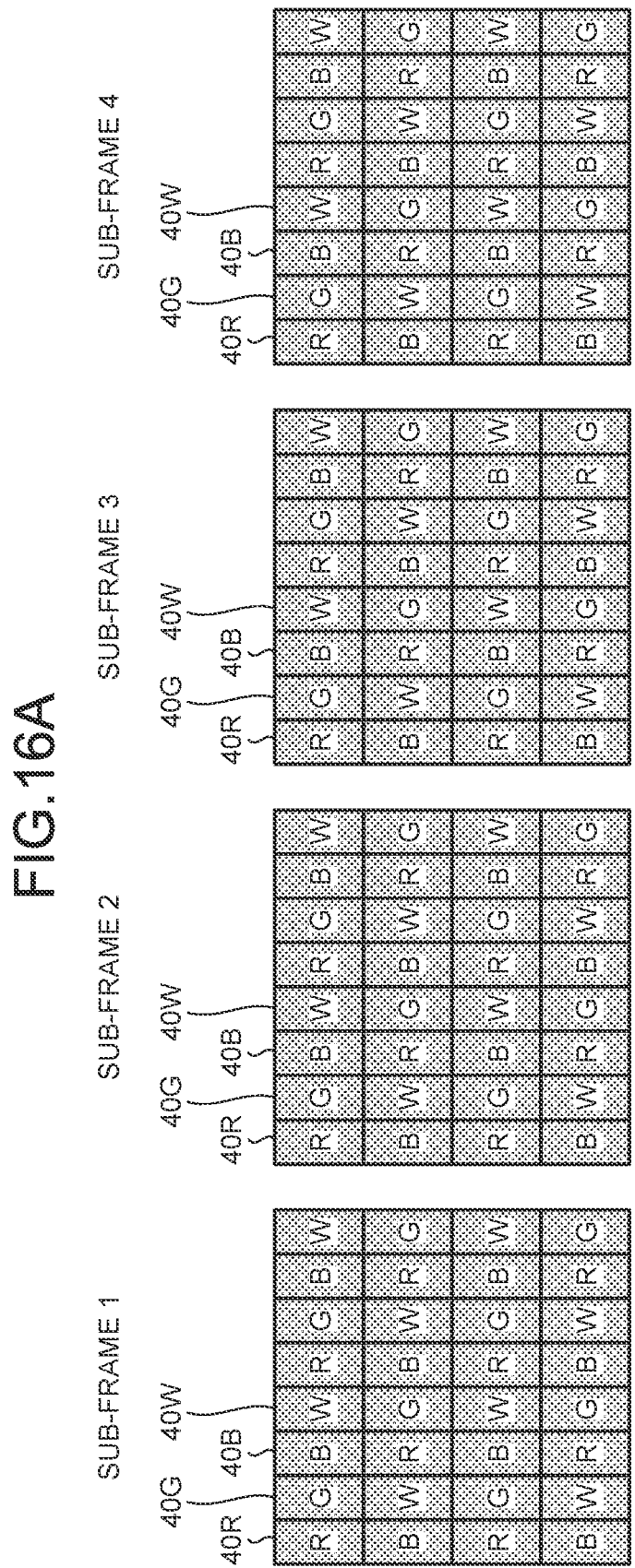
FIG. 16A is a diagram of a display pattern of the R sub-pixels, the G sub-pixels, the B sub-pixels, and the W sub-pixels indicated by A in FIGS. 13 and 14.
Figure 16B:
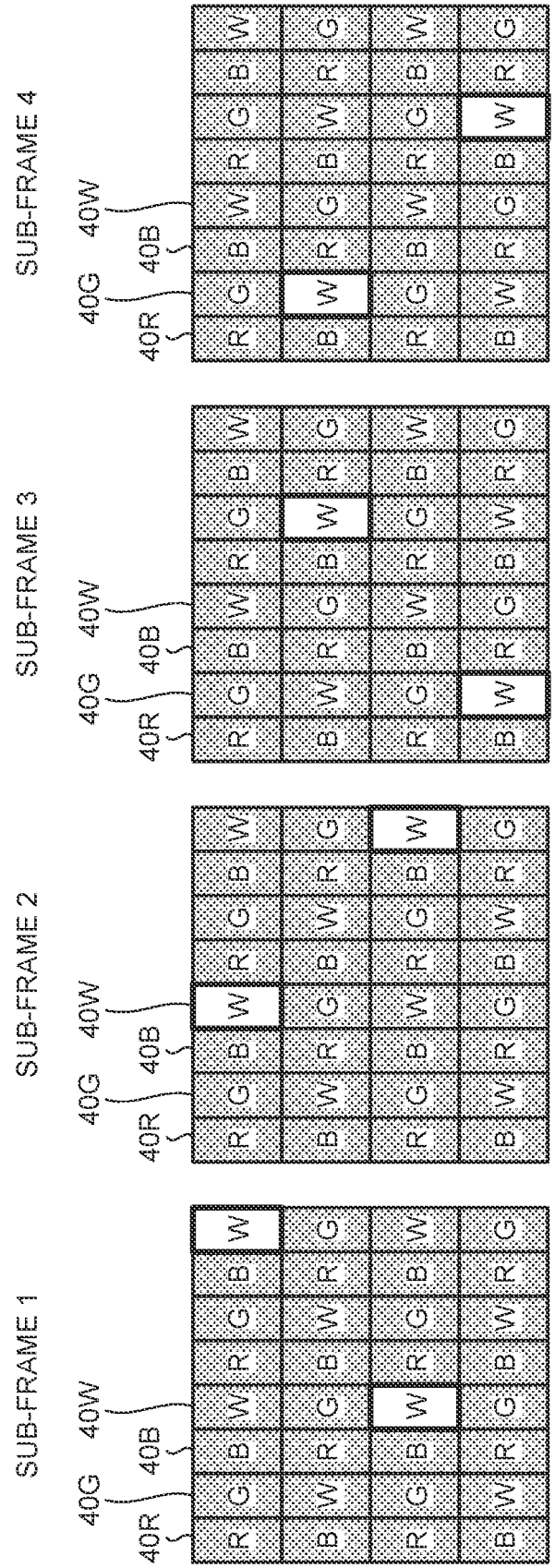
FIG. 16B is a diagram of a display pattern of the R sub-pixels, the G sub-pixels, the B sub-pixels, and the W sub-pixels indicated by B in FIGS. 13 and 14.
Figure 16F:
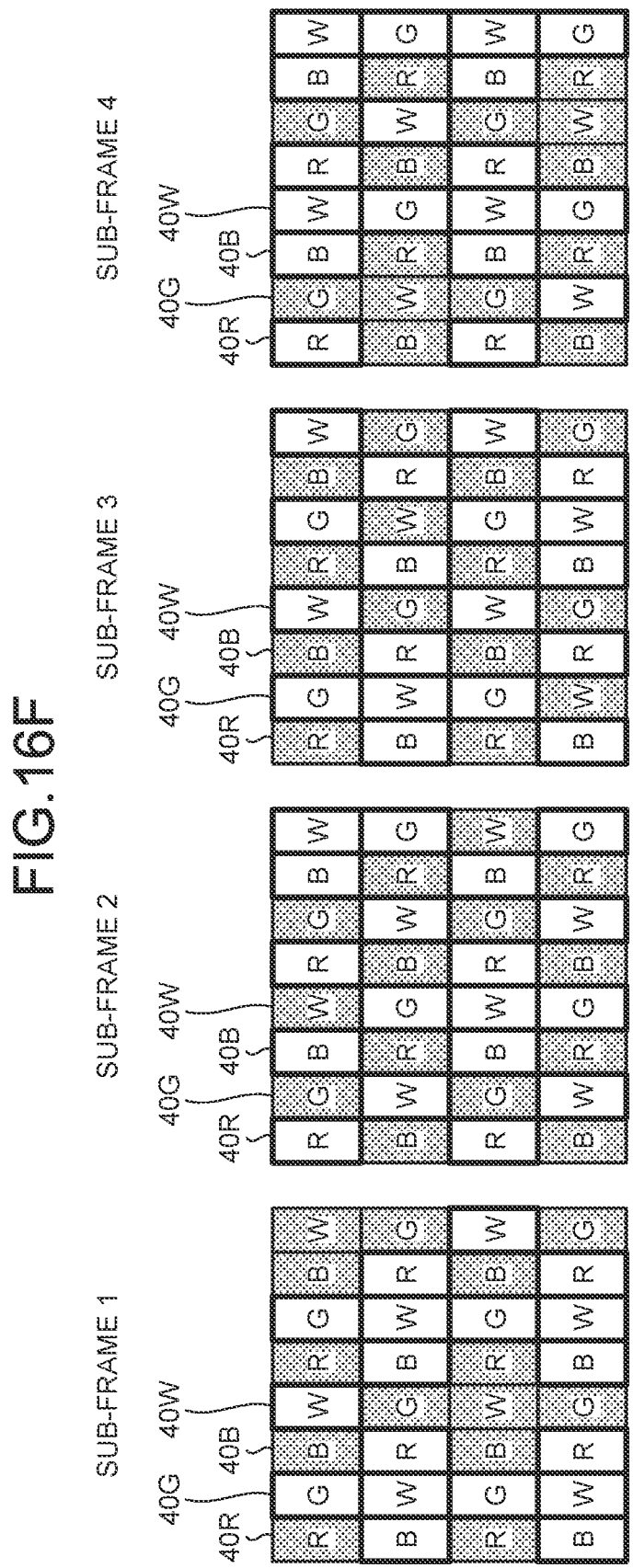
FIG. 16F is a diagram of a display pattern of the R sub-pixels, the G sub-pixels, the B sub-pixels, and the W sub-pixels indicated by F in FIGS. 13 and 14.

FIG. 16A is a diagram of a display pattern of the R sub-pixels, the G sub-pixels, the B sub-pixels, and the W sub-pixels indicated by A in FIGS. 13 and 14. FIG. 16B is a diagram of a display pattern of the R sub-pixels, the G sub-pixels, the B sub-pixels, and the W sub-pixels indicated by B in FIGS. 13 and 14. FIG. 16C is a diagram of a display pattern of the R sub-pixels, the G sub-pixels, the B sub-pixels, and the W sub-pixels indicated by C in FIGS. 13 and 14. FIG. 16D is a diagram of a display pattern of the R sub-pixels, the G sub-pixels, the B sub-pixels, and the W sub-pixels indicated by D in FIGS. 13 and 14. FIG. 16E is a diagram of a display pattern of the R sub-pixels, the G sub-pixels, the B sub-pixels, and the W sub-pixels indicated by E in FIGS. 13 and 14. FIG. 16F is a diagram of a display pattern of the R sub-pixels, the G sub-pixels, the B sub-pixels, and the W sub-pixels indicated by F in FIGS. 13 and 14. FIG. 16G is a diagram of a display pattern of the R sub-pixels, the G sub-pixels, the B sub-pixels, and the W sub-pixels indicated by G in FIGS. 13 and 14. FIG. 16H is a diagram of a display pattern of the R sub-pixels, the G sub-pixels, the B sub-pixels, and the W sub-pixels indicated by H in FIGS. 13 and 14. In the examples illustrated in FIGS. 16A to 16H, the pixel 40 is composed of one group of the R sub-pixel 40R, the G sub-pixel 40G, and the B sub-pixel 40B, and one W sub-pixel 40W. The ratio of the display luminance of one group of the R sub-pixel 40R, the G sub-pixel 40G, and the B sub-pixel 40B to the display luminance of one W sub-pixel 40W is 1:1. The display patterns illustrated in FIGS. 16A to 16H are given by way of example only, and the display patterns of the R sub-pixels, the G sub-pixels, the B sub-pixels, and the W sub-pixels are not limited to the examples illustrated in FIGS. 16A to 16H.

As illustrated in FIGS. 16A to 16H, the present embodiment displays images by dividing an image of one frame into four sub-frames in a time-division manner. Specifically, the FRC controller 50 causes the pixel group 41 illustrated in FIG. 15 to display a sub-frame 1, a sub-frame 2, a sub-frame 3, and a sub-frame 4 illustrated in FIGS. 16A to 16H in the order as listed. If the display gradation of the display panel 30b is 256 gradations, gradation expression with 10 bit depth (1024 gradations) can be performed by the FRC processing performed by the FRC controller 50.

In the examples illustrated in FIGS. 16A to 16H, the display gradation of the hatched sub-pixels is "127", and the display gradation of the outlined sub-pixels is "128".

In a display pattern A illustrated in FIG. 16A, the sum of a display gradation of "127×8" of eight groups of the R sub-pixel 40R, the G sub-pixel 40G, and the B sub-pixel 40B and a display gradation of "127×8" of eight W sub-pixels 40W is "2032". The display gradation per pixel 40 in the pixel group 41 is "2032/8=254.000". In this case, the apparent display gradation value in the pixel 40 capable of performing gradation expression with 8-bit depth (256 gradations) is "127.000".

In a display pattern B illustrated in FIG. 16B, the sum of a display gradation of "127×8" of eight groups of the R sub-pixel 40R, the G sub-pixel 40G, and the B sub-pixel 40B, a display gradation of "127×6" of six W sub-pixels 40W, and a display gradation of "128×2" of two W sub-pixels 40W is "2034". The display gradation per pixel 40 in the pixel group 41 is "2034/8=254.250". In this case, the apparent display gradation value in the pixel 40 capable of performing gradation expression with 8-bit depth (256 gradations) is "127.125".

In a display pattern C illustrated in FIG. 16C, the sum of a display gradation of "127×6" of six groups of the R sub-pixel 40R, the G sub-pixel 40G, and the B sub-pixel 40B, a display gradation of "128×2" of two groups of the R sub-pixel 40R, the G sub-pixel 40G, and the B sub-pixel 40B, a display gradation of "127×6" of six W sub-pixels 40W, and a display gradation of "128×2" of two W sub-pixels 40W is "2036". The display gradation per pixel 40 in the pixel group 41 is "2036/8=254.500". In this case, the apparent display gradation value in the pixel 40 capable of performing gradation expression with 8-bit depth (256 gradations) is "127.250".

In a display pattern D illustrated in FIG. 16D, the sum of a display gradation of "127×6" of six groups of the R sub-pixel 40R, the G sub-pixel 40G, and the B sub-pixel 40B, a display gradation of "128×2" of two groups of the R sub-pixel 40R, the G sub-pixel 40G, and the B sub-pixel 40B, a display gradation of "127×4" of four W sub-pixels 40W, and a display gradation of "128×4" of four W sub-pixels 40W is "2038". The display gradation per pixel 40 in the pixel group 41 is "2038/8=254.750". In this case, the apparent display gradation value in the pixel 40 capable of performing gradation expression with 8-bit depth (256 gradations) is "127.375".

In a display pattern E illustrated in FIG. 16E, the sum of a display gradation of "127×4" of four groups of the R sub-pixel 40R, the G sub-pixel 40G, and the B sub-pixel 40B, a display gradation of "128×4" of four groups of the R sub-pixel 40R, the G sub-pixel 40G, and the B sub-pixel 40B, a display gradation of "127×4" of four W sub-pixels 40W, and a display gradation of "128×4" of four W sub-pixels 40W is "2040". The display gradation per pixel 40 in the pixel group 41 is "2040/8=255.000". In this case, the apparent display gradation value in the pixel 40 capable of performing gradation expression with 8-bit depth (256 gradations) is "127.500".

In a display pattern F illustrated in FIG. 16F, the sum of a display gradation of "127×4" of four groups of the R sub-pixel 40R, the G sub-pixel 40G, and the B sub-pixel 40B, a display gradation of "128×4" of four groups of the R sub-pixel 40R, the G sub-pixel 40G, and the B sub-pixel 40B, a display gradation of "127×2" of two W sub-pixels 40W, and a display gradation of "128×6" of six W sub-pixels 40W is "2042". The display gradation per pixel 40 in the pixel group 41 is "2042/8=255.250". In this case, the apparent display gradation value in the pixel 40 capable of performing gradation expression with 8-bit depth (256 gradations) is "127.625".

In a display pattern G illustrated in FIG. 16G, the sum of a display gradation of "127×2" of two groups of the R sub-pixel 40R, the G sub-pixel 40G, and the B sub-pixel 40B, a display gradation of "128×6" of six groups of the R sub-pixel 40R, the G sub-pixel 40G, and the B sub-pixel 40B, a display gradation of "127×2" of two W sub-pixels 40W, and a display gradation of "128×6" of six W sub-pixels 40W is "2044". The display gradation per pixel 40 in the pixel group 41 is "2044/8=255.500". In this case, the apparent display gradation value in the pixel 40 capable of performing gradation expression with 8-bit depth (256 gradations) is "127.750".

In a display pattern H illustrated in FIG. 16H, the sum of a display gradation of "127×2" of two groups of the R sub-pixel 40R, the G sub-pixel 40G, and the B sub-pixel 40B, a display gradation of "128×6" of six groups of the R sub-pixel 40R, the G sub-pixel 40G, and the B sub-pixel 40B, and a display gradation of "128×8" of eight W sub-pixels 40W is "2046". The display gradation per pixel 40 in the pixel group 41 is "2046/8=255.750". In this case, the apparent display gradation value in the pixel 40 capable of performing gradation expression with 8-bit depth (256 gradations) is "127.875".

As described above, the first bit arithmetic unit 201b of the gradation processor 20b according to the present embodiment discards the zeroth bit of each of the 11-bit depth (2048 gradations) gradation data of the RGB signals to generate the 10-bit depth (1024 gradations) gradation data. The second bit arithmetic unit 202b of the gradation processor 20b adds a data value of "1" to the 11-bit depth (2048 gradations) gradation datum of the W signal and discards the zeroth bit to generate the 10-bit depth (1024 gradations) gradation datum. The FRC controller 50 performs the FRC processing on the 10-bit depth (1024 gradations) RGB signals and W signals and outputs the signals resulting from the FRC processing to the display panel 30b. Consequently, the display device 1b enables apparent gradation visually recognized on the display panel 30b that has a display gradation number of 256, that is, that can perform gradation expression with 8-bit depth (256 gradations) to have 2047 levels.

The first bit arithmetic unit 201b of the gradation processor 20b may add a data value of "1" to the respective 11-bit depth (2048 gradations) gradation data of the RGB signals and discard the zeroth bit to generate the 10-bit depth (1024 gradations) gradation data. The second bit arithmetic unit 202b of the gradation processor 20b may discard the zeroth bit of the 11-bit depth (2048 gradations) gradation data of the W signals to generate the 10-bit depth (1024 gradations) gradation data.

As described above, the display device 1b according to the second embodiment further includes the FRC controller 50 that divides an image of one frame into a plurality of sub-frames in a time-division manner and supplies them to the display panel 30b. The FRC controller 50 displays an image in a plurality of display patterns corresponding to the gradation data of the RGB signals (first signal) and the gradation data of the W signals (second signal) on the display panel 30b.

With this configuration, the display device 1b can express the intermediate values of the gradation values of 10-bit depth (1024 gradations) by the signals resulting from the FRC processing of the FRC controller 50 on the display panel 30b capable of performing gradation expression with the second bit depth (8-bit depth, that is, 256 gradations). Consequently, the display device 1b can make the number of apparent gradations visually recognized on the display panel 30b greater than that of the first embodiment.

The present embodiment can provide the display device 1b capable of performing higher gradation expression than the display gradation of the display panel 30b.

Third Embodiment

Figure 17:
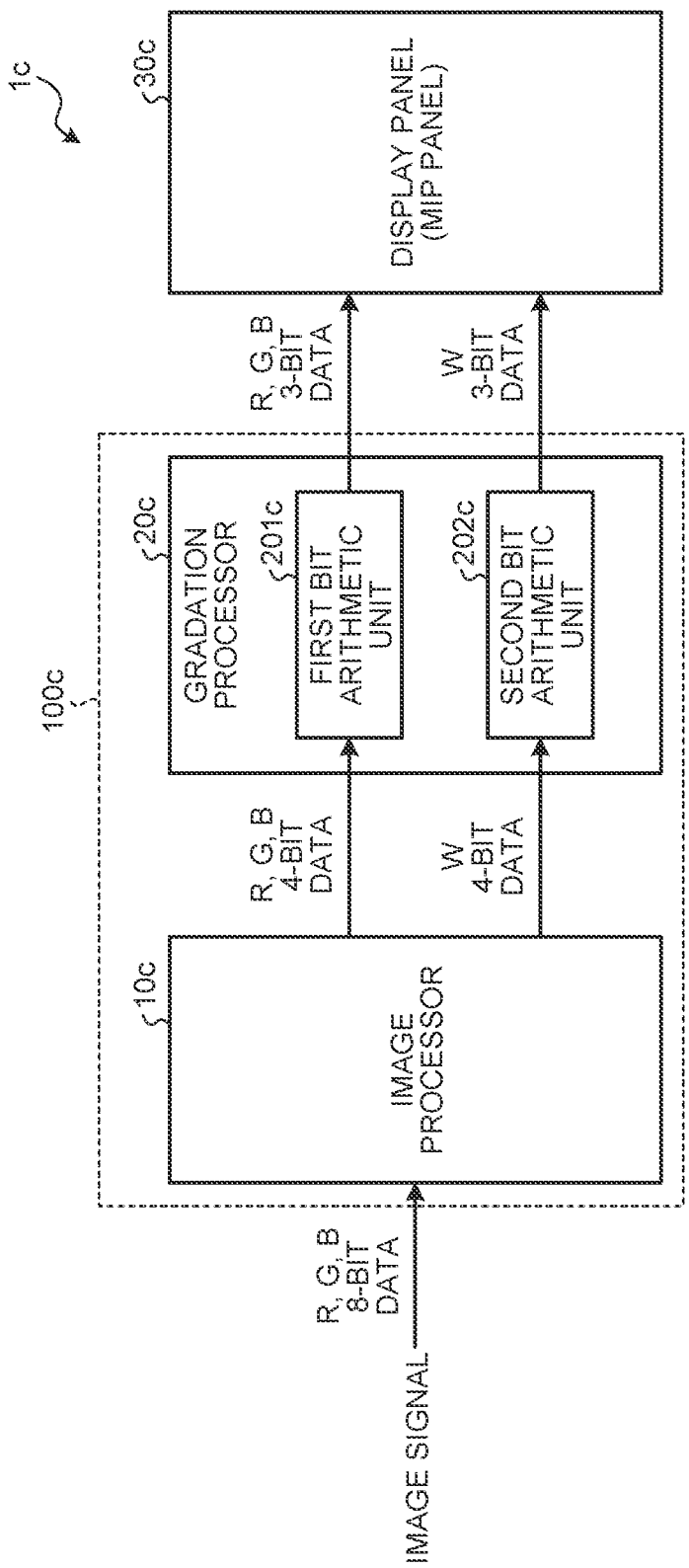
FIG. 17 is a block diagram of an example of the configuration of the signal processor according to a third embodiment.

FIG. 17 is a block diagram of an example of the configuration of the signal processor according to a third embodiment. As illustrated in FIG. 17, a display panel 30c of a display device 1c according to the third embodiment is an MIP panel employing what is called a memory in pixel (MIP) technology including pixels having memories that can store therein binary (logical value "1" or logical value "0") data. The R (red) sub-pixel (first pixel), the G (green) sub-pixel (second pixel), the B (blue) sub-pixel (third pixel), and the W (white) sub-pixel (fourth pixel) constitute a pixel in the display panel 30c and are each composed of a plurality of segments having the same area ratio. The display panel 30c has what is called an area coverage modulation system that displays images with a plurality of gradations in each sub-pixel by turning on and off the segments. The present embodiment describes an example where the display gradation of the display panel 30c is 8 gradations, that is, the display panel 30c can perform gradation expression with 3-bit depth; however, the display gradation of the display panel 30c is not limited to 8 gradations.

Area coverage modulation may be performed by the display panel 30c using a publicly known method. The method for performing area coverage modulation by the display panel 30c is not intended to limit the present disclosure. In the display panel 30c according to the present embodiment, the R sub-pixel, the G sub-pixel, the B sub-pixel, and the W sub-pixel are each composed of three segments having an area ratio of 1:2:4, and the display gradation number of the pixel is 8, that is, the bit depth is 3 bits, for example. The bit depth of display gradation of the sub-pixels is not limited to 8 bits.

An image processor 10c converts a received image signal including 8-bit depth gradation data of R (red), G (green), and B (blue) into RGB signals (first signal) including 4-bit depth gradation data of R (red), G (green), and B (blue) and a W signal (second signal) including a 4-bit depth gradation datum of W (white).

Specifically, the image processor 10c discards less significant bits of the respective gradation data of the RGB signals (first signal) and the gradation datum of the W signal (second signal) the bit depth of each of which has been increased by internal arithmetic processing, such as decompression. As a result, the image processor 10c outputs gradation data with the most significant 4-bit depth.

The following describes an example of signal processing performed by the display device 1c according to the third embodiment with reference to FIGS. 18 to 21.

Figure 20:
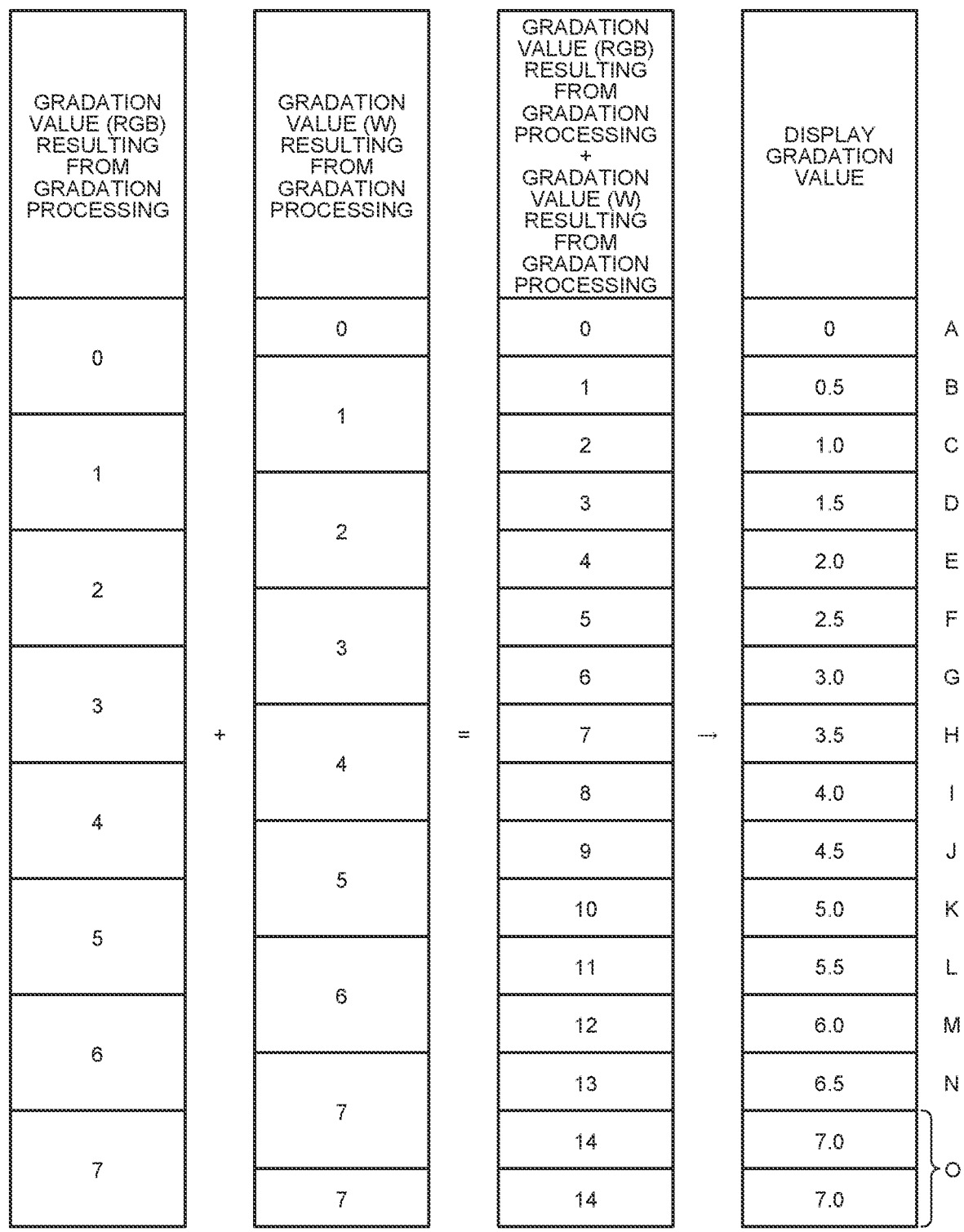
FIG. 20 is a diagram of the display gradation values visually recognized on the display panel according to the third embodiment.
Figure 21:
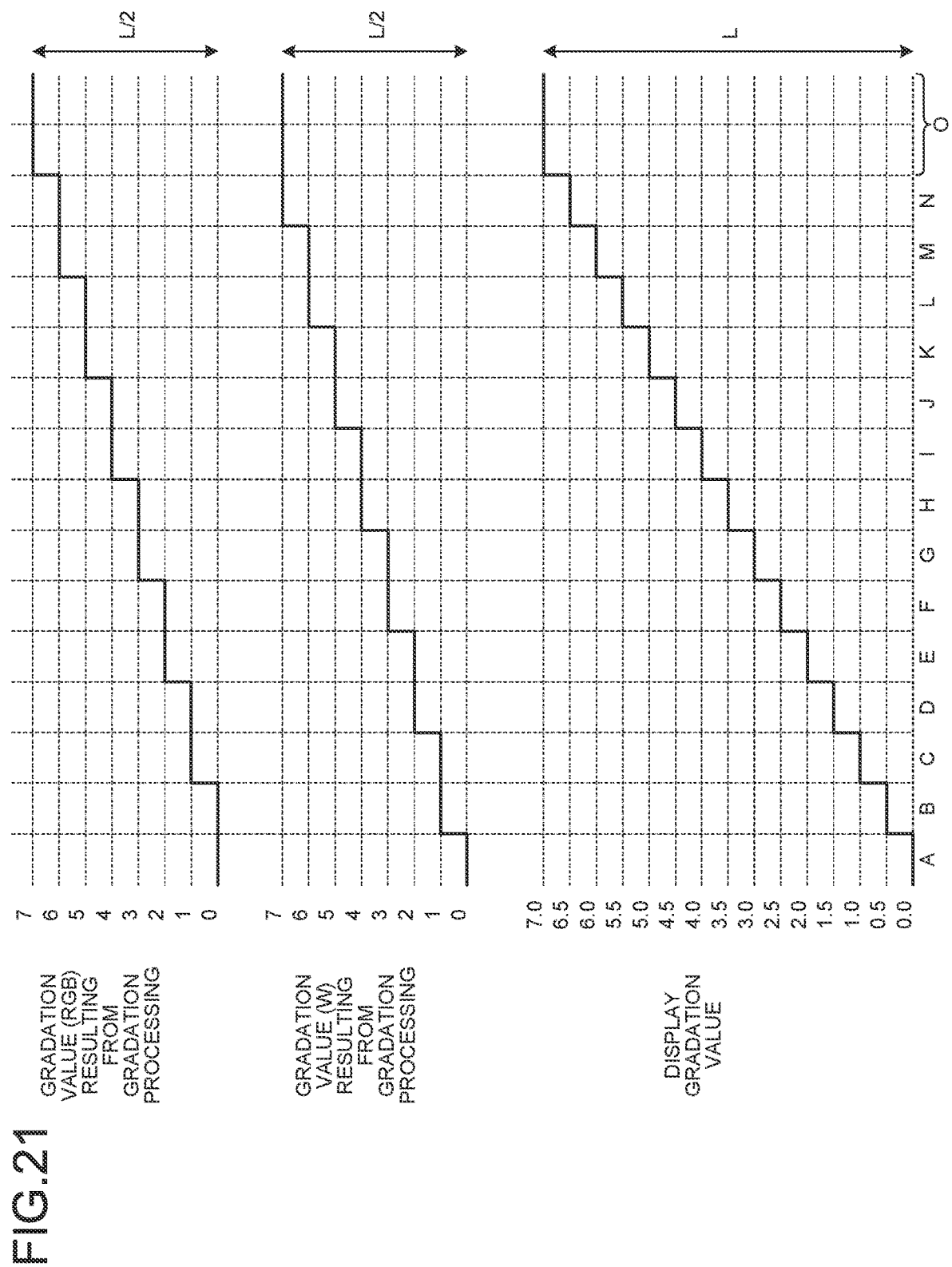
FIG. 21 is a diagram schematically illustrating the relation between the gradation at each part in the display device according to the third embodiment and the display gradation values visually recognized on the display panel.

FIG. 18 is a diagram of an example of a process of the gradation processing performed by the first bit arithmetic unit according to the third embodiment. FIG. 19 is a diagram of an example of a process of the gradation processing performed by the second bit arithmetic unit according to the third embodiment. FIG. 20 is a diagram of the display gradation values visually recognized on the display panel according to the third embodiment. FIG. 21 is a diagram schematically illustrating the relation between the gradation at each part in the display device according to the third embodiment and the display gradation values visually recognized on the display panel.

As illustrated in FIGS. 18 and 19, the respective 8-bit depth (256 gradations) gradation data of R (red), G (green), and B (blue) included in the image signal received by a signal processor 100c are converted by the image processor 10c into RGB signals including respective 4-bit depth (16 gradations) gradation data of R (red), G (green), and B (blue) and a W signal including a 4-bit depth (16 gradations) gradation datum of W (white). The RGB signals converted into the 4-bit depth (16 gradations) gradation data are received by a first bit arithmetic unit 201c of a gradation processor 20c. The W signal converted into the 4-bit depth (16 gradations) gradation datum is received by a second bit arithmetic unit 202c of the gradation processor 20c. In FIGS. 18 and 19, the image processor 10c discards the third and less significant bits of each of the 8-bit depth (256 gradations) gradation data of the RGB signals to generate 4-bit depth (16 gradations) gradation data and discards the third and less significant bits of the 8-bit depth (256 gradations) gradation datum of the W signal to generate a 4-bit depth (16 gradations) gradation datum, for example.

The first bit arithmetic unit 201c of the gradation processor 20c converts the 4-bit depth (16 gradations) gradation data of the RGB signals into 3-bit depth (8 gradations) gradation data. Specifically, as illustrated in FIG. 18, the first bit arithmetic unit 201c discards the zeroth bit (least significant bit) of each of the 4-bit depth (16 gradations) gradation data of R (red), G (green), and B (blue) to generate the 3-bit depth (8 gradations) gradation data and outputs them to the display panel 30c.

The second bit arithmetic unit 202c of the gradation processor 20c converts the 4-bit depth (16 gradations) gradation data of the W signals into 3-bit depth (8 gradations) gradation data. Specifically, as illustrated in FIG. 19, the second bit arithmetic unit 202c adds a data value of "1" to the 4-bit depth (16 gradations) gradation datum of W (white). Subsequently, the second bit arithmetic unit 202c discards the zeroth bit (least significant bit) to generate the 3-bit depth (8 gradations) gradation datum and outputs it to the display panel 30c. In the gradation processing, the second bit arithmetic unit 202c of the gradation processor 20c does not add a data value of "1" to the 4-bit depth (16 gradations) gradation datum "1111" of the W signal output from the image processor 10c. This mechanism can prevent bit overflow.

When the gradation data of the RGB signals (first signal) and the gradation datum of the W signal (second signal) of the image signal prior to the gradation processing have the same value, output signals resulting from the gradation processing by the gradation processor 20c include an output signal in which the gradation data of the RGB signals (first signal) and the gradation datum of the W signal (second signal) have the same value and an output signal in which the gradation data of the RGB signals (first signal) and the gradation datum of the W signal (second signal) have values different from each other by 1. If the gradation data of the RGB signals (first signal) and the gradation datum of the W signal (second signal) resulting from the gradation processing have values different from each other by 1, the display device 1c of the present embodiment can express the intermediate values of the gradation values on the display panel 30c capable of performing gradation expression with 3-bit depth, that is, 8 gradations. Specifically, the display device 1c of the present embodiment can express intermediate values of 3-bit depth (8 gradations). Consequently, the display device 1c enables apparent gradation visually recognized on the display panel 30c, which can perform gradation expression with 3-bit depth (8 gradations), to have 15 levels.

As illustrated in FIGS. 20 and 21, when the gradation value of each of the gradation data of R (red), G (green), and B (blue) resulting from the gradation processing is "0", and the gradation value of the gradation datum of W (white) resulting from the gradation processing is "0", the sum of the gradation value "0" of the gradation datum of each of R (red), G (green), and B (blue) resulting from the gradation processing and the gradation value "0" of the gradation datum of W (white) resulting from the gradation processing is "0". In this case, the apparent display gradation value of an image displayed on the display panel 30c capable of performing gradation expression with 3-bit depth (8 gradations) is "0.0" (refer to A in FIGS. 20 and 21).

As illustrated in FIGS. 20 and 21, when the gradation value of each of the gradation data of R (red), G (green), and B (blue) resulting from the gradation processing is "0", and the gradation value of the gradation datum of W (white) resulting from the gradation processing is "1", the sum of the gradation value "0" of the gradation datum of each of R (red), G (green), and B (blue) resulting from the gradation processing and the gradation value "1" of the gradation datum of W (white) resulting from the gradation processing is "1". In this case, the apparent display gradation value of an image displayed on the display panel 30c capable of performing gradation expression with 3-bit depth (8 gradations) is "0.5" (refer to B in FIGS. 20 and 21).

As illustrated in FIGS. 20 and 21, when the gradation value of each of the gradation data of R (red), G (green), and B (blue) resulting from the gradation processing is "1", and the gradation value of the gradation datum of W (white) resulting from the gradation processing is "1", the sum of the gradation value "1" of the gradation datum of each of R (red), G (green), and B (blue) resulting from the gradation processing and the gradation value "1" of the gradation datum of W (white) resulting from the gradation processing is "2". In this case, the apparent display gradation value of an image displayed on the display panel 30c capable of performing gradation expression with 3-bit depth (8 gradations) is "1.0" (refer to C in FIGS. 20 and 21).

As illustrated in FIGS. 20 and 21, when the gradation value of each of the gradation data of R (red), G (green), and B (blue) resulting from the gradation processing is "1", and the gradation value of the gradation datum of W (white) resulting from the gradation processing is "2", the sum of the gradation value "1" of the gradation datum of each of R (red), G (green), and B (blue) resulting from the gradation processing and the gradation value "2" of the gradation datum of W (white) resulting from the gradation processing is "3". In this case, the apparent display gradation value of an image displayed on the display panel 30c capable of performing gradation expression with 3-bit depth (8 gradations) is "1.5" (refer to D in FIGS. 20 and 21).

As illustrated in FIGS. 20 and 21, when the gradation value of each of the gradation data of R (red), G (green), and B (blue) resulting from the gradation processing is "2", and the gradation value of the gradation datum of W (white) resulting from the gradation processing is "2", the sum of the gradation value "2" of the gradation datum of each of R (red), G (green), and B (blue) resulting from the gradation processing and the gradation value "2" of the gradation datum of W (white) resulting from the gradation processing is "4". In this case, the apparent display gradation value of an image displayed on the display panel 30c capable of performing gradation expression with 3-bit depth (8 gradations) is "2.0" (refer to E in FIGS. 20 and 21).

As illustrated in FIGS. 20 and 21, when the gradation value of each of the gradation data of R (red), G (green), and B (blue) resulting from the gradation processing is "2", and the gradation value of the gradation datum of W (white) resulting from the gradation processing is "3", the sum of the gradation value "2" of the gradation datum of each of R (red), G (green), and B (blue) resulting from the gradation processing and the gradation value "3" of the gradation datum of W (white) resulting from the gradation processing is "5". In this case, the apparent display gradation value of an image displayed on the display panel 30c capable of performing gradation expression with 3-bit depth (8 gradations) is "2.5" (refer to F in FIGS. 20 and 21).

As illustrated in FIGS. 20 and 21, when the gradation value of each of the gradation data of R (red), G (green), and B (blue) resulting from the gradation processing is "3", and the gradation value of the gradation datum of W (white) resulting from the gradation processing is "3", the sum of the gradation value "3" of the gradation datum of each of R (red), G (green), and B (blue) resulting from the gradation processing and the gradation value "3" of the gradation datum of W (white) resulting from the gradation processing is "6". In this case, the apparent display gradation value of an image displayed on the display panel 30c capable of performing gradation expression with 3-bit depth (8 gradations) is "3.0" (refer to G in FIGS. 20 and 21).

As illustrated in FIGS. 20 and 21, when the gradation value of each of the gradation data of R (red), G (green), and B (blue) resulting from the gradation processing is "3", and the gradation value of the gradation datum of W (white) resulting from the gradation processing is "4", the sum of the gradation value "3" of the gradation datum of each of R (red), G (green), and B (blue) resulting from the gradation processing and the gradation value "4" of the gradation datum of W (white) resulting from the gradation processing is "7". In this case, the apparent display gradation value of an image displayed on the display panel 30c capable of performing gradation expression with 3-bit depth (8 gradations) is "3.5" (refer to H in FIGS. 20 and 21).

As illustrated in FIGS. 20 and 21, when the gradation value of each of the gradation data of R (red), G (green), and B (blue) resulting from the gradation processing is "4", and the gradation value of the gradation datum of W (white) resulting from the gradation processing is "4", the sum of the gradation value "4" of the gradation datum of each of R (red), G (green), and B (blue) resulting from the gradation processing and the gradation value "4" of the gradation datum of W (white) resulting from the gradation processing is "8". In this case, the apparent display gradation value of an image displayed on the display panel 30c capable of performing gradation expression with 3-bit depth (8 gradations) is "4.0" (refer to I in FIGS. 20 and 21).

As illustrated in FIGS. 20 and 21, when the gradation value of each of the gradation data of R (red), G (green), and B (blue) resulting from the gradation processing is "4", and the gradation value of the gradation datum of W (white) resulting from the gradation processing is "5", the sum of the gradation value "4" of the gradation datum of each of R (red), G (green), and B (blue) resulting from the gradation processing and the gradation value "5" of the gradation datum of W (white) resulting from the gradation processing is "9". In this case, the apparent display gradation value of an image displayed on the display panel 30c capable of performing gradation expression with 3-bit depth (8 gradations) is "4.5" (refer to J in FIGS. 20 and 21).

As illustrated in FIGS. 20 and 21, when the gradation value of each of the gradation data of R (red), G (green), and B (blue) resulting from the gradation processing is "5", and the gradation value of the gradation datum of W (white) resulting from the gradation processing is "5", the sum of the gradation value "5" of the gradation datum of each of R (red), G (green), and B (blue) resulting from the gradation processing and the gradation value "5" of the gradation datum of W (white) resulting from the gradation processing is "10". In this case, the apparent display gradation value of an image displayed on the display panel 30c capable of performing gradation expression with 3-bit depth (8 gradations) is "5.0" (refer to K in FIGS. 20 and 21).

As illustrated in FIGS. 20 and 21, when the gradation value of each of the gradation data of R (red), G (green), and B (blue) resulting from the gradation processing is "5", and the gradation value of the gradation datum of W (white) resulting from the gradation processing is "6", the sum of the gradation value "5" of the gradation datum of each of R (red), G (green), and B (blue) resulting from the gradation processing and the gradation value "6" of the gradation datum of W (white) resulting from the gradation processing is "11". In this case, the apparent display gradation value of an image displayed on the display panel 30c capable of performing gradation expression with 3-bit depth (8 gradations) is "5.5" (refer to L in FIGS. 20 and 21).

As illustrated in FIGS. 20 and 21, when the gradation value of each of the gradation data of R (red), G (green), and B (blue) resulting from the gradation processing is "6", and the gradation value of the gradation datum of W (white)

resulting from the gradation processing is "6", the sum of the gradation value "6" of the gradation datum of each of R (red), G (green), and B (blue) resulting from the gradation processing and the gradation value "6" of the gradation datum of W (white) resulting from the gradation processing is "12". In this case, the apparent display gradation value of an image displayed on the display panel 30c capable of performing gradation expression with 3-bit depth (8 gradations) is "6.0" (refer to M in FIGS. 20 and 21).

As illustrated in FIGS. 20 and 21, when the gradation value of each of the gradation data of R (red), G (green), and B (blue) resulting from the gradation processing is "6", and the gradation value of the gradation datum of W (white) resulting from the gradation processing is "7", the sum of the gradation value "6" of the gradation datum of each of R (red), G (green), and B (blue) resulting from the gradation processing and the gradation value "7" of the gradation datum of W (white) resulting from the gradation processing is "13". In this case, the apparent display gradation value of an image displayed on the display panel 30c capable of performing gradation expression with 3-bit depth (8 gradations) is "6.5" (refer to N in FIGS. 20 and 21).

As illustrated in FIGS. 20 and 21, when the gradation value of each of the gradation data of R (red), G (green), and B (blue) resulting from the gradation processing is "7", and the gradation value of the gradation datum of W (white) resulting from the gradation processing is "7", the sum of the gradation value "7" of the gradation datum of each of R (red), G (green), and B (blue) resulting from the gradation processing and the gradation value "7" of the gradation datum of W (white) resulting from the gradation processing is "14". In this case, the apparent display gradation value of an image displayed on the display panel 30c capable of performing gradation expression with 3-bit depth (8 gradations) is "7.0" (refer to O in FIGS. 20 and 21).

As described above, the display device 1c of the present embodiment can express the intermediate values of the gradation values on the display panel 30c capable of performing gradation expression with 3-bit depth (8 gradations). Consequently, the display device 1c enables apparent gradation visually recognized on the display panel 30c, which can perform gradation expression with 3-bit depth (8 gradations), to have 15 levels as illustrated in FIGS. 20 and 21.

Figure 22:
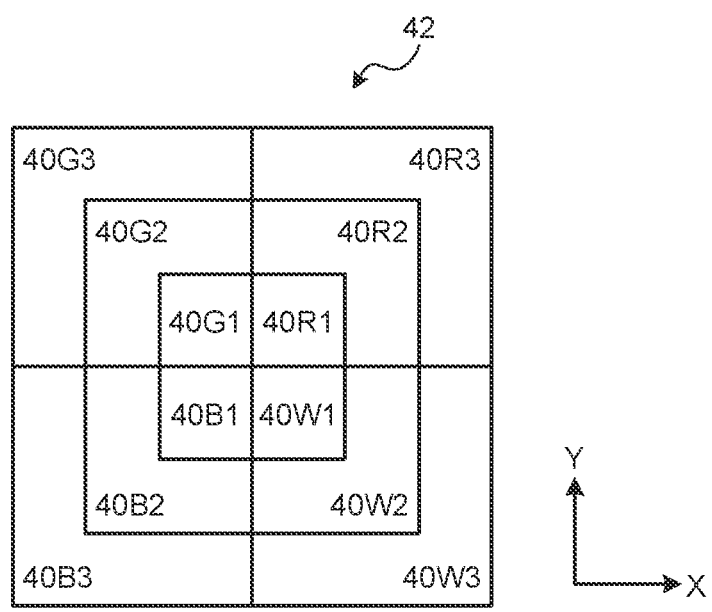
FIG. 22 is a diagram of an example of the pixel configuration of the display panel according to the third embodiment.

FIG. 22 is a diagram of an example of the pixel configuration of the display panel according to the third embodiment.

A pixel 42 of the display panel 30c according to the present embodiment includes segments 40R1, 40R2, and 40R3 constituting the R (red) sub-pixel (first pixel), segments 40G1, 40G2, and 40G3 constituting the G (green) sub-pixel (second pixel), segments 40B1, 40B2, and 40B3 constituting the B (blue) sub-pixel (third pixel), and segments 40W1, 40W2, and 40W3 constituting the W (white) sub-pixel (fourth pixel).

The segments 40R1, 40G1, 40B1, and 40W1 have substantially the same area. The segments 40R2, 40G2, 40B2, and 40W2 have substantially the same area. The segments 40R3, 40G3, 40B3, and 40W3 have substantially the same area.

In the configuration according to the present embodiment, the area ratio between the segments 40R1, 40G1, 40B1, and 40W1, the segments 40R2, 40G2, 40B2, and 40W2, and the segments 40R3, 40G3, 40B3, and 40W3 is 1:2:4.

In the configuration according to the present embodiment, the ratio of the display luminance of the R sub-pixel, the G sub-pixel, and the B sub-pixel to the display luminance of the W sub-pixel is 1:1. Specifically, the ratio of the display luminance of the segments 40R1, 40G1, and 40B1 to the display luminance of the segment 40W1 is 1:1, the ratio of the display luminance of the segments 40R2, 40G2, and 40B2 to the display luminance of the segment 40W2 is 1:1, and the ratio of the display luminance of the segments 40R3, 40G3, and 40B3 to the display luminance of the segment 40W3 is 1:1.

The pixel 42 of the display panel 30c according to the third embodiment having the pixel configuration described above can express one level of gradation by turning on the segments 40R1, 40G1, 40B1, and 40W1. The pixel 42 can express two levels of gradation by turning on the segments 40R2, 40G2, 40B2, and 40W2. The pixel 42 can express four levels of gradation by turning on the segments 40R3, 40G3, 40B3, and 40W3. By turning on/off the segments 40R1, 40G1, 40B1, and 40W1, the segments 40R2, 40G2, 40B2, and 40W2, and the segments 40R3, 40G3, 40B3, and 40W3, the pixel 42 can perform gradation expression with 3-bit depth (8 gradations). The shape of the segments illustrated in FIG. 22 is given by way of example only, and the shape of the segments is not limited to the example illustrated in FIG. 22.

Figure 23A:
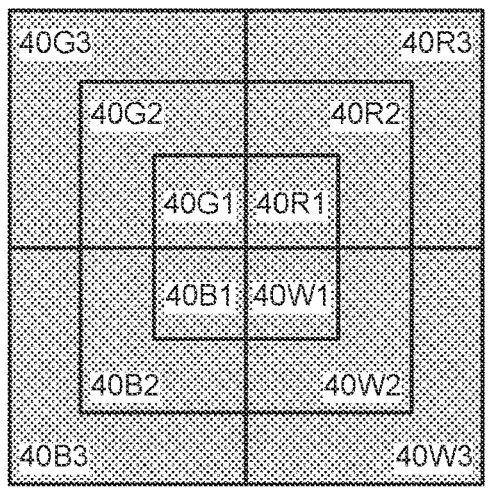
FIG. 23A is a diagram of a display pattern of the R sub-pixel, the G sub-pixel, the B sub-pixel, and the W sub-pixel indicated by A in FIGS. 20 and 21.
Figure 23B:
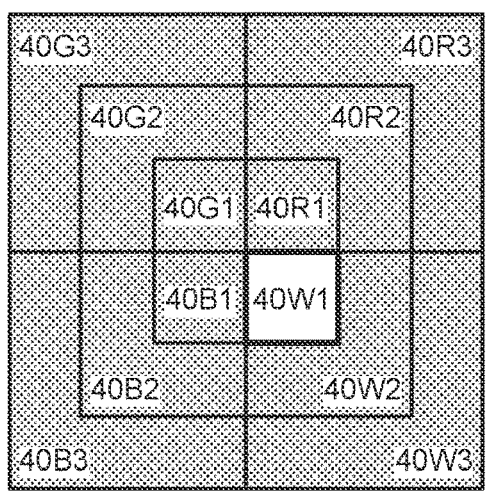
FIG. 23B is a diagram of a display pattern of the R sub-pixel, the G sub-pixel, the B sub-pixel, and the W sub-pixel indicated by B in FIGS. 20 and 21.
Figure 23C:
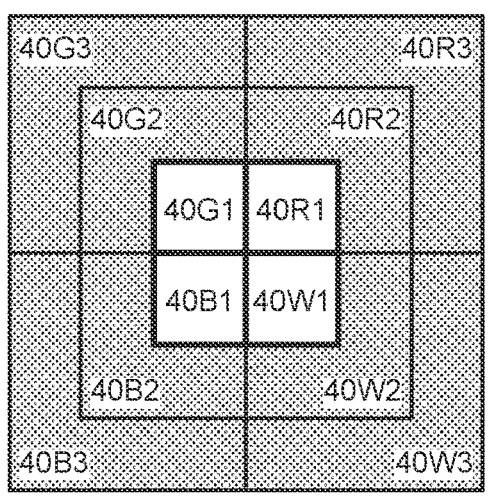
FIG. 23C is a diagram of a display pattern of the R sub-pixel, the G sub-pixel, the B sub-pixel, and the W sub-pixel indicated by C in FIGS. 20 and 21.
Figure 23D:
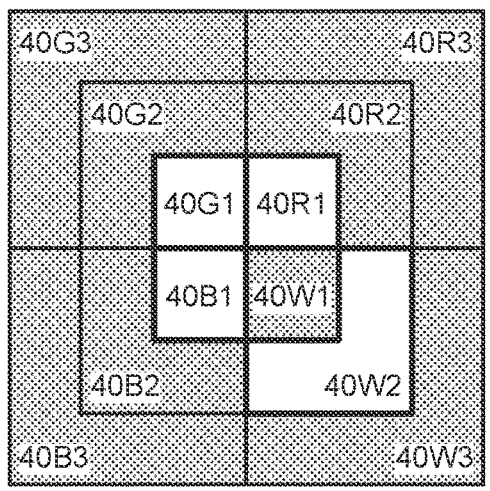
FIG. 23D is a diagram of a display pattern of the R sub-pixel, the G sub-pixel, the B sub-pixel, and the W sub-pixel indicated by D in FIGS. 20 and 21.
Figure 23E:
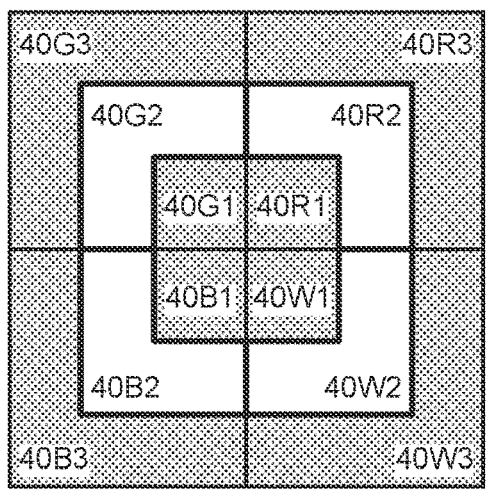
FIG. 23E is a diagram of a display pattern of the R sub-pixel, the G sub-pixel, the B sub-pixel, and the W sub-pixel indicated by E in FIGS. 20 and 21.
Figure 23F:
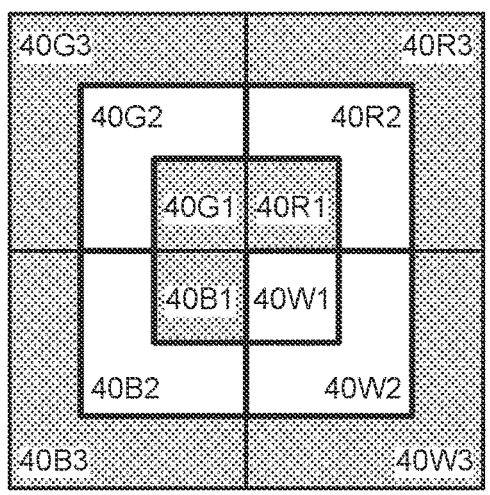
FIG. 23F is a diagram of a display pattern of the R sub-pixel, the G sub-pixel, the B sub-pixel, and the W sub-pixel indicated by F in FIGS. 20 and 21.
Figure 23G:
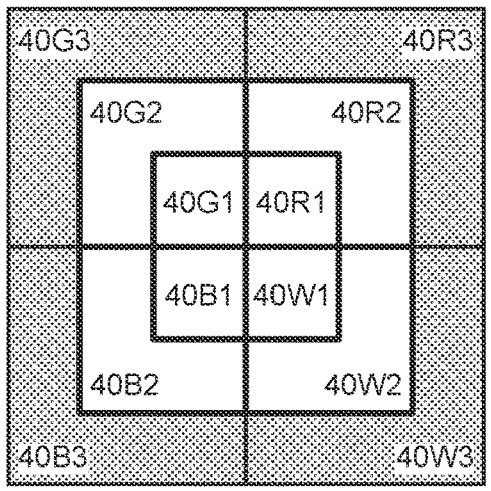
FIG. 23G is a diagram of a display pattern of the R sub-pixel, the G sub-pixel, the B sub-pixel, and the W sub-pixel indicated by G in FIGS. 20 and 21.
Figure 23H:
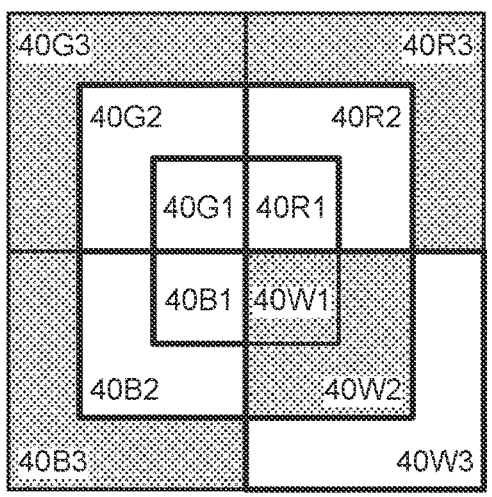
FIG. 23H is a diagram of a display pattern of the R sub-pixel, the G sub-pixel, the B sub-pixel, and the W sub-pixel indicated by H in FIGS. 20 and 21.
Figure 23I:
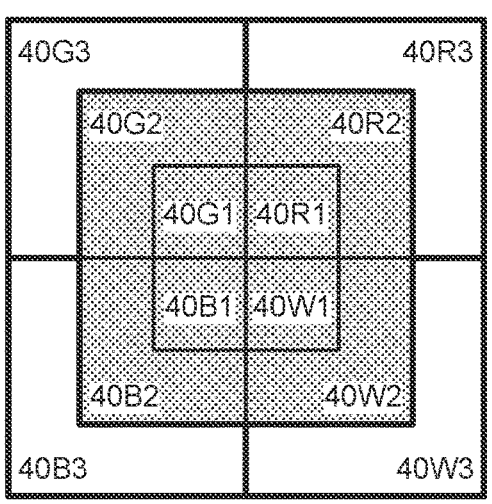
FIG. 23I is a diagram of a display pattern of the R sub-pixel, the G sub-pixel, the B sub-pixel, and the W sub-pixel indicated by I in FIGS. 20 and 21.
Figure 23J:
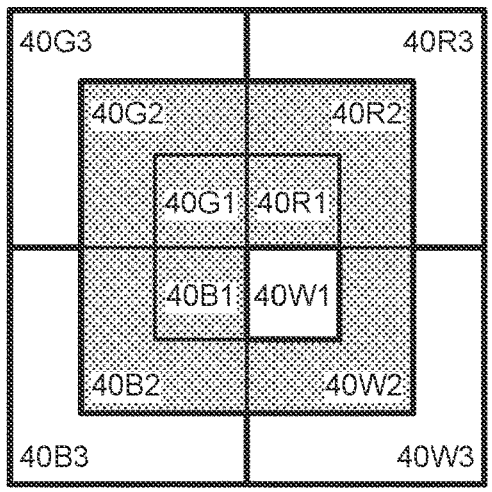
FIG. 23J is a diagram of a display pattern of the R sub-pixel, the G sub-pixel, the B sub-pixel, and the W sub-pixel indicated by J in FIGS. 20 and 21.
Figure 23K:
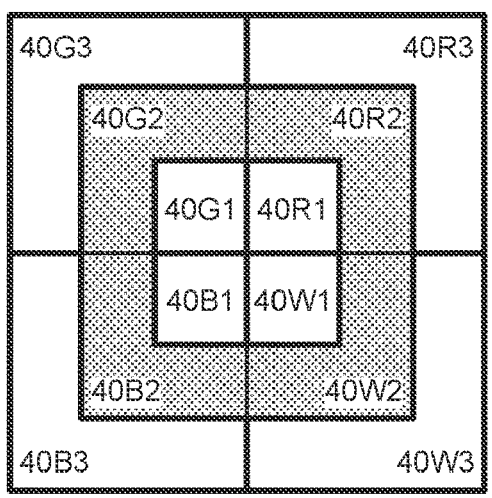
FIG. 23K is a diagram of a display pattern of the R sub-pixel, the G sub-pixel, the B sub-pixel, and the W sub-pixel indicated by K in FIGS. 20 and 21.
Figure 23L:
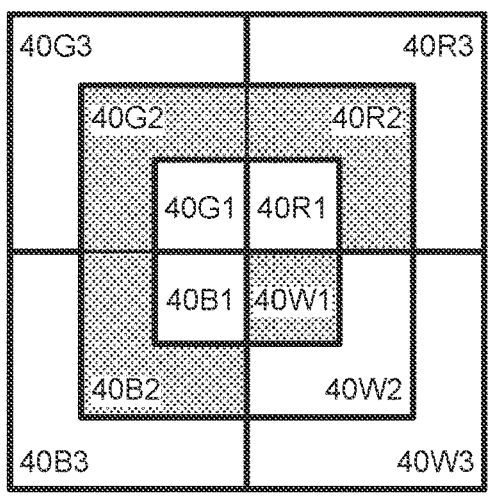
FIG. 23L is a diagram of a display pattern of the R sub-pixel, the G sub-pixel, the B sub-pixel, and the W sub-pixel indicated by L in FIGS. 20 and 21.
Figure 23M:
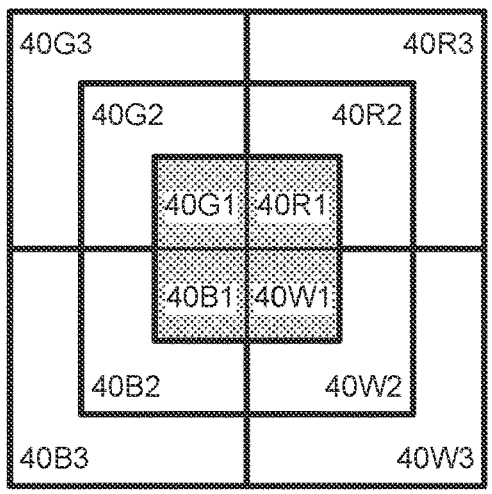
FIG. 23M is a diagram of a display pattern of the R sub-pixel, the G sub-pixel, the B sub-pixel, and the W sub-pixel indicated by M in FIGS. 20 and 21.
Figure 23N:
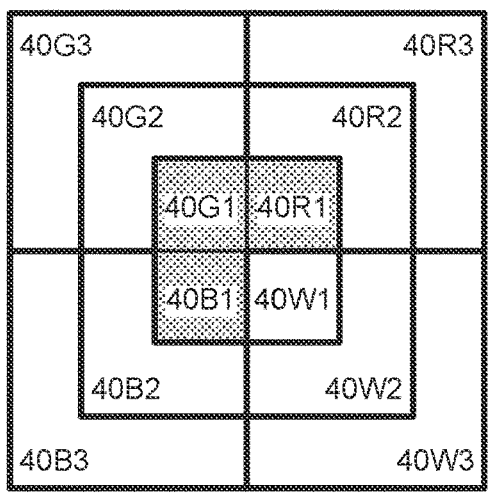
FIG. 23N is a diagram of a display pattern of the R sub-pixel, the G sub-pixel, the B sub-pixel, and the W sub-pixel indicated by N in FIGS. 20 and 21.
Figure 23O:
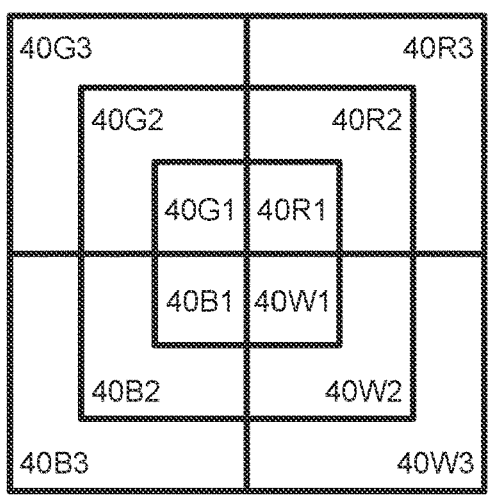
FIG. 23O is a diagram of a display pattern of the R sub-pixel, the G sub-pixel, the B sub-pixel, and the W sub-pixel indicated by O in FIGS. 20 and 21.

FIG. 23A is a diagram of a display pattern of the R sub-pixel, the G sub-pixel, the B sub-pixel, and the W sub-pixel indicated by A in FIGS. 20 and 21. FIG. 23B is a diagram of a display pattern of the R sub-pixel, the G sub-pixel, the B sub-pixel, and the W sub-pixel indicated by B in FIGS. 20 and 19. FIG. 23C is a diagram of a display pattern of the R sub-pixel, the G sub-pixel, the B sub-pixel, and the W sub-pixel indicated by C in FIGS. 18 and 21. FIG. 23D is a diagram of a display pattern of the R sub-pixel, the G sub-pixel, the B sub-pixel, and the W sub-pixel indicated by D in FIGS. 20 and 21. FIG. 23E is a diagram of a display pattern of the R sub-pixel, the G sub-pixel, the B sub-pixel, and the W sub-pixel indicated by E in FIGS. 20 and 21. FIG. 23F is a diagram of a display pattern of the R sub-pixel, the G sub-pixel, the B sub-pixel, and the W sub-pixel indicated by F in FIGS. 20 and 21. FIG. 23G is a diagram of a display pattern of the R sub-pixel, the G sub-pixel, the B sub-pixel, and the W sub-pixel indicated by G in FIGS. 20 and 21. FIG. 23H is a diagram of a display pattern of the R sub-pixel, the G sub-pixel, the B sub-pixel, and the W sub-pixel indicated by H in FIGS. 20 and 21. FIG. 23I is a diagram of a display pattern of the R sub-pixel, the G sub-pixel, the B sub-pixel, and the W sub-pixel indicated by I in FIGS. 20 and 21. FIG. 23J is a diagram of a display pattern of the R sub-pixel, the G sub-pixel, the B sub-pixel, and the W sub-pixel indicated by J in FIGS. 20 and 21. FIG. 23K is a diagram of a display pattern of the R sub-pixel, the G sub-pixel, the B sub-pixel, and the W sub-pixel indicated by K in FIGS. 20 and 21. FIG. 23L is a diagram of a display pattern of the R sub-pixel, the G sub-pixel, the B sub-pixel, and the W sub-pixel indicated by L in FIGS. 20 and 21. FIG. 23M is a diagram of a display pattern of the R sub-pixel, the G sub-pixel, the B sub-pixel, and the W sub-pixel indicated by M in FIGS. 20 and 21. FIG. 23N is a diagram of a display pattern of the R sub-pixel, the G sub-pixel, the B sub-pixel, and the W sub-pixel indicated by N in FIGS. 20 and 21. FIG. 23O is a diagram of a display pattern of the R sub-pixel, the G sub-pixel, the B sub-pixel, and the W sub-pixel indicated by O in FIGS. 20 and 21. The display patterns illustrated in FIGS. 23A to 23O are given by way of example only, and the display patterns of the R sub-pixel, the G sub-pixel, the B sub-pixel, and the W sub-pixel are not limited to the examples illustrated in FIGS. 23A to 23O.

In the examples illustrated in FIGS. 23A to 23O, the display gradation of the hatched segments 40R1, 40G1, 40B1, and 40W1 is "0", and the display gradation of the outlined segments 40R1, 40G1, 40B1, and 40W1 is "1".

In the examples illustrated in FIGS. 23A to 23O, the display gradation of the hatched segments 40R2, 40G2, 40B2, and 40W2 is "0", and the display gradation of the outlined segments 40R2, 40G2, 40B2, and 40W2 is "2".

In the examples illustrated in FIGS. 23A to 23O, the display gradation of the hatched segments 40R3, 40G3, 40B3, and 40W3 is "0", and the display gradation of the outlined segments 40R3, 40G3, 40B3, and 40W3 is "4".

In a display pattern A illustrated in FIG. 23A, the display gradation of all the sub-pixels is "0", and the gradation value of the pixel 42 is "0". In this case, the apparent display gradation value in the pixel 42 capable of performing gradation expression with 3-bit depth (8 gradations) is "0.0".

In a display pattern B illustrated in FIG. 23B, the display gradation of the segment 40W1 is "1". As a result, the gradation value of the pixel 42 is "1". In this case, the apparent display gradation value in the pixel 42 capable of performing gradation expression with 3-bit depth (8 gradations) is "0.5".

In a display pattern C illustrated in FIG. 23C, the display gradation of the segments 40R1, 40G1, and 40B1 is "1", and the display gradation of the segment 40W1 is "1". As a result, the gradation value of the pixel 42 is "2". In this case, the apparent display gradation value in the pixel 42 capable of performing gradation expression with 3-bit depth (8 gradations) is "1.0".

In a display pattern D illustrated in FIG. 23D, the display gradation of the segments 40R1, 40G1, and 40B1 is "1", and the display gradation of the segment 40W2 is "2". As a result, the gradation value of the pixel 42 is "3". In this case, the apparent display gradation value in the pixel 42 capable of performing gradation expression with 3-bit depth (8 gradations) is "1.5".

In a display pattern E illustrated in FIG. 23E, the display gradation of the segments 40R2, 40G2, and 40B2 is "2", and the display gradation of the segment 40W2 is "2". As a result, the gradation value of the pixel 42 is "4". In this case, the apparent display gradation value in the pixel 42 capable of performing gradation expression with 3-bit depth (8 gradations) is "2.0".

In a display pattern F illustrated in FIG. 23F, the display gradation of the segments 40R2, 40G2, and 40B2 is "2", the display gradation of the segment 40W1 is "1", and the display gradation of the segment 40W2 is "2". As a result, the gradation value of the pixel 42 is "5". In this case, the apparent display gradation value in the pixel 42 capable of performing gradation expression with 3-bit depth (8 gradations) is "2.5".

In a display pattern G illustrated in FIG. 23G, the display gradation of the segments 40R1, 40G1, and 40B1 is "1", the display gradation of the segments 40R2, 40G2, and 40B2 is "2", the display gradation of the segment 40W1 is "1", and the display gradation of the segment 40W2 is "2". As a result, the gradation value of the pixel 42 is "6". In this case, the apparent display gradation value in the pixel 42 capable of performing gradation expression with 3-bit depth (8 gradations) is "3.0".

In a display pattern H illustrated in FIG. 23H, the display gradation of the segments 40R1, 40G1, and 40B1 is "1", the display gradation of the segments 40R2, 40G2, and 40B2 is "2", and the display gradation of the segment 40W3 is "4". As a result, the gradation value of the pixel 42 is "7". In this case, the apparent display gradation value in the pixel 42 capable of performing gradation expression with 3-bit depth (8 gradations) is "3.5".

In a display pattern I illustrated in FIG. 23I, the display gradation of the segments 40R3, 40G3, and 40B3 is "4", and the display gradation of the segment 40W3 is "4". As a result, the gradation value of the pixel 42 is "8". In this case, the apparent display gradation value in the pixel 42 capable of performing gradation expression with 3-bit depth (8 gradations) is "4.0".

In a display pattern J illustrated in FIG. 23J, the display gradation of the segments 40R3, 40G3, and 40B3 is "4", the display gradation of the segment 40W1 is "1", and the display gradation of the segment 40W3 is "4". As a result, the gradation value of the pixel 42 is "9". In this case, the apparent display gradation value in the pixel 42 capable of performing gradation expression with 3-bit depth (8 gradations) is "4.5".

In a display pattern K illustrated in FIG. 23K, the display gradation of the segments 40R1, 40G1, and 40B1 is "1", the display gradation of the segments 40R3, 40G3, and 40B3 is "4", the display gradation of the segment 40W1 is "1", and the display gradation of the segment 40W3 is "4". As a result, the gradation value of the pixel 42 is "10". In this case, the apparent display gradation value in the pixel 42 capable of performing gradation expression with 3-bit depth (8 gradations) is "5.0".

In a display pattern L illustrated in FIG. 23L, the display gradation of the segments 40R1, 40G1, and 40B1 is "1", the display gradation of the segments 40R3, 40G3, and 40B3 is "4", the display gradation of the segment 40W2 is "2", and the display gradation of the segment 40W3 is "4". As a result, the gradation value of the pixel 42 is "11". In this case, the apparent display gradation value in the pixel 42 capable of performing gradation expression with 3-bit depth (8 gradations) is "5.5".

In a display pattern M illustrated in FIG. 23M, the display gradation of the segments 40R2, 40G2, and 40B2 is "2", the display gradation of the segments 40R3, 40G3, and 40B3 is "4", the display gradation of the segment 40W2 is "2", and the display gradation of the segment 40W3 is "4". As a result, the gradation value of the pixel 42 is "12". In this case, the apparent display gradation value in the pixel 42 capable of performing gradation expression with 3-bit depth (8 gradations) is "6.0".

In a display pattern N illustrated in FIG. 23N, the display gradation of the segments 40R2, 40G2, and 40B2 is "2", the display gradation of the segments 40R3, 40G3, and 40B3 is "4", the display gradation of the segment 40W1 is "1", the display gradation of the segment 40W2 is "2", and the display gradation of the segment 40W3 is "4". As a result, the gradation value of the pixel 42 is "13". In this case, the apparent display gradation value in the pixel 42 capable of performing gradation expression with 3-bit depth (8 gradations) is "6.5".

In a display pattern O illustrated in FIG. 23O, the display gradation of the segments 40R1, 40G1, and 40B1 is "1", the display gradation of the segments 40R2, 40G2, and 40B2 is "2", the display gradation of the segments 40R3, 40G3, and 40B3 is "4", the display gradation of the segment 40W1 is "1", the display gradation of the segment 40W2 is "2", and the display gradation of the segment 40W3 is "4". As a result, the gradation value of the pixel 42 is "14". In this case, the apparent display gradation value in the pixel 42 capable of performing gradation expression with 3-bit depth (8 gradations) is "7.0".

As described above, the first bit arithmetic unit 201c of the gradation processor 20c according to the present embodiment discards the zeroth bit of each of the 4-bit depth (16 gradations) gradation data of the RGB signals to generate the 3-bit depth (8 gradations) gradation data and outputs them to the display panel 30c. The second bit arithmetic unit 202c of the gradation processor 20c adds a data value of "1" to the 4-bit depth (16 gradations) gradation datum of the W signal. Subsequently, the second bit arithmetic unit 202c discards the zeroth bit to generate the 3-bit depth (8 gradations) gradation datum and outputs it to the display panel 30c. Consequently, the display device 1c enables apparent gradation visually recognized on the display panel 30c that has the pixels 42 having a display gradation number of 8, that is, that can perform gradation expression with 3-bit depth (8 gradations) to have 15 levels.

The present embodiment is particularly suitable for the display panel 30c serving as an MIP panel having the following configurations: the R sub-pixel, the G sub-pixel, the B sub-pixel, and the W sub-pixel are each composed of three segments having an area ratio of 1:2:4 and each include a memory that can store therein binary data of the respective segments, and the ratio of the display luminance of the R sub-pixel, the G sub-pixel, and the B sub-pixel to the display luminance of the W sub-pixel is 1:1, for example.

The first bit arithmetic unit 201c of the gradation processor 20c may add a data value of "1" to the 4-bit depth (16 gradations) gradation data of the RGB signals and discard the zeroth bit to generate the 3-bit depth (8 gradations) gradation data. The second bit arithmetic unit 202c of the gradation processor 20c may discard the zeroth bit of the 4-bit depth (16 gradations) gradation data of the W signals to generate the 3-bit depth (8 gradations) gradation data.

As described above, in the display device 1c according to the third embodiment, the R (red) sub-pixel (first pixel), the G (green) sub-pixel (second pixel), the B (blue) sub-pixel (third pixel), and the W (white) sub-pixel (fourth pixel) are each composed of a plurality of segments having a predetermined area ratio and each include a memory that can store therein binary data of the respective segments. The display panel 30c displays an image in a plurality of display patterns corresponding to the gradation data of the RGB signals (first signal) and the gradation data of the W signals (second signal).

With this configuration, the display device 1c can express the intermediate values of the gradation values on the display panel 30c capable of performing gradation expression with the second bit depth (3-bit depth, that is, 8 gradations). Consequently, the display device 1c can increase the number of apparent gradations visually recognized on the display panel 30c. In other words, the display device 1c can perform higher gradation expression than the display gradation of the display panel 30c.

The present embodiment can provide the display device 1c capable of performing higher gradation expression than the display gradation of the display panel 30c.

Fourth Embodiment

Figure 24:
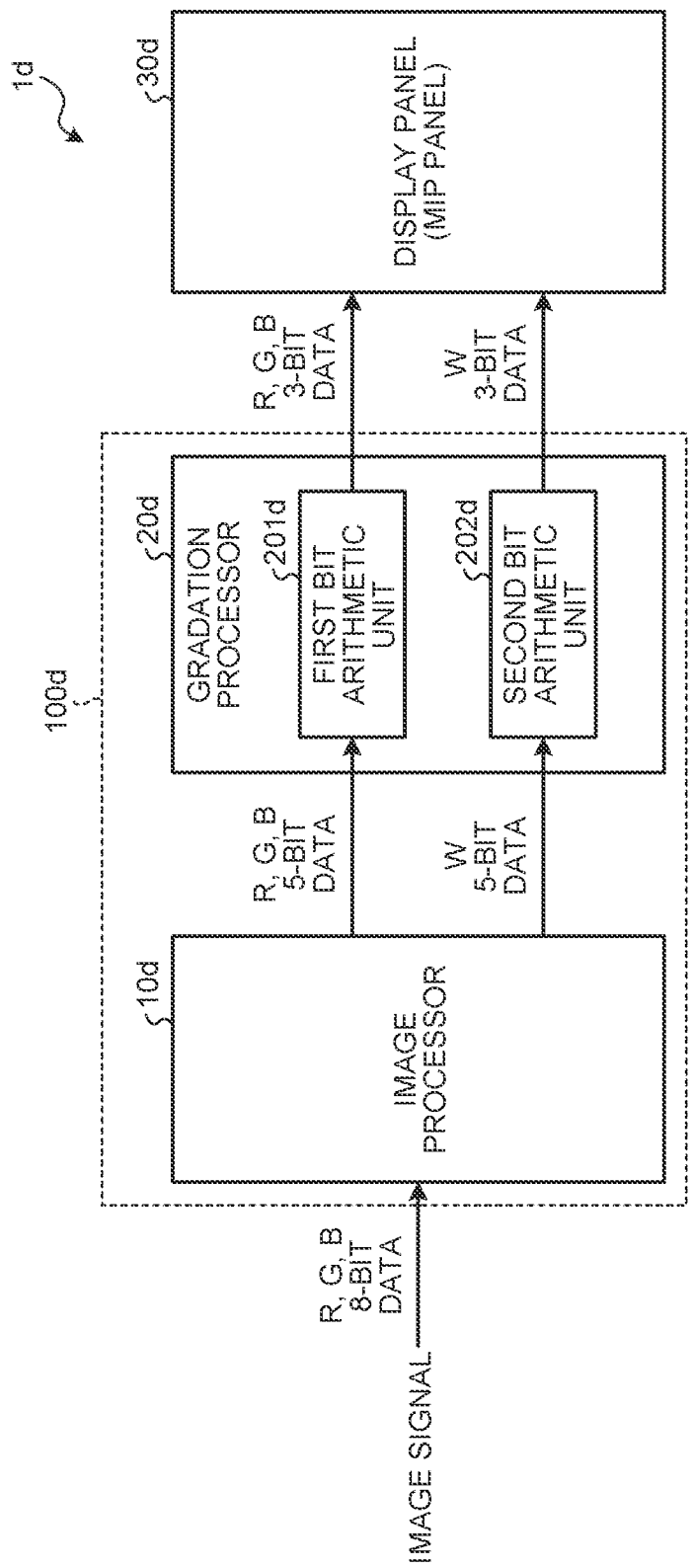
FIG. 24 is a block diagram of an example of the configuration of the signal processor according to a fourth embodiment.

FIG. 24 is a block diagram of an example of the configuration of the signal processor according to a fourth embodiment. As illustrated in FIG. 24, a display panel 30d of a display device 1d according to the fourth embodiment is an MIP panel employing what is called the MIP technology including pixels having memories that can store therein binary data like the display panel 30c of the display device 1c according to the third embodiment. The pixel configuration of the display panel 30d according to the fourth embodiment is the same as that according to the third embodiment. The present embodiment is different from the third embodiment in that the ratio of the display luminance of the R sub-pixel, the G sub-pixel, and the B sub-pixel to the display luminance of the W sub-pixel is 2:1. Specifically, the ratio of the display luminance of the segments 40R1, 40G1, and 40B1 to the display luminance of the segment 40W1 according to the present embodiment is 2:1, the ratio of the display luminance of the segments 40R2, 40G2, and 40B2 to the display luminance of the segment 40W2 is 2:1, and the ratio of the display luminance of the segments 40R3, 40G3, and 40B3 to the display luminance of the segment 40W3 is 2:1.

An image processor 10d converts a received image signal including 8-bit depth gradation data of R (red), G (green), and B (blue) into RGB signals (first signal) including 5-bit depth gradation data of R (red), G (green), and B (blue) and a W signal (second signal) including a 5-bit depth gradation datum of W (white).

Specifically, the image processor 10d discards less significant bits of the respective gradation data of the RGB signals (first signal) and the gradation datum of the W signal (second signal) the bit depth of each of which has been increased by internal arithmetic processing, such as decompression. As a result, the image processor 10d outputs gradation data with the most significant 5-bit depth.

The following describes an example of signal processing performed by the display device 1d according to the fourth embodiment with reference to FIGS. 25 to 28.

Figure 28:
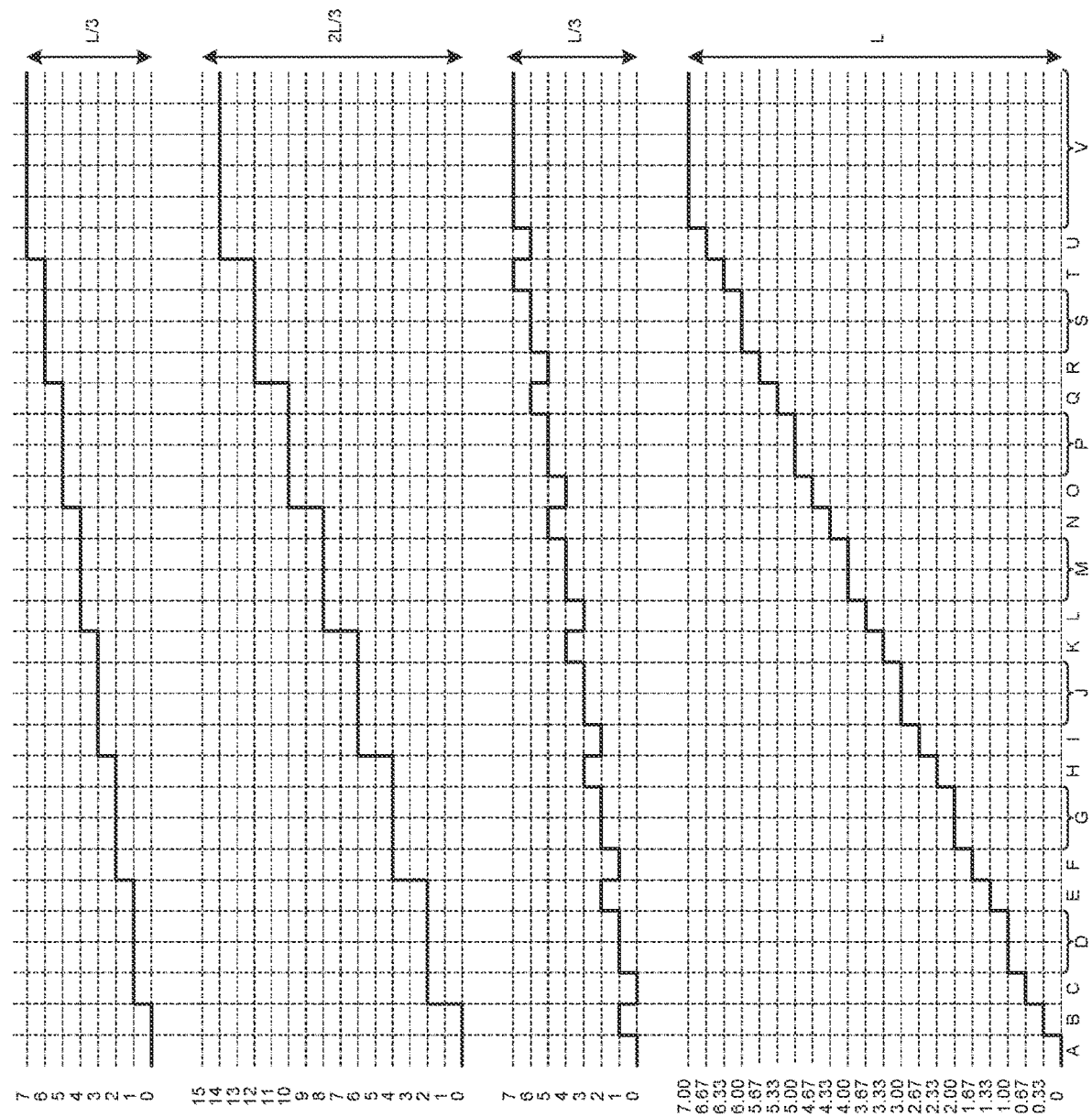
FIG. 28 is a diagram schematically illustrating the relation between the gradation at each part in the display device according to the fourth embodiment and the display gradation values visually recognized on the display panel.

FIG. 25 is a diagram of an example of a process of the gradation processing performed by the first bit arithmetic unit according to the fourth embodiment. FIG. 26 is a diagram of an example of a process of the gradation processing performed by the second bit arithmetic unit according to the fourth embodiment. FIG. 27 is a diagram of the display gradation values visually recognized on the display panel according to the fourth embodiment. FIG. 28 is a diagram schematically illustrating the relation between the gradation at each part in the display device according to the fourth embodiment and the display gradation values visually recognized on the display panel.

As illustrated in FIGS. 25 and 26, the 8-bit depth (256 gradations) gradation data of R (red), G (green), and B (blue) included in the image signal received by a signal processor 100d are converted by the image processor 10d into RGB signals including 5-bit depth (32 gradations) gradation data of R (red), G (green), and B (blue) and a W signal including a 5-bit depth (32 gradations) gradation datum of W (white). The RGB signals converted into the 5-bit depth (32 gradations) gradation data are received by a first bit arithmetic unit 201d of a gradation processor 20d. The W signal converted into the 5-bit depth (32 gradations) gradation datum is received by a second bit arithmetic unit 202d of the gradation processor 20d. In FIGS. 25 and 26, the image processor 10d discards the second and less significant bits of each of the 8-bit depth (256 gradations) gradation data of the RGB signals to generate 5-bit depth (32 gradations) gradation data and discards the second and less significant bits of the 8-bit depth (256 gradations) gradation datum of the W signal to generate a 5-bit depth (32 gradations) gradation datum, for example.

The first bit arithmetic unit 201d of the gradation processor 20d converts the 5-bit depth (32 gradations) gradation data of the RGB signals into 3-bit depth (8 gradations) gradation data. Specifically, as illustrated in FIG. 25, the first bit arithmetic unit 201d adds the value of the first bit of each of the 5-bit depth (32 gradations) gradation data of R (red), G (green), and B (blue) to the value of the second bit. Subsequently, the first bit arithmetic unit 201*d* discards the first and less significant bits to generate the 3-bit depth (8 gradations) gradation data and outputs them to the display panel 30*d*. In the gradation processing, the first bit arithmetic unit 201*d* of the gradation processor 20*d* does not add the value of the first bit to the value of the second bit of each of the gradation data "111" of R (red), G (green), and B (blue). This mechanism can prevent bit overflow.

The second bit arithmetic unit 202*d* of the gradation processor 20*d* converts the 5-bit depth (32 gradations) gradation data of the W signals into 3-bit depth (8 gradations) gradation data. Specifically, as illustrated in FIG. 26, the second bit arithmetic unit 202*d* adds the value of the zeroth bit of the 5-bit depth (32 gradations) gradation datum of W (white) to the value of the second bit. Subsequently, the second bit arithmetic unit 202*d* discards the first and less significant bits to generate the 3-bit depth (8 gradations) gradation datum and outputs it to the display panel 30*d*. In the gradation processing, the second bit arithmetic unit 202*d* of the gradation processor 20*d* does not add the value of the zeroth bit to the value of the second bit of each of the gradation data "111" of W (white). This mechanism can prevent bit overflow.

When the gradation data of the RGB signals (first signal) and the gradation datum of the W signal (second signal) of the image signal prior to the gradation processing have the same value, output signals resulting from the gradation processing by the gradation processor 20*d* include an output signal in which the gradation data of the RGB signals (first signal) and the gradation datum of the W signal (second signal) have the same value and an output signal in which the gradation data of the RGB signals (first signal) and the gradation datum of the W signal (second signal) have values different from each other by 1. If the gradation data of the RGB signals (first signal) and the gradation datum of the W signal (second signal) resulting from the gradation processing have values different from each other by 1, the display device 1*d* can express the intermediate values of the gradation values on the display panel 30*d* capable of performing gradation expression with 3-bit depth, that is, 8 gradations.

As illustrated in FIGS. 27 and 28, when the value obtained by multiplying the gradation value of each of the gradation data of R (red), G (green), and B (blue) resulting from the gradation processing by 2 is "0", and the gradation value of the gradation datum of W (white) resulting from the gradation processing is "0", the sum of the value "0" obtained by multiplying the gradation value of each of the gradation data of R (red), G (green), and B (blue) by 2 and the gradation value "0" of the gradation datum of W (white) resulting from the gradation processing is "0". In this case, the apparent display gradation value of an image displayed on the display panel 30*d* capable of performing gradation expression with 3-bit depth (8 gradations) is "0.00" (refer to A in FIGS. 27 and 28).

As illustrated in FIGS. 27 and 28, when the value obtained by multiplying the gradation value of each of the gradation data of R (red), G (green), and B (blue) resulting from the gradation processing by 2 is "0", and the gradation value of the gradation datum of W (white) resulting from the gradation processing is "1", the sum of the value "0" obtained by multiplying the gradation value of each of the gradation data of R (red), G (green), and B (blue) by 2 and the gradation value "1" of the gradation datum of W (white) resulting from the gradation processing is "1". In this case, the apparent display gradation value of an image displayed on the display panel 30*d* capable of performing gradation expression with 3-bit depth (8 gradations) is "0.33" (refer to B in FIGS. 27 and 28).

As illustrated in FIGS. 27 and 28, when the value obtained by multiplying the gradation value of each of the gradation data of R (red), G (green), and B (blue) resulting from the gradation processing by 2 is "2", and the gradation value of the gradation datum of W (white) resulting from the gradation processing is "0", the sum of the value "2" obtained by multiplying the gradation value of each of the gradation data of R (red), G (green), and B (blue) by 2 and the gradation value "0" of the gradation datum of W (white) resulting from the gradation processing is "2". In this case, the apparent display gradation value of an image displayed on the display panel 30*d* capable of performing gradation expression with 3-bit depth (8 gradations) is "0.67" (refer to C in FIGS. 27 and 28).

As illustrated in FIGS. 27 and 28, when the value obtained by multiplying the gradation value of each of the gradation data of R (red), G (green), and B (blue) resulting from the gradation processing by 2 is "2", and the gradation value of the gradation datum of W (white) resulting from the gradation processing is "1", the sum of the value "2" obtained by multiplying the gradation value of each of the gradation data of R (red), G (green), and B (blue) by 2 and the gradation value "1" of the gradation datum of W (white) resulting from the gradation processing is "3". In this case, the apparent display gradation value of an image displayed on the display panel 30*d* capable of performing gradation expression with 3-bit depth (8 gradations) is "1.00" (refer to D in FIGS. 27 and 28).

As illustrated in FIGS. 27 and 28, when the value obtained by multiplying the gradation value of each of the gradation data of R (red), G (green), and B (blue) resulting from the gradation processing by 2 is "2", and the gradation value of the gradation datum of W (white) resulting from the gradation processing is "2", the sum of the value "2" obtained by multiplying the gradation value of each of the gradation data of R (red), G (green), and B (blue) by 2 and the gradation value "2" of the gradation datum of W (white) resulting from the gradation processing is "4". In this case, the apparent display gradation value of an image displayed on the display panel 30*d* capable of performing gradation expression with 3-bit depth (8 gradations) is "1.33" (refer to E in FIGS. 27 and 28).

As illustrated in FIGS. 27 and 28, when the value obtained by multiplying the gradation value of each of the gradation data of R (red), G (green), and B (blue) resulting from the gradation processing by 2 is "4", and the gradation value of the gradation datum of W (white) resulting from the gradation processing is "1", the sum of the value "4" obtained by multiplying the gradation value of each of the gradation data of R (red), G (green), and B (blue) by 2 and the gradation value "1" of the gradation datum of W (white) resulting from the gradation processing is "5". In this case, the apparent display gradation value of an image displayed on the display panel 30*d* capable of performing gradation expression with 3-bit depth (8 gradations) is "1.67" (refer to F in FIGS. 27 and 28).

As illustrated in FIGS. 27 and 28, when the value obtained by multiplying the gradation value of each of the gradation data of R (red), G (green), and B (blue) resulting from the gradation processing by 2 is "4", and the gradation value of the gradation datum of W (white) resulting from the gradation processing is "2", the sum of the value "4" obtained by multiplying the gradation value of each of the gradation data of R (red), G (green), and B (blue) by 2 and the gradation value "2" of the gradation datum of W (white) resulting from the gradation processing is "6". In this case, the apparent display gradation value of an image displayed on the display panel 30*d* capable of performing gradation expression with 3-bit depth (8 gradations) is "2.00" (refer to G in FIGS. 27 and 28).

As illustrated in FIGS. 27 and 28, when the value obtained by multiplying the gradation value of each of the gradation data of R (red), G (green), and B (blue) resulting from the gradation processing by 2 is "4", and the gradation value of the gradation datum of W (white) resulting from the gradation processing is "3", the sum of the value "4" obtained by multiplying the gradation value of each of the gradation data of R (red), G (green), and B (blue) by 2 and the gradation value "3" of the gradation datum of W (white) resulting from the gradation processing is "7". In this case, the apparent display gradation value of an image displayed on the display panel 30*d* capable of performing gradation expression with 3-bit depth (8 gradations) is "2.33" (refer to H in FIGS. 27 and 28).

As illustrated in FIGS. 27 and 28, when the value obtained by multiplying the gradation value of each of the gradation data of R (red), G (green), and B (blue) resulting from the gradation processing by 2 is "6", and the gradation value of the gradation datum of W (white) resulting from the gradation processing is "2", the sum of the value "6" obtained by multiplying the gradation value of each of the gradation data of R (red), G (green), and B (blue) by 2 and the gradation value "2" of the gradation datum of W (white) resulting from the gradation processing is "8". In this case, the apparent display gradation value of an image displayed on the display panel 30*d* capable of performing gradation expression with 3-bit depth (8 gradations) is "2.67" (refer to I in FIGS. 27 and 28).

As illustrated in FIGS. 27 and 28, when the value obtained by multiplying the gradation value of each of the gradation data of R (red), G (green), and B (blue) resulting from the gradation processing by 2 is "6", and the gradation value of the gradation datum of W (white) resulting from the gradation processing is "3", the sum of the value "6" obtained by multiplying the gradation value of each of the gradation data of R (red), G (green), and B (blue) by 2 and the gradation value "3" of the gradation datum of W (white) resulting from the gradation processing is "9". In this case, the apparent display gradation value of an image displayed on the display panel 30*d* capable of performing gradation expression with 3-bit depth (8 gradations) is "3.00" (refer to J in FIGS. 27 and 28).

As illustrated in FIGS. 27 and 28, when the value obtained by multiplying the gradation value of each of the gradation data of R (red), G (green), and B (blue) resulting from the gradation processing by 2 is "6", and the gradation value of the gradation datum of W (white) resulting from the gradation processing is "4", the sum of the value "6" obtained by multiplying the gradation value of each of the gradation data of R (red), G (green), and B (blue) by 2 and the gradation value "4" of the gradation datum of W (white) resulting from the gradation processing is "10". In this case, the apparent display gradation value of an image displayed on the display panel 30*d* capable of performing gradation expression with 3-bit depth (8 gradations) is "3.33" (refer to K in FIGS. 27 and 28).

As illustrated in FIGS. 27 and 28, when the value obtained by multiplying the gradation value of each of the gradation data of R (red), G (green), and B (blue) resulting from the gradation processing by 2 is "8", and the gradation value of the gradation datum of W (white) resulting from the gradation processing is "3", the sum of the value "8" obtained by multiplying the gradation value of each of the gradation data of R (red), G (green), and B (blue) by 2 and the gradation value "3" of the gradation datum of W (white) resulting from the gradation processing is "11". In this case, the apparent display gradation value of an image displayed on the display panel 30*d* capable of performing gradation expression with 3-bit depth (8 gradations) is "3.67" (refer to L in FIGS. 27 and 28).

As illustrated in FIGS. 27 and 28, when the value obtained by multiplying the gradation value of each of the gradation data of R (red), G (green), and B (blue) resulting from the gradation processing by 2 is "8", and the gradation value of the gradation datum of W (white) resulting from the gradation processing is "4", the sum of the value "8" obtained by multiplying the gradation value of each of the gradation data of R (red), G (green), and B (blue) by 2 and the gradation value "4" of the gradation datum of W (white) resulting from the gradation processing is "12". In this case, the apparent display gradation value of an image displayed on the display panel 30*d* capable of performing gradation expression with 3-bit depth (8 gradations) is "4.00" (refer to M in FIGS. 27 and 28).

As illustrated in FIGS. 27 and 28, when the value obtained by multiplying the gradation value of each of the gradation data of R (red), G (green), and B (blue) resulting from the gradation processing by 2 is "8", and the gradation value of the gradation datum of W (white) resulting from the gradation processing is "5", the sum of the value "8" obtained by multiplying the gradation value of each of the gradation data of R (red), G (green), and B (blue) by 2 and the gradation value "5" of the gradation datum of W (white) resulting from the gradation processing is "13". In this case, the apparent display gradation value of an image displayed on the display panel 30*d* capable of performing gradation expression with 3-bit depth (8 gradations) is "4.33" (refer to N in FIGS. 27 and 28).

As illustrated in FIGS. 27 and 28, when the value obtained by multiplying the gradation value of each of the gradation data of R (red), G (green), and B (blue) resulting from the gradation processing by 2 is "10", and the gradation value of the gradation datum of W (white) resulting from the gradation processing is "4", the sum of the value "10" obtained by multiplying the gradation value of each of the gradation data of R (red), G (green), and B (blue) by 2 and the gradation value "4" of the gradation datum of W (white) resulting from the gradation processing is "14". In this case, the apparent display gradation value of an image displayed on the display panel 30*d* capable of performing gradation expression with 3-bit depth (8 gradations) is "4.67" (refer to O in FIGS. 27 and 28).

As illustrated in FIGS. 27 and 28, when the value obtained by multiplying the gradation value of each of the gradation data of R (red), G (green), and B (blue) resulting from the gradation processing by 2 is "10", and the gradation value of the gradation datum of W (white) resulting from the gradation processing is "5", the sum of the value "10" obtained by multiplying the gradation value of each of the gradation data of R (red), G (green), and B (blue) by 2 and the gradation value "5" of the gradation datum of W (white) resulting from the gradation processing is "15". In this case, the apparent display gradation value of an image displayed on the display panel 30*d* capable of performing gradation expression with 3-bit depth (8 gradations) is "5.00" (refer to P in FIGS. 27 and 28).

As illustrated in FIGS. 27 and 28, when the value obtained by multiplying the gradation value of each of the gradation data of R (red), G (green), and B (blue) resulting from the gradation processing by 2 is "10", and the gradation value of the gradation datum of W (white) resulting from the gradation processing is "6", the sum of the value "10" obtained by multiplying the gradation value of each of the gradation data of R (red), G (green), and B (blue) by 2 and the gradation value "6" of the gradation datum of W (white) resulting from the gradation processing is "16". In this case, the apparent display gradation value of an image displayed on the display panel 30d capable of performing gradation expression with 3-bit depth (8 gradations) is "5.33" (refer to Q in FIGS. 27 and 28).

As illustrated in FIGS. 27 and 28, when the value obtained by multiplying the gradation value of each of the gradation data of R (red), G (green), and B (blue) resulting from the gradation processing by 2 is "12", and the gradation value of the gradation datum of W (white) resulting from the gradation processing is "5", the sum of the value "12" obtained by multiplying the gradation value of each of the gradation data of R (red), G (green), and B (blue) by 2 and the gradation value "5" of the gradation datum of W (white) resulting from the gradation processing is "17". In this case, the apparent display gradation value of an image displayed on the display panel 30d capable of performing gradation expression with 3-bit depth (8 gradations) is "5.67" (refer to R in FIGS. 27 and 28).

As illustrated in FIGS. 27 and 28, when the value obtained by multiplying the gradation value of each of the gradation data of R (red), G (green), and B (blue) resulting from the gradation processing by 2 is "12", and the gradation value of the gradation datum of W (white) resulting from the gradation processing is "6", the sum of the value "12" obtained by multiplying the gradation value of each of the gradation data of R (red), G (green), and B (blue) by 2 and the gradation value "6" of the gradation datum of W (white) resulting from the gradation processing is "18". In this case, the apparent display gradation value of an image displayed on the display panel 30d capable of performing gradation expression with 3-bit depth (8 gradations) is "6.00" (refer to S in FIGS. 27 and 28).

As illustrated in FIGS. 27 and 28, when the value obtained by multiplying the gradation value of each of the gradation data of R (red), G (green), and B (blue) resulting from the gradation processing by 2 is "12", and the gradation value of the gradation datum of W (white) resulting from the gradation processing is "7", the sum of the value "12" obtained by multiplying the gradation value of each of the gradation data of R (red), G (green), and B (blue) by 2 and the gradation value "7" of the gradation datum of W (white) resulting from the gradation processing is "19". In this case, the apparent display gradation value of an image displayed on the display panel 30d capable of performing gradation expression with 3-bit depth (8 gradations) is "6.33" (refer to T in FIGS. 27 and 28).

As illustrated in FIGS. 27 and 28, when the value obtained by multiplying the gradation value of each of the gradation data of R (red), G (green), and B (blue) resulting from the gradation processing by 2 is "14", and the gradation value of the gradation datum of W (white) resulting from the gradation processing is "6", the sum of the value "14" obtained by multiplying the gradation value of each of the gradation data of R (red), G (green), and B (blue) by 2 and the gradation value "6" of the gradation datum of W (white) resulting from the gradation processing is "20". In this case, the apparent display gradation value of an image displayed on the display panel 30d capable of performing gradation expression with 3-bit depth (8 gradations) is "6.67" (refer to U in FIGS. 27 and 28).

As illustrated in FIGS. 27 and 28, when the value obtained by multiplying the gradation value of each of the gradation data of R (red), G (green), and B (blue) resulting from the gradation processing by 2 is "14", and the gradation value of the gradation datum of W (white) resulting from the gradation processing is "7", the sum of the value "14" obtained by multiplying the gradation value of each of the gradation data of R (red), G (green), and B (blue) by 2 and the gradation value "7" of the gradation datum of W (white) resulting from the gradation processing is "21". In this case, the apparent display gradation value of an image displayed on the display panel 30d capable of performing gradation expression with 3-bit depth (8 gradations) is "7.00" (refer to V in FIGS. 27 and 28).

As described above, the display device 1d of the present embodiment can express the intermediate values of the gradation values on the display panel 30d capable of performing gradation expression with 3-bit depth (8 gradations). Consequently, the display device 1d enables apparent gradation visually recognized on the display panel 30d, which can perform gradation expression with 3-bit depth (8 gradations), to have 22 levels as illustrated in FIGS. 27 and 28.

Figure 29A:
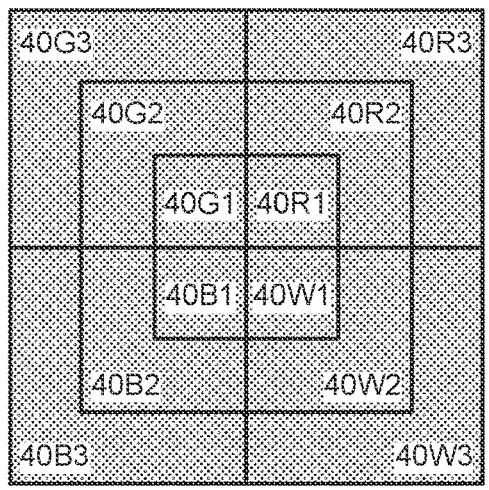
FIG. 29A is a diagram of a display pattern of the R sub-pixel, the G sub-pixel, the B sub-pixel, and the W sub-pixel indicated by A in FIGS. 27 and 28.
Figure 29B:
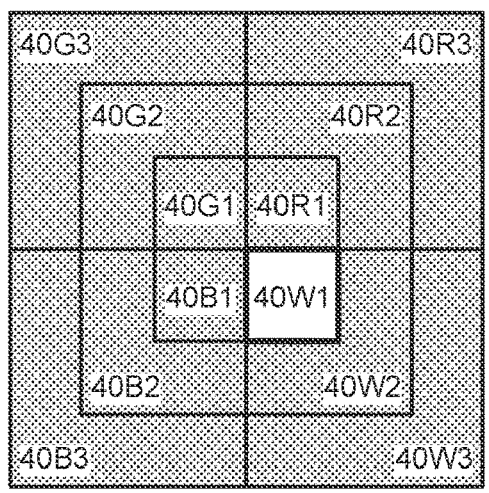
FIG. 29B is a diagram of a display pattern of the R sub-pixel, the G sub-pixel, the B sub-pixel, and the W sub-pixel indicated by B in FIGS. 27 and 28.
Figure 29C:
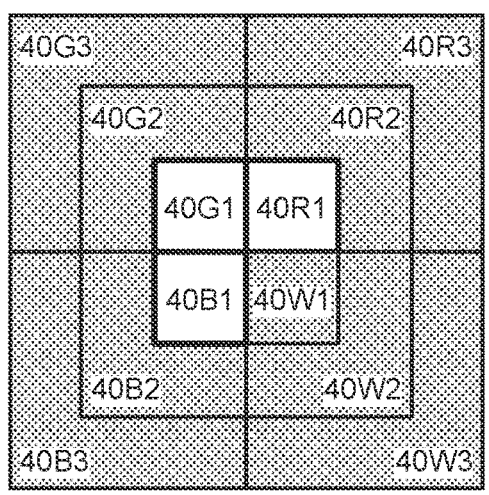
FIG. 29C is a diagram of a display pattern of the R sub-pixel, the G sub-pixel, the B sub-pixel, and the W sub-pixel indicated by C in FIGS. 27 and 28.
Figure 29D:
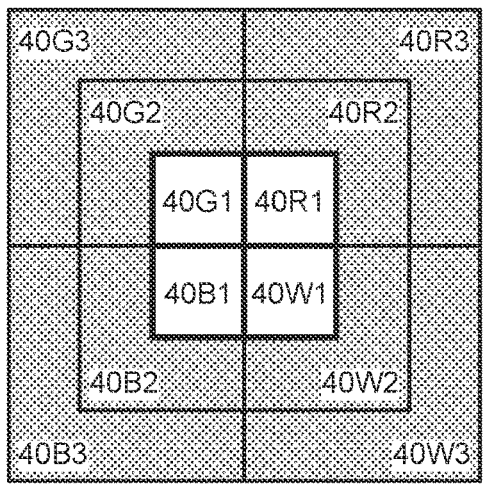
FIG. 29D is a diagram of a display pattern of the R sub-pixel, the G sub-pixel, the B sub-pixel, and the W sub-pixel indicated by D in FIGS. 27 and 28.
Figure 29E:
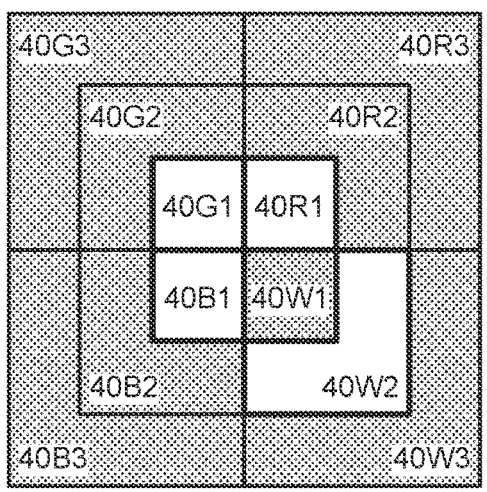
FIG. 29E is a diagram of a display pattern of the R sub-pixel, the G sub-pixel, the B sub-pixel, and the W sub-pixel indicated by E in FIGS. 27 and 28.
Figure 29F:
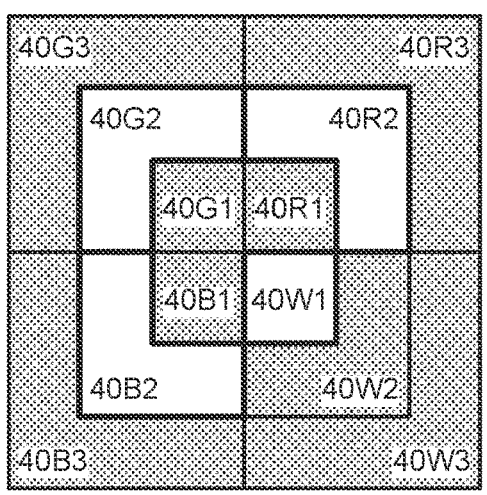
FIG. 29F is a diagram of a display pattern of the R sub-pixel, the G sub-pixel, the B sub-pixel, and the W sub-pixel indicated by F in FIGS. 27 and 28.
Figure 29G:
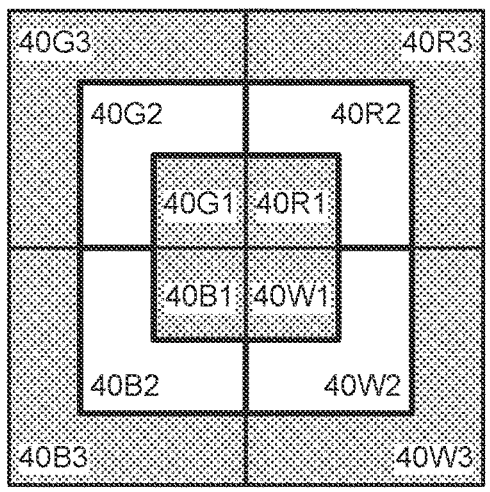
FIG. 29G is a diagram of a display pattern of the R sub-pixel, the G sub-pixel, the B sub-pixel, and the W sub-pixel indicated by G in FIGS. 27 and 28.
Figure 29H:
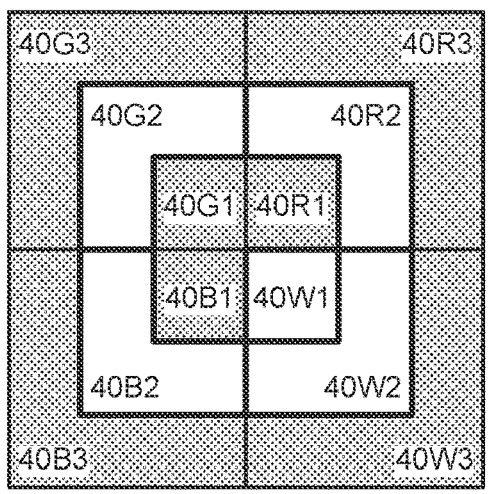
FIG. 29H is a diagram of a display pattern of the R sub-pixel, the G sub-pixel, the B sub-pixel, and the W sub-pixel indicated by H in FIGS. 27 and 28.
Figure 29I:
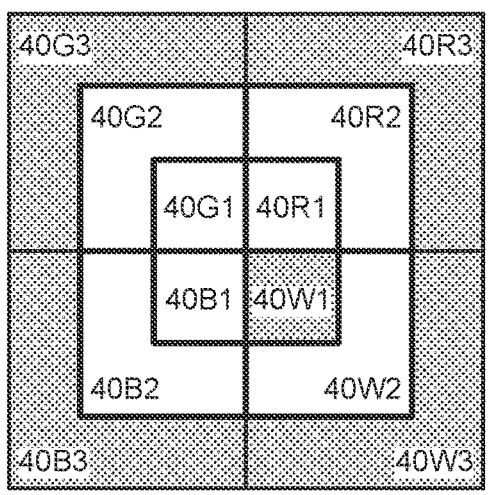
FIG. 29I is a diagram of a display pattern of the R sub-pixel, the G sub-pixel, the B sub-pixel, and the W sub-pixel indicated by I in FIGS. 27 and 28.
Figure 29J:
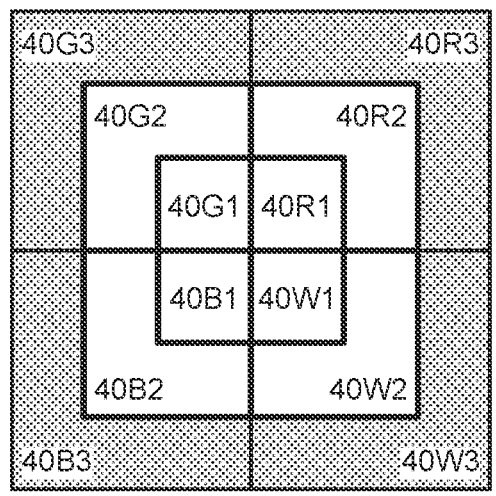
FIG. 29J is a diagram of a display pattern of the R sub-pixel, the G sub-pixel, the B sub-pixel, and the W sub-pixel indicated by J in FIGS. 27 and 28.
Figure 29K:
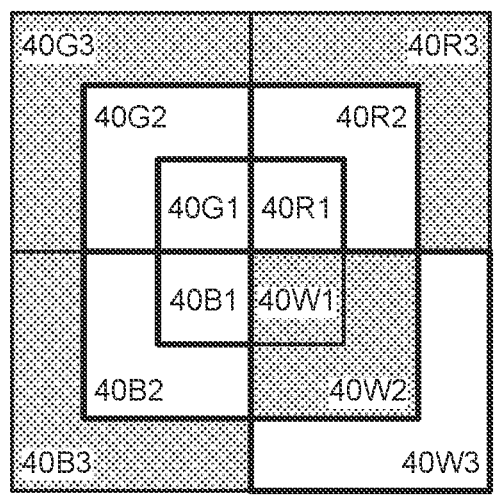
FIG. 29K is a diagram of a display pattern of the R sub-pixel, the G sub-pixel, the B sub-pixel, and the W sub-pixel indicated by K in FIGS. 27 and 28.
Figure 29L:
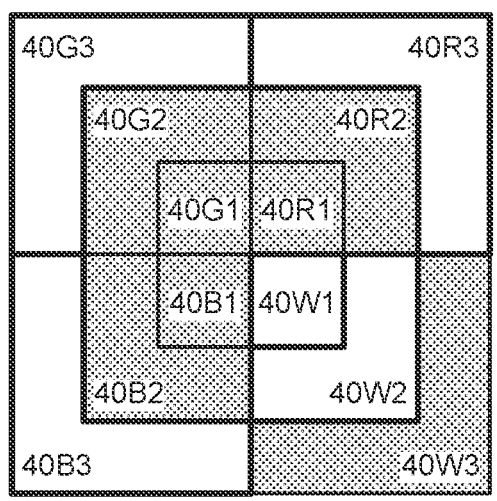
FIG. 29L is a diagram of a display pattern of the R sub-pixel, the G sub-pixel, the B sub-pixel, and the W sub-pixel indicated by L in FIGS. 27 and 28.
Figure 29M:
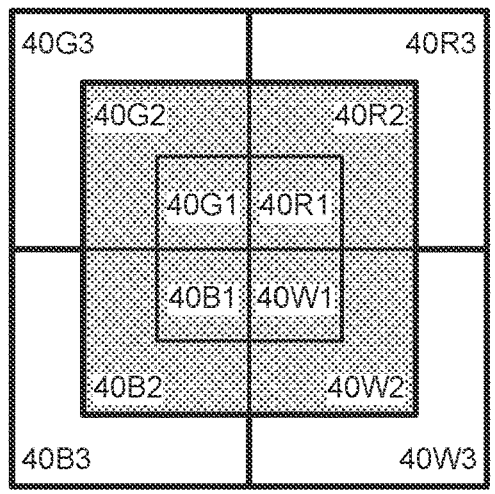
FIG. 29M is a diagram of a display pattern of the R sub-pixel, the G sub-pixel, the B sub-pixel, and the W sub-pixel indicated by M in FIGS. 27 and 28.
Figure 29N:
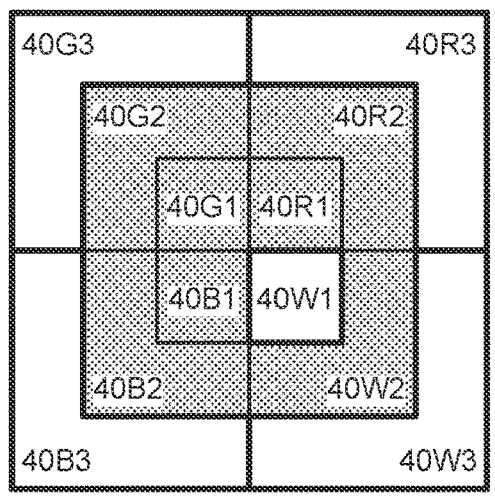
FIG. 29N is a diagram of a display pattern of the R sub-pixel, the G sub-pixel, the B sub-pixel, and the W sub-pixel indicated by N in FIGS. 27 and 28.
Figure 29O:
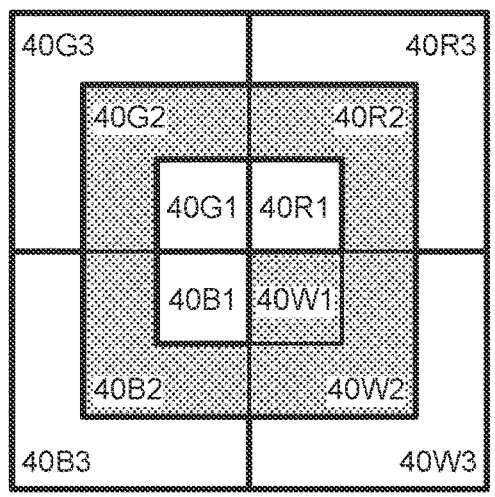
FIG. 29O is a diagram of a display pattern of the R sub-pixel, the G sub-pixel, the B sub-pixel, and the W sub-pixel indicated by O in FIGS. 27 and 28.
Figure 29P:
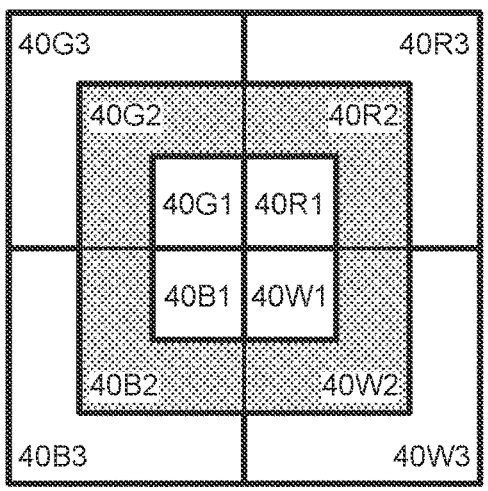
FIG. 29P is a diagram of a display pattern of the R sub-pixel, the G sub-pixel, the B sub-pixel, and the W sub-pixel indicated by P in FIGS. 27 and 28.
Figure 29Q:
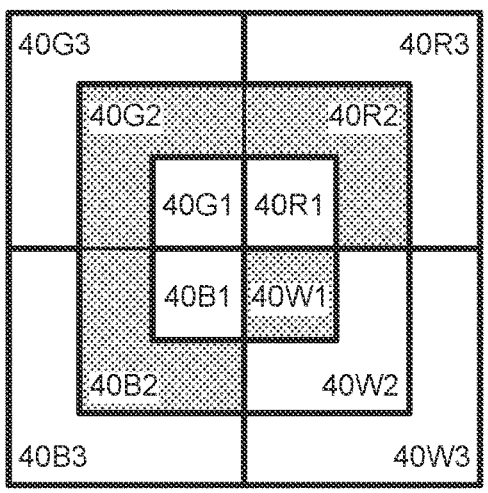
FIG. 29Q is a diagram of a display pattern of the R sub-pixel, the G sub-pixel, the B sub-pixel, and the W sub-pixel indicated by Q in FIGS. 27 and 28.
Figure 29R:
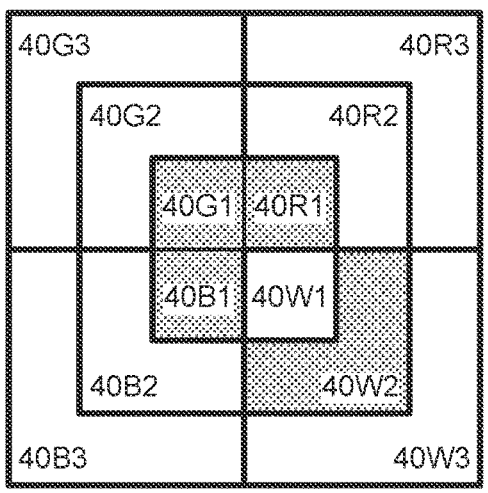
FIG. 29R is a diagram of a display pattern of the R sub-pixel, the G sub-pixel, the B sub-pixel, and the W sub-pixel indicated by R in FIGS. 27 and 28.
Figure 29S:
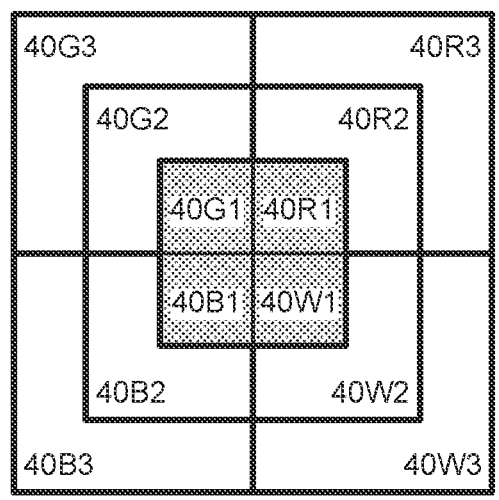
FIG. 29S is a diagram of a display pattern of the R sub-pixel, the G sub-pixel, the B sub-pixel, and the W sub-pixel indicated by S in FIGS. 27 and 28.
Figure 29T:
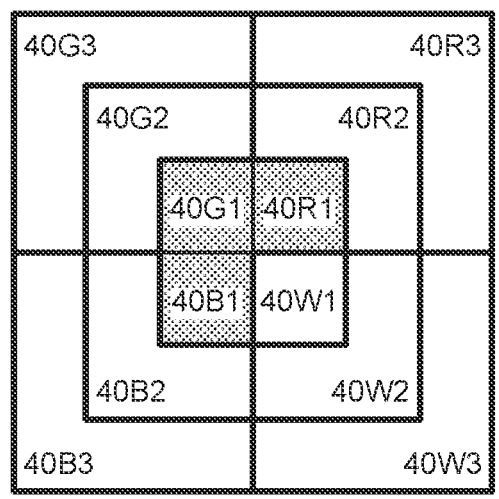
FIG. 29T is a diagram of a display pattern of the R sub-pixel, the G sub-pixel, the B sub-pixel, and the W sub-pixel indicated by T in FIGS. 27 and 28.
Figure 29U:
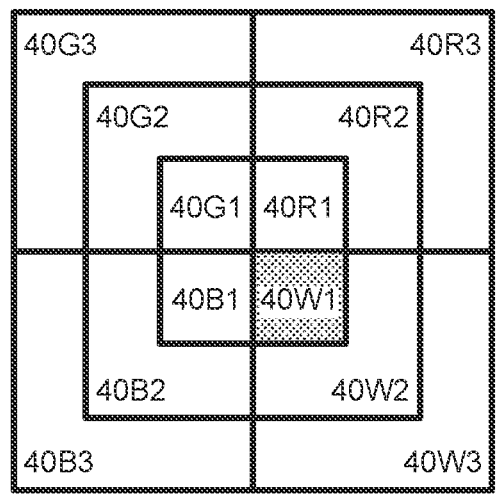
FIG. 29U is a diagram of a display pattern of the R sub-pixel, the G sub-pixel, the B sub-pixel, and the W sub-pixel indicated by U in FIGS. 27 and 28.
Figure 29V:
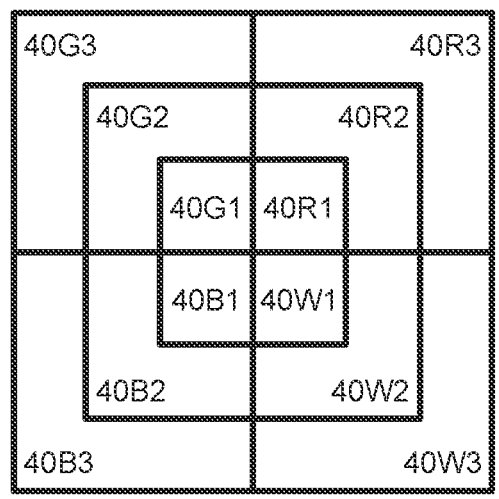
FIG. 29V is a diagram of a display pattern of the R sub-pixel, the G sub-pixel, the B sub-pixel, and the W sub-pixel indicated by V in FIGS. 27 and 28.

FIG. 29A is a diagram of a display pattern of the R sub-pixel, the G sub-pixel, the B sub-pixel, and the W sub-pixel indicated by A in FIGS. 27 and 28. FIG. 29B is a diagram of a display pattern of the R sub-pixel, the G sub-pixel, the B sub-pixel, and the W sub-pixel indicated by B in FIGS. 27 and 28. FIG. 29C is a diagram of a display pattern of the R sub-pixel, the G sub-pixel, the B sub-pixel, and the W sub-pixel indicated by C in FIGS. 27 and 28. FIG. 29D is a diagram of a display pattern of the R sub-pixel, the G sub-pixel, the B sub-pixel, and the W sub-pixel indicated by D in FIGS. 27 and 28. FIG. 29E is a diagram of a display pattern of the R sub-pixel, the G sub-pixel, the B sub-pixel, and the W sub-pixel indicated by E in FIGS. 27 and 28. FIG. 29F is a diagram of a display pattern of the R sub-pixel, the G sub-pixel, the B sub-pixel, and the W sub-pixel indicated by F in FIGS. 27 and 28. FIG. 29G is a diagram of a display pattern of the R sub-pixel, the G sub-pixel, the B sub-pixel, and the W sub-pixel indicated by G in FIGS. 27 and 28. FIG. 29H is a diagram of a display pattern of the R sub-pixel, the G sub-pixel, the B sub-pixel, and the W sub-pixel indicated by H in FIGS. 27 and 28. FIG. 29I is a diagram of a display pattern of the R sub-pixel, the G sub-pixel, the B sub-pixel, and the W sub-pixel indicated by I in FIGS. 27 and 28. FIG. 29J is a diagram of a display pattern of the R sub-pixel, the G sub-pixel, the B sub-pixel, and the W sub-pixel indicated by J in FIGS. 27 and 28. FIG. 29K is a diagram of a display pattern of the R sub-pixel, the G sub-pixel, the B sub-pixel, and the W sub-pixel indicated by K in FIGS. 27 and 28. FIG. 29L is a diagram of a display pattern of the R sub-pixel, the G sub-pixel, the B sub-pixel, and the W sub-pixel indicated by L in FIGS. 27 and 28. FIG. 29M is a diagram of a display pattern of the R sub-pixel, the G sub-pixel, the B sub-pixel, and the W sub-pixel indicated by M in FIGS. 27 and 28. FIG. 29N is a diagram of a display pattern of the R sub-pixel, the G sub-pixel, the B sub-pixel, and the W sub-pixel indicated by N in FIGS. 27 and 28. FIG. 29O is a diagram of a display pattern of the R sub-pixel, the G sub-pixel, the B sub-pixel, and the W sub-pixel indicated by O in FIGS. 27 and 28. FIG. 29P is a diagram of a display pattern of the R sub-pixel, the G sub-pixel, the B sub-pixel, and the W sub-pixel indicated by P in FIGS. 27 and 28. FIG. 29Q is a diagram of a display pattern of the R sub-pixel, the G sub-pixel, the B sub-pixel, and the W sub-pixel indicated by Q in FIGS. 27 and 28. FIG. 29R is a diagram of a display pattern of the R sub-pixel, the G sub-pixel, the B sub-pixel, and the W sub-pixel indicated by R in FIGS. 27 and 28. FIG. 29S is a diagram of a display pattern of the R sub-pixel, the G sub-pixel, the B sub-pixel, and the W sub-pixel indicated by S in FIGS. 27 and 28. FIG. 29T is a diagram of a display pattern of the R sub-pixel, the G sub-pixel, the B sub-pixel, and the W sub-pixel indicated by T in FIGS. 27 and 28. FIG. 29U is a diagram of a display pattern of the R sub-pixel, the G sub-pixel, the B sub-pixel, and the W sub-pixel indicated by U in FIGS. 27 and 28. FIG. 29V is a diagram of a display pattern of the R sub-pixel, the G sub-pixel, the B sub-pixel, and the W sub-pixel indicated by V in FIGS. 27 and 28. The display patterns illustrated in FIGS. 29A to 29V are given by way of example only, and the display patterns of the R sub-pixel, the G sub-pixel, the B sub-pixel, and the W sub-pixel are not limited to the examples illustrated in FIGS. 29A to 29V.

As described above, in the example illustrated in FIGS. 29A to 29V, the ratio of the display luminance of the segments 40R1, 40G1, and 40B1 to the display luminance of the segment 40W1 according to the present embodiment is 2:1, the ratio of the display luminance of the segments 40R2, 40G2, and 40B2 to the display luminance of the segment 40W2 is 2:1, and the ratio of the display luminance of the segments 40R3, 40G3, and 40B3 to the display luminance of the segment 40W3 is 2:1.

In the examples illustrated in FIGS. 29A to 29V, the display gradation of the hatched segments 40R1, 40G1, 40B1, and 40W1 is "0", the display gradation of the outlined segments 40R1, 40G1, and 40B1 is "2", and the display gradation of the outlined segment 40W1 is "1".

In the examples illustrated in FIGS. 29A to 29V, the display gradation of the hatched segments 40R2, 40G2, 40B2, and 40W2 is "0", the display gradation of the outlined segments 40R2, 40G2, and 40B2 is "4", and the display gradation of the outlined segment 40W2 is "2".

In the examples illustrated in FIGS. 29A to 29V, the display gradation of the hatched segments 40R3, 40G3, 40B3, and 40W3 is "0", the display gradation of the outlined segments 40R3, 40G3, and 40B3 is "8", and the display gradation of the outlined segment 40W3 is "4".

In a display pattern A illustrated in FIG. 29A, the display gradation of all the sub-pixels is "0", and the gradation value of the pixel 42 is "0". In this case, the apparent display gradation value in the pixel 42 capable of performing gradation expression with 3-bit depth (8 gradations) is "0.00".

In a display pattern B illustrated in FIG. 29B, the display gradation of the segment 40W1 is "1". As a result, the gradation value of the pixel 42 is "1". In this case, the apparent display gradation value in the pixel 42 capable of performing gradation expression with 3-bit depth (8 gradations) is "0.33".

In a display pattern C illustrated in FIG. 29C, the display gradation of the segments 40R1, 40G1, and 40B1 is "2". As a result, the gradation value of the pixel 42 is "2". In this case, the apparent display gradation value in the pixel 42 capable of performing gradation expression with 3-bit depth (8 gradations) is "0.67".

In a display pattern D illustrated in FIG. 29D, the display gradation of the segments 40R1, 40G1, and 40B1 is "2", and the display gradation of the segment 40W2 is "1". As a result, the gradation value of the pixel 42 is "3". In this case, the apparent display gradation value in the pixel 42 capable of performing gradation expression with 3-bit depth (8 gradations) is "1.00".

In a display pattern E illustrated in FIG. 29E, the display gradation of the segments 40R1, 40G1, and 40B1 is "2", and the display gradation of the segment 40W2 is "2". As a result, the gradation value of the pixel 42 is "4". In this case, the apparent display gradation value in the pixel 42 capable of performing gradation expression with 3-bit depth (8 gradations) is "1.33".

In a display pattern F illustrated in FIG. 29F, the display gradation of the segments 40R2, 40G2, and 40B2 is "4", and the display gradation of the segment 40W1 is "1". As a result, the gradation value of the pixel 42 is "5". In this case, the apparent display gradation value in the pixel 42 capable of performing gradation expression with 3-bit depth (8 gradations) is "1.67".

In a display pattern G illustrated in FIG. 29G, the display gradation of the segments 40R2, 40G2, and 40B2 is "4", and the display gradation of the segment 40W2 is "2". As a result, the gradation value of the pixel 42 is "6". In this case, the apparent display gradation value in the pixel 42 capable of performing gradation expression with 3-bit depth (8 gradations) is "2.00".

In a display pattern H illustrated in FIG. 29H, the display gradation of the segments 40R2, 40G2, and 40B2 is "4", the display gradation of the segment 40W1 is "1", and the display gradation of the segment 40W2 is "2". As a result, the gradation value of the pixel 42 is "7". In this case, the apparent display gradation value in the pixel 42 capable of performing gradation expression with 3-bit depth (8 gradations) is "2.33".

In a display pattern I illustrated in FIG. 29I, the display gradation of the segments 40R1, 40G1, and 40B1 is "2", the display gradation of the segments 40R2, 40G2, and 40B2 is "4", and the display gradation of the segment 40W2 is "2". As a result, the gradation value of the pixel 42 is "8". In this case, the apparent display gradation value in the pixel 42 capable of performing gradation expression with 3-bit depth (8 gradations) is "2.67".

In a display pattern J illustrated in FIG. 29J, the display gradation of the segments 40R1, 40G1, and 40B1 is "2", the display gradation of the segments 40R2, 40G2, and 40B2 is "4", the display gradation of the segment 40W1 is "1", and the display gradation of the segment 40W2 is "2". As a result, the gradation value of the pixel 42 is "9". In this case, the apparent display gradation value in the pixel 42 capable of performing gradation expression with 3-bit depth (8 gradations) is "3.00".

The display pattern having a gradation value of "9" of the pixel 42 visually recognized on the display panel 30d is not limited to the display pattern J illustrated in FIG. 29J. The display pattern may be formed by the display gradation "8" of the segments 40R3, 40G3, and 40B3 and the display gradation "1" of the segment 40W1, for example.

In a display pattern K illustrated in FIG. 29K, the display gradation of the segments 40R1, 40G1, and 40B1 is "2", the display gradation of the segments 40R2, 40G2, and 40B2 is "4", and the display gradation of the segment 40W3 is "4". As a result, the gradation value of the pixel 42 is "10". In this case, the apparent display gradation value in the pixel 42 capable of performing gradation expression with 3-bit depth (8 gradations) is "3.33".

The display pattern having a gradation value of "10" of the pixel 42 visually recognized on the display panel 30d is not limited to the display pattern K illustrated in FIG. 29K. The display pattern may be formed by the display gradation "8" of the segments 40R3, 40G3, and 40B3 and the display gradation "2" of the segment 40W2, for example.

In a display pattern L illustrated in FIG. 29L, the display gradation of the segments 40R3, 40G3, and 40B3 is "8", the display gradation of the segment 40W1 is "1", and the display gradation of the segment 40W2 is "2". As a result, the gradation value of the pixel 42 is "11". In this case, the apparent display gradation value in the pixel 42 capable of performing gradation expression with 3-bit depth (8 gradations) is "3.67".

The display pattern having a gradation value of "11" of the pixel 42 visually recognized on the display panel 30d is not limited to the display pattern L illustrated in FIG. 29L. The display pattern may be formed by the display gradation "2" of the segments 40R1, 40G1, and 40B1, the display gradation "8" of the segments 40R3, 40G3, and 40B3, and the display gradation "1" of the segment 40W1, for example.

In a display pattern M illustrated in FIG. 29M, the display gradation of the segments 40R3, 40G3, and 40B3 is "8", and the display gradation of the segment 40W3 is "4". As a result, the gradation value of the pixel 42 is "12". In this case, the apparent display gradation value in the pixel 42 capable of performing gradation expression with 3-bit depth (8 gradations) is "4.00".

The display pattern having a gradation value of "12" of the pixel 42 visually recognized on the display panel 30d is not limited to the display pattern M illustrated in FIG. 29M. The display pattern may be formed by the display gradation "2" of the segments 40R1, 40G1, and 40B1, the display gradation "8" of the segments 40R3, 40G3, and 40B3, and the display gradation "2" of the segment 40W2, for example.

In a display pattern N illustrated in FIG. 29N, the display gradation of the segments 40R3, 40G3, and 40B3 is "8", the display gradation of the segment 40W1 is "1", and the display gradation of the segment 40W3 is "4". As a result, the gradation value of the pixel 42 is "13". In this case, the apparent display gradation value in the pixel 42 capable of performing gradation expression with 3-bit depth (8 gradations) is "4.33".

The display pattern having a gradation value of "13" of the pixel 42 visually recognized on the display panel 30d is not limited to the display pattern N illustrated in FIG. 29N. The display pattern may be formed by the display gradation "2" of the segments 40R1, 40G1, and 40B1, the display gradation "8" of the segments 40R3, 40G3, and 40B3, the display gradation "1" of the segment 40W1, and the display gradation "2" of the segment 40W2, for example.

In a display pattern O illustrated in FIG. 29O, the display gradation of the segments 40R1, 40G1, and 40B1 is "2", the display gradation of the segments 40R3, 40G3, and 40B3 is "8", and the display gradation of the segment 40W3 is "4". As a result, the gradation value of the pixel 42 is "14". In this case, the apparent display gradation value in the pixel 42 capable of performing gradation expression with 3-bit depth (8 gradations) is "4.67".

The display pattern having a gradation value of "14" of the pixel 42 visually recognized on the display panel 30d is not limited to the display pattern O illustrated in FIG. 29O. The display pattern may be formed by the display gradation "4" of the segments 40R2, 40G2, and 40B2, the display gradation "8" of the segments 40R3, 40G3, and 40B3, and the display gradation "2" of the segment 40W2, for example.

In a display pattern P illustrated in FIG. 29P, the display gradation of the segments 40R1, 40G1, and 40B1 is "2", the display gradation of the segments 40R3, 40G3, and 40B3 is "8", the display gradation of the segment 40W1 is "1, and the display gradation of the segment 40W3 is "4". As a result, the gradation value of the pixel 42 is "15". In this case, the apparent display gradation value in the pixel 42 capable of performing gradation expression with 3-bit depth (8 gradations) is "5.00".

The display pattern having a gradation value of "15" of the pixel 42 visually recognized on the display panel 30d is not limited to the display pattern P illustrated in FIG. 29P. The display pattern may be formed by the display gradation "4" of the segments 40R2, 40G2, and 40B2, the display gradation "8" of the segments 40R3, 40G3, and 40B3, the display gradation "1" of the segment 40W1, and the display gradation "2" of the segment 40W2, for example.

In a display pattern Q illustrated in FIG. 29Q, the display gradation of the segments 40R1, 40G1, and 40B1 is "2", the display gradation of the segments 40R3, 40G3, and 40B3 is "8", the display gradation of the segment 40W2 is "2, and the display gradation of the segment 40W3 is "4". As a result, the gradation value of the pixel 42 is "16". In this case, the apparent display gradation value in the pixel 42 capable of performing gradation expression with 3-bit depth (8 gradations) is "5.33".

The display pattern having a gradation value of "16" of the pixel 42 visually recognized on the display panel 30d is not limited to the display pattern Q illustrated in FIG. 29Q. The display pattern may be formed by the display gradation "4" of the segments 40R2, 40G2, and 40B2, the display gradation "8" of the segments 40R3, 40G3, and 40B3, and the display gradation "4" of the segment 40W3, for example.

In a display pattern R illustrated in FIG. 29R, the display gradation of the segments 40R2, 40G2, and 40B2 is "4", the display gradation of the segments 40R3, 40G3, and 40B3 is "8", the display gradation of the segment 40W1 is "1", and the display gradation of the segment 40W3 is "4". As a result, the gradation value of the pixel 42 is "17". In this case, the apparent display gradation value in the pixel 42 capable of performing gradation expression with 3-bit depth (8 gradations) is "5.67".

The display pattern having a gradation value of "17" of the pixel 42 visually recognized on the display panel 30d is not limited to the display pattern R illustrated in FIG. 29R. The display pattern may be formed by the display gradation "2" of the segments 40R1, 40G1, and 40B1, the display gradation "4" of the segments 40R2, 40G2, and 40B2, the display gradation "8" of the segments 40R3, 40G3, and 40B3, the display gradation "1" of the segment 40W1, and the display gradation "2" of the segment 40W2, for example.

In a display pattern S illustrated in FIG. 29S, the display gradation of the segments 40R2, 40G2, and 40B2 is "4", the display gradation of the segments 40R3, 40G3, and 40B3 is "8", the display gradation of the segment 40W2 is "2", and the display gradation of the segment 40W3 is "4". As a result, the gradation value of the pixel 42 is "18". In this case, the apparent display gradation value in the pixel 42 capable of performing gradation expression with 3-bit depth (8 gradations) is "6.00".

The display pattern having a gradation value of "18" of the pixel 42 visually recognized on the display panel 30d is not limited to the display pattern S illustrated in FIG. 29S. The display pattern may be formed by the display gradation "2" of the segments 40R1, 40G1, and 40B1, the display gradation "4" of the segments 40R2, 40G2, and 40B2, the display gradation "8" of the segments 40R3, 40G3, and 40B3, and the display gradation "4" of the segment 40W3, for example.

In a display pattern T illustrated in FIG. 29T, the display gradation of the segments 40R2, 40G2, and 40B2 is "4", the display gradation of the segments 40R3, 40G3, and 40B3 is "8", the display gradation of the segment 40W1 is "1", the display gradation of the segment 40W2 is "2", and the display gradation of the segment 40W3 is "4". As a result, the gradation value of the pixel 42 is "19". In this case, the apparent display gradation value in the pixel 42 capable of performing gradation expression with 3-bit depth (8 gradations) is "6.33".

The display pattern having a gradation value of "19" of the pixel 42 visually recognized on the display panel 30d is not limited to the display pattern T illustrated in FIG. 29T. The display pattern may be formed by the display gradation "2" of the segments 40R1, 40G1, and 40B1, the display gradation "4" of the segments 40R2, 40G2, and 40B2, the display gradation "8" of the segments 40R3, 40G3, and 40B3, the display gradation "1" of the segment 40W1, and the display gradation "4" of the segment 40W3, for example.

In a display pattern U illustrated in FIG. 29U, the display gradation of the segments 40R1, 40G1, and 40B1 is "2", the display gradation of the segments 40R2, 40G2, and 40B2 is "4", the display gradation of the segments 40R3, 40G3, and 40B3 is "8", the display gradation of the segment 40W2 is "2", and the display gradation of the segment 40W3 is "4". As a result, the gradation value of the pixel 42 is "20". In this case, the apparent display gradation value in the pixel 42 capable of performing gradation expression with 3-bit depth (8 gradations) is "6.67".

In a display pattern V illustrated in FIG. 29V, the display gradation of the segments 40R1, 40G1, and 40B1 is "2", the display gradation of the segments 40R2, 40G2, and 40B2 is "4", the display gradation of the segments 40R3, 40G3, and 40B3 is "8", the display gradation of the segment 40W1 is "1", the display gradation of the segment 40W2 is "2", and the display gradation of the segment 40W3 is "4". As a result, the gradation value of the pixel 42 is "21". In this case, the apparent display gradation value in the pixel 42 capable of performing gradation expression with 3-bit depth (8 gradations) is "7.00".

As described above, the first bit arithmetic unit 201d of the gradation processor 20d according to the present embodiment adds the value of the first bit of each of the 5-bit depth (32 gradations) gradation data of the RGB signals to the value of the second bit. Subsequently, the first bit arithmetic unit 201d discards the first and less significant bits to generate the 3-bit depth (8 gradations) gradation data and outputs them to the display panel 30d. The second bit arithmetic unit 202d of the gradation processor 20d adds the value of the zeroth bit of the 5-bit depth (32 gradations) gradation datum of the W signal to the value of the second bit. Subsequently, the second bit arithmetic unit 202d discards the first and less significant bits to generate the 3-bit depth (8 gradations) gradation datum and outputs it to the display panel 30d. Consequently, the display device 1d enables apparent gradation visually recognized on the display panel 30d that has the pixels 42 having a display gradation number of 8, that is, that can perform gradation expression with 3-bit depth (8 gradations) to have 22 levels.

The present embodiment is particularly suitable for the display panel 30d serving as an MIP panel having the following configurations: the R sub-pixel, the G sub-pixel, the B sub-pixel, and the W sub-pixel are each composed of three segments having an area ratio of 1:2:4 and each include a memory that can store therein binary data of the respective segments, and the ratio of the display luminance of the R sub-pixel, the G sub-pixel, and the B sub-pixel to the display luminance of the W sub-pixel is 2:1, for example.

The first bit arithmetic unit 201d of the gradation processor 20d may add the value of the zeroth bit of the respective 5-bit depth (32 gradations) gradation data of the RGB signals to the value of the second bit and discard the first and less significant bits to generate the 3-bit depth (8 gradations) gradation data. The second bit arithmetic unit 202d of the gradation processor 20d may add the value of the first bit of the 5-bit depth (32 gradations) gradation data of the W signals to the value of the second bit and discard the first and less significant bits to generate the 3-bit depth (8 gradations) gradation data. In this case, the ratio of the display luminance of the R sub-pixel, the G sub-pixel, and the B sub-pixel to the display luminance of the W sub-pixel is 1:2. Specifically, the ratio of the display luminance of the segments 40R1, 40G1, and 40B1 to the display luminance of the segment 40W1 is 1:2, the ratio of the display luminance of the segments 40R2, 40G2, and 40B2 to the display luminance of the segment 40W2 is 1:2, and the ratio of the display luminance of the segments 40R3, 40G3, and 40B3 to the display luminance of the segment 40W3 is 1:2.

As described above, the display device 1d according to the fourth embodiment includes the display panel 30d and the signal processor 100d. The display panel 30d includes the pixels 40 each including the W (white) sub-pixel 40W (fourth pixel) besides the sub-pixels in the three primary colors of the R (red) sub-pixel 40R (first pixel), the G (green) sub-pixel 40G (second pixel), and the B (blue) sub-pixel 40B (third pixel). The ratio of the display luminance of the R (red) sub-pixel 40R (first pixel), the G (green) sub-pixel 40G (second pixel), and the B (blue) sub-pixel 40B (third pixel) to the display luminance of the W (white) sub-pixel 40W (fourth pixel) is 2:1. The signal processor 100d converts an image signal including gradation data of R (red), G (green), and B (blue) into RGB signals (first signal) including gradation data of R (red), G (green), and B (blue) and a W signal (second signal) including a gradation datum of W (white), and outputs the converted signals. When the gradation data of the image signal have the same value, output signals output from each of the signal processors 100d include an output signal in which the respective gradation data of the RGB signals (first signal) and the gradation datum of the W signal (second signal) have the same value and an output signal in which the respective gradation data of the RGB signals (first signal) and the gradation datum of the W signal (second signal) have values different from each other by 1. The signal processor 100d includes the gradation processor 20d that converts the gradation data of the RGB signals (first signal) and the W signals (second signal) with a first bit depth (5-bit depth) into gradation data with a second bit depth (3-bit depth) smaller than the first bit depth.

In the configuration described above, the gradation processor 20d adds the value of the first bit of each of the first bit depth (5-bit depth) gradation data of the RGB signals (first signal) to the second bit and discards the first and less significant bits to generate the second bit depth (3-bit depth) gradation data. The gradation processor 20d adds the value of the zeroth bit of the first bit depth (5-bit depth) gradation datum of the W signal (second signal) to the second bit and discards the first and less significant bits to generate the second bit depth (3-bit depth) gradation datum.

Alternatively, the gradation processor 20d adds the value of the zeroth bit of each of the first bit depth (5-bit depth) gradation data of the RGB signals (first signal) to the second bit and discards the first and less significant bits to generate the second bit depth (3-bit depth) gradation data. The gradation processor 20d adds the value of the first bit of the first bit depth (5-bit depth) gradation datum of the W signal (second signal) to the second bit and discards the first and less significant bits to generate the second bit depth (3-bit depth) gradation datum.

In the configuration described above, the R (red) sub-pixel (first pixel), the G (green) sub-pixel (second pixel), the B (blue) sub-pixel (third pixel), and the W (white) sub-pixel (fourth pixel) are each composed of a plurality of segments having a predetermined area ratio. The R (red) sub-pixel (first pixel), the G (green) sub-pixel (second pixel), the B (blue) sub-pixel (third pixel), and the W (white) sub-pixel (fourth pixel) each include a memory that can store therein binary data of the respective segments. The display panel 30d displays an image in a plurality of display patterns corresponding to the gradation data of the RGB signals (first signal) and the gradation data of the W signals (second signal).

With this configuration, the display device 1d can express the intermediate values of the gradation values on the display panel 30d capable of performing gradation expression with the second bit depth (3-bit depth, that is, 8 gradations). Consequently, the display device 1d can make the number of apparent gradations visually recognized on the display panel 30d greater than that of the third embodiment.

The present embodiment can provide the display device 1d capable of performing higher gradation expression than the display gradation of the display panel 30d.

While exemplary embodiments according to the present disclosure have been described, the embodiments are not intended to limit the disclosure. The contents disclosed in the embodiments are given by way of example only, and various changes may be made without departing from the spirit of the present disclosure. Appropriate changes made without departing from the spirit of the present disclosure naturally fall within the technical scope of the disclosure.

What is claimed is:

1. A display device comprising:
    a display panel comprising a plurality of first pixels configured to display a first color, a plurality of second pixels configured to display a second color, a plurality of third pixels configured to display a third color, and a plurality of fourth pixels configured to display a fourth color; and
    a signal processor configured to convert an image signal including gradation data of the first color, the second color, and the third color into output signals including
        a first signal including gradation data of the first color, the second color, and the third color and
        a second signal including a gradation datum of the fourth color, wherein
    when the gradation data of the first color, the second color, and the third color in the image signal have a same value, the output signals include
        an output signal in which the gradation data of the first signal and the gradation datum of the second signal have the same value, and
        an output signal in which the gradation data of the first signal and the gradation datum of the second signal have values different from each other by 1, and
    wherein
    the first signal has first bit depth gradation data that are gradation data having a first bit depth,
    the second signal has a first bit depth gradation datum that is a gradation datum having the first bit depth,
    the signal processor comprises a gradation processor configured to convert:
        the first bit depth gradation data of the first signal into second bit depth gradation data that are gradation data having a second bit depth; and
        the first bit depth datum of the second signal into a second bit depth datum that is a gradation datum having the second bit depth, the second bit depth being smaller than the first bit depth.

2. The display device according to claim 1, wherein the first color, the second color, and the third color are three primary colors of red, green, and blue, and the fourth color is white.

3. The display device according to claim 1, wherein,
    when the gradation data of the first color, the second color, and the third color in the image signal have the same value, the signal processor is configured to:
        increase the gradation data of the image signal one step by one step, the gradation data of the first signal and the gradation datum of the second signal being alternately increased; or
        decrease the gradation data of the image signal one step by one step, the gradation data of the first signal and the gradation datum of the second signal being alternately decreased.

4. The display device according to claim 1, wherein a ratio of display luminance of the first pixel, the second pixel, and the third pixel to display luminance of the fourth pixel is 1:1.

5. The display device according to claim 4, wherein the second bit depth is smaller than the first bit depth by 1.

6. The display device according to claim 5, wherein
    the gradation processor discards a zeroth bit of each of the first bit depth gradation data of the first signal to generate the second bit depth gradation data, and
    the gradation processor adds 1 to the first bit depth gradation datum of the second signal and discards a zeroth bit to generate the second bit depth gradation datum.

7. The display device according to claim 5, wherein
    the gradation processor adds 1 to each of the first bit depth gradation data of the first signal and discards a zeroth bit to generate the second bit depth gradation data, and
    the gradation processor discards a zeroth bit of the first bit depth gradation datum of the second signal to generate the second bit depth gradation datum.

8. The display device according to claim 4, further comprising:
    an FRC controller configured to divide an image of one frame into a plurality of sub-frames in a time-division manner and supplies the sub-frames to the display panel,
    wherein
    the FRC controller causes the display panel to display an image in a plurality of display patterns corresponding to the gradation data of the first signal and the second signal.

9. The display device according to claim 4, wherein
    the first pixels, the second pixels, the third pixels, and the fourth pixels are each composed of a plurality of segments having a predetermined area ratio and each comprise a memory capable of storing binary data of the respective segments in the memory, and
    the display panel displays an image in a plurality of display patterns corresponding to the gradation data of the first signal and the second signal.

10. The display device according to claim 1, wherein a ratio of display luminance of the first pixel, the second pixel, and the third pixel to display luminance of the fourth pixel is 2:1.

11. The display device according to claim 10, wherein the second bit depth is smaller than the first bit depth by 2.

12. The display device according to claim 11, wherein the gradation processor adds a value of a first bit of each of the first bit depth gradation data of the first signal to a second bit and discards the first and less significant bits to generate the second bit depth gradation data, and the gradation processor adds a value of a zeroth bit of the first bit depth gradation datum of the second signal to a second bit and discards the first and less significant bits to generate the second bit depth gradation datum.

13. The display device according to claim 11, wherein the gradation processor adds a value of a zeroth bit of each of the first bit depth gradation data of the first signal to a second bit and discards the first and less significant bits to generate the second bit depth gradation data, and the gradation processor adds a value of a first bit of the first bit depth gradation datum of the second signal to a second bit and discards the first and less significant bits to generate the second bit depth gradation datum.

14. The display device according to claim 10, further comprising:
an FRC controller configured to divide an image of one frame into a plurality of sub-frames in a time-division manner and supplies the sub-frames to the display panel,
wherein
the FRC controller causes the display panel to display an image in a plurality of display patterns corresponding to the gradation data of the first signal and the second signal.

15. The display device according to claim 10, wherein
the first pixels, the second pixels, the third pixels, and the fourth pixels are each composed of a plurality of segments having a predetermined area ratio and each comprise a memory capable of storing binary data of the respective segments in the memory, and
the display panel displays an image in a plurality of display patterns corresponding to the gradation data of the first signal and the second signal.

\* \* \* \* \*